US012139967B2

(12) United States Patent
Anthony et al.

(10) Patent No.: US 12,139,967 B2
(45) Date of Patent: *Nov. 12, 2024

(54) MOTOR ASSEMBLIES FOR ARCHITECTURAL COVERINGS

(71) Applicant: Hunter Douglas Inc., Pearl River, NY (US)

(72) Inventors: James M. Anthony, Denver, CO (US); Kevin M. Dann, Englewood, CO (US); Daniel A. Huber, Arvada, CO (US); Paul A. Brayford, Denver, CO (US); Douglas J. Lorenz, Louisville, CO (US); James Kolozs, Denver, CO (US); Ronald Holt, Westminster, CO (US); Todd Nelson, Louisville, CO (US); Shelby Jared Yenzer, Westminster, CO (US); Charles Culver Gidden Cooper, Arvada, CO (US); Peter Zagone, Denver, CO (US); Stephen T. Wisecup, Niwot, CO (US); Jan Pruegner, Dresden (DE); Robert Witt, Dresden (DE); Joerg Schierz, Steinigtwolmsdorf (DE)

(73) Assignee: Hunter Douglas Inc., New York, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/936,085

(22) Filed: Sep. 28, 2022

(65) Prior Publication Data

US 2023/0018256 A1 Jan. 19, 2023

Related U.S. Application Data

(63) Continuation of application No. 16/849,483, filed on Apr. 15, 2020, now Pat. No. 11,486,198.

(Continued)

(51) Int. Cl.
*E06B 9/72* (2006.01)
*E06B 9/42* (2006.01)
*E06B 9/68* (2006.01)

(52) U.S. Cl.
CPC .................. *E06B 9/72* (2013.01); *E06B 9/42* (2013.01); *E06B 2009/6809* (2013.01)

(58) Field of Classification Search
CPC ...... E06B 9/72; E06B 9/42; E06B 2009/6809; E06B 2009/689; E06B 2009/6818;

(Continued)

(56) References Cited

U.S. PATENT DOCUMENTS 1,297,875 A 3/1919 Lee
1,849,255 A 3/1932 Starr (Continued)

FOREIGN PATENT DOCUMENTS

CN 1615531 5/2005
CN 101971279 2/2011

(Continued)

OTHER PUBLICATIONS

China National Intellectual Property Administration, "Office Action" issued for 201710979060.6 on May 25, 2020, 9 pages.

(Continued)

*Primary Examiner* — Beth A Stephan
(74) *Attorney, Agent, or Firm* — Kilpatrick Townsend & Stockton LLP

(57) ABSTRACT

Example motor assemblies for architectural coverings are described herein. An example architectural covering assembly includes an architectural covering movable between an upper limit position, a lower limit position, and a transition limit position between the upper limit position and the lower limit position. The example architectural covering assembly also includes a motor, a consumer touchpoint, and an (Continued)

architectural covering controller. In response to detecting a first gesture at the consumer touchpoint, the architectural covering controller is to activate the motor to move the architectural covering to the transition limit position and stop, and in response to detecting a second gesture at the consumer touchpoint, different from the first gesture, the architectural covering controller is to activate the motor to move the architectural covering through the transition limit position and to the upper limit position or the lower limit position.

20 Claims, 32 Drawing Sheets

Related U.S. Application Data

(60) Provisional application No. 62/836,343, filed on Apr. 19, 2019.

(58) Field of Classification Search
CPC ........ E06B 2009/785; E06B 9/78; E06B 9/68; E06B 9/70; E06B 9/74; E06B 9/76; E06B 9/34; E06B 9/40; H01H 2215/004
See application file for complete search history.

(56) References Cited

U.S. PATENT DOCUMENTS 2,018,017 A 10/1935 Fulton
4,476,910 A 10/1984 Saito
4,644,990 A 2/1987 Webb, Sr. et al.
4,706,726 A 11/1987 Nortoft
5,252,794 A 10/1993 Tseng
5,517,094 A 5/1996 Domel et al.
5,760,558 A 6/1998 Popat
5,791,393 A 8/1998 Judkins
5,848,634 A 12/1998 Will et al.
6,089,303 A 7/2000 Metcalf et al.
6,100,659 A 8/2000 Will et al.
6,392,374 B1 5/2002 Menetrier et al.
6,680,594 B2 1/2004 Collett et al.
6,708,750 B2 3/2004 Collett et al.
6,910,515 B2 6/2005 Nien
6,979,962 B2 12/2005 Cavarec et al.
7,325,279 B2 2/2008 Huang
7,399,940 B1 7/2008 Tseng
7,406,995 B2 8/2008 Huang
7,417,397 B2 8/2008 Berman et al.
7,466,090 B2 12/2008 Meewis et al.
7,652,439 B2 1/2010 Tang
7,673,665 B2 3/2010 Rossato
7,941,245 B1 5/2011 Popat
8,091,604 B2 1/2012 Kluck
8,106,768 B2 1/2012 Neumann
8,190,275 B2 5/2012 Chang
8,299,734 B2 10/2012 Mullet et al.
8,307,878 B2 11/2012 Faller et al.
8,368,328 B2 2/2013 Mullet et al.
8,480,147 B2 7/2013 Jones
8,508,169 B2 8/2013 Zaharchuk et al.
8,528,621 B2 9/2013 Murphy et al.
8,575,872 B2 11/2013 Mullet et al.
8,581,163 B2 11/2013 Grehant et al.
8,643,321 B2 2/2014 Leivenzon et al.
8,659,246 B2 2/2014 Mullet et al.
8,723,454 B2 5/2014 Skinner et al.
8,723,466 B2 5/2014 Chambers et al.
8,739,852 B2 6/2014 Anderson et al.
8,791,658 B2 7/2014 Mullet et al.
8,844,605 B2 9/2014 Ng
8,866,343 B2 10/2014 Abraham et al.
8,947,027 B2 2/2015 Mullet et al.
8,981,681 B2 3/2015 Malekpour
9,018,868 B2 4/2015 Lucas et al.
9,152,032 B2 10/2015 Mullet et al.
9,181,750 B2 11/2015 Ticoalu et al.
9,194,179 B2 11/2015 Mullet et al.
9,249,623 B2 2/2016 Mullet et al.
9,335,753 B2 5/2016 Baugh
9,371,687 B2 6/2016 Yu et al.
9,371,691 B2 6/2016 Yu et al.
9,376,862 B2 6/2016 Mullet et al.
9,376,863 B2 6/2016 Mullet et al.
9,394,743 B2 7/2016 Mullet et al.
9,410,369 B2 8/2016 Mullet et al.
9,470,040 B2 10/2016 Hall et al.
9,489,834 B2 11/2016 Hall et al.
9,506,288 B2 11/2016 Hall et al.
9,540,871 B2 1/2017 Hall et al.
9,562,390 B2 2/2017 Hall et al.
9,611,689 B2 4/2017 Blair et al.
9,611,690 B2 4/2017 Mullet et al.
9,725,948 B2 8/2017 Mullet et al.
9,725,952 B2 8/2017 Mullet et al.
9,732,555 B2 * 8/2017 Morris .................... E06B 9/262
9,745,797 B2 8/2017 Mullet et al.
9,765,568 B2 9/2017 Colson et al.
9,771,755 B2 9/2017 Mullet et al.
9,840,870 B2 12/2017 Lu et al.
9,885,208 B1 2/2018 Chen
9,890,585 B2 2/2018 Mullet et al.
9,890,588 B2 2/2018 Smith
9,896,882 B2 2/2018 Mullet et al.
10,119,330 B2 11/2018 Brunk et al.
10,202,802 B2 2/2019 Colson et al.
10,246,938 B2 4/2019 Mullet et al.
10,273,751 B2 4/2019 Colson et al.
10,301,865 B2 5/2019 Son et al.
10,358,867 B2 7/2019 Hall et al.
10,407,983 B2 9/2019 Holt et al.
10,519,713 B2 12/2019 Holt et al.
10,851,587 B2 12/2020 Anthony et al.
11,486,198 B2 * 11/2022 Anthony ................... E06B 9/72
2001/0011580 A1 8/2001 Knowles
2001/0015632 A1 8/2001 Norbert et al.
2001/0050538 A1 12/2001 Kovach et al.
2003/0145955 A1 8/2003 Hauck et al.
2003/0145956 A1 8/2003 Domel et al.
2003/0145957 A1 8/2003 Domel et al.
2003/0168186 A1 9/2003 Wen et al.
2003/0168187 A1 9/2003 Wen et al.
2003/0168188 A1 9/2003 Wen et al.
2004/0040674 A1 3/2004 Hauck et al.
2004/0129849 A1 7/2004 Walker et al.
2004/0250964 A1 12/2004 Carmen, Jr. et al.
2005/0022946 A1 2/2005 Domel
2005/0087312 A1 4/2005 Nien
2006/0000558 A1 1/2006 Fennell
2006/0278345 A1 12/2006 Huang
2006/0283560 A1 12/2006 Lai
2007/0012407 A1 1/2007 Nien et al.
2007/0084567 A1 4/2007 Chen
2007/0144683 A1 6/2007 Krochmal et al.
2007/0144684 A1 6/2007 Hutchings et al.
2008/0121353 A1 5/2008 Detmer et al.
2008/0252096 A1 10/2008 Mueller
2009/0277593 A1 11/2009 Stewart
2009/0308543 A1 12/2009 Kates
2010/0092855 A1 4/2010 Cheng
2010/0164743 A1 7/2010 Domel et al.
2010/0175838 A1 7/2010 Faller et al.
2010/0219306 A1 9/2010 Detmer et al.
2010/0269988 A1 10/2010 Mullet et al.
2011/0005694 A1 1/2011 Ng
2011/0265958 A1 11/2011 Skinner et al.
2012/0073765 A1 3/2012 Hontz et al.
2012/0193035 A1 8/2012 Malekpour
2013/0020969 A1 1/2013 Leivenzon
2013/0087296 A1 * 4/2013 Mullet .................... E06B 9/262
160/405
2013/0220560 A1 8/2013 Mullet et al.
2013/0255890 A1 10/2013 Mullet et al.

(56) References Cited

U.S. PATENT DOCUMENTS

| | | | |
|---|---|---|---|
| 2013/0269887 | A1 | 10/2013 | Skinner et al. |
| 2014/0012165 | A1 | 1/2014 | Cockley |
| 2014/0076505 | A1 | 3/2014 | Mullet et al. |
| 2014/0076508 | A1 | 3/2014 | Mullet et al. |
| 2014/0090789 | A1 | 4/2014 | Mullet et al. |
| 2014/0231032 | A1 | 8/2014 | Blair |
| 2014/0262058 | A1 | 9/2014 | Mullet et al. |
| 2014/0262078 | A1 | 9/2014 | Colson et al. |
| 2014/0277749 | A1 | 9/2014 | Choo et al. |
| 2014/0290870 | A1 | 10/2014 | Colson et al. |
| 2014/0290876 | A1 | 10/2014 | Chen |
| 2014/0305602 | A1 | 10/2014 | Kirby et al. |
| 2015/0007946 | A1 | 1/2015 | Yu et al. |
| 2015/0034257 | A1 | 5/2015 | Blair et al. |
| 2015/0284990 | A1 | 10/2015 | Hall et al. |
| 2015/0284998 | A1 | 10/2015 | Hall et al. |
| 2015/0368968 | A1 | 12/2015 | Smith |
| 2016/0319597 | A1 | 11/2016 | Colson et al. |
| 2017/0006740 | A1 | 1/2017 | Holt et al. |
| 2017/0081916 | A1 | 3/2017 | Greening |
| 2017/0089133 | A1 | 3/2017 | Watkins et al. |
| 2017/0268293 | A1 | 9/2017 | De Vries et al. |
| 2018/0023340 | A1 | 1/2018 | Goldberg et al. |
| 2018/0010610 | A1 | 4/2018 | Anthony et al. |
| 2018/0106102 | A1 | 4/2018 | Holt et al. |
| 2018/0106105 | A1 | 4/2018 | Anthony et al. |
| 2018/0119489 | A1 | 5/2018 | Smith |
| 2018/0128048 | A1 | 5/2018 | Pinese |
| 2018/0174781 | A1 | 6/2018 | Fangmann |
| 2018/0202224 | A1 | 7/2018 | Kumar |
| 2018/0202228 | A1 | 7/2018 | Faller et al. |
| 2018/0216404 | A1 | 8/2018 | Fisher |
| 2019/0032404 | A1 | 1/2019 | Chacon et al. |
| 2019/0100962 | A1 | 4/2019 | Smith et al. |
| 2019/0210195 | A1 | 7/2019 | Van Slooten et al. |
| 2019/0234143 | A1 | 8/2019 | Colson et al. |
| 2019/0352964 | A1 | 11/2019 | Kasai |

FOREIGN PATENT DOCUMENTS

| | | |
|---|---|---|
| CN | 202662515 | 1/2013 |
| CN | 203562356 | 4/2014 |
| EP | 1182321 | 2/2002 |
| EP | 1451840 | 9/2004 |
| EP | 3219902 | 9/2017 |
| EP | 3312377 | 4/2018 |
| ES | 2121728 | 12/1998 |
| NL | 2020475 | 2/2019 |
| WO | 03049127 | 6/2003 |
| WO | 2004013880 | 2/2004 |
| WO | 2011106397 | 9/2011 |
| WO | 2011106398 | 9/2011 |
| WO | 2012000629 | 1/2012 |
| WO | 2013059037 | 4/2013 |
| WO | 2014062504 | 4/2014 |
| WO | 2014169173 | 10/2014 |
| WO | 2016197520 | 12/2016 |

OTHER PUBLICATIONS

European Patent Office, “Extended European Search Report,” issued for EP17197374.6 dated Mar. 22, 2018, 7 pages.

European Patent Office, “Extended European Search Report,” issued for EP20169842.0 dated Sep. 25, 2020, 10 pages.

Non-Final Office Action for U.S. Appl. No. 15/787,490 mailed on Nov. 13, 2019, 13 pages.

Non-Final Office Action for U.S. Appl. No. 15/787,490 mailed on Apr. 14, 2020, 6 pages.

Notice of Allowance for U.S. Appl. No. 15/787,490 mailed Jul. 30, 2020, 7 pages.

Communication from the Examining Division for EP 20 169 842 dated Feb. 15, 2024, all pages.

* cited by examiner

MOTOR ASSEMBLIES FOR ARCHITECTURAL COVERINGS

RELATED APPLICATION

This patent is a continuation of U.S. Non-Provisional application Ser. No. 16/849,483, titled "MOTOR ASSEMBLIES FOR ARCHITECTURAL COVERINGS," filed Apr. 15, 2020, which claims the benefit under 35 U.S.C. § 119(e) to U.S. Provisional Application No. 62/836,343, titled "MOTOR ASSEMBLIES FOR ARCHITECTURAL COVERINGS," filed Apr. 19, 2019, both of which are incorporated herein by this reference in their entireties.

FIELD OF DISCLOSURE

This disclosure relates generally to architectural coverings and, more particularly, to motor assemblies for architectural coverings.

BACKGROUND

Architectural coverings such as roller blinds provide shading and privacy. One known way to operate an architectural covering is with a manual lift cord (sometimes referred to as a pull cord) that may be pulled or released to draw the covering up or down. However, lift cord type coverings have drawbacks. For instance, lift cords may be hard to reach when the lift cord is high up (when the covering is in the fully lowered position) or may drag on the floor when the covering is in the fully raised position. Further, in some instances, lift cords require a large amount of force to operate, especially when utilized with large, heavy coverings. Also, some lift cords require complicated changes in direction in order to perform various functions such as locking or unlocking the lift cord.

Some known architectural coverings utilize a motor assembly to operate the covering. Some known motor assemblies are activated by a switch on a wall near a window to raise or lower the covering. However, these known motor assemblies require additional wiring between the switch and the motor assembly. This additional wiring typically results in increased manufacturing/installation costs as well as increased maintenance costs. Other known motor assemblies utilize switches on a front of a headrail of the architectural covering. However, these known motor assemblies still typically suffer from the above drawbacks, in that additional wiring typically is needed between the motor assembly and the switches. Further, with the switches disposed outward from the motor and other electronic components, the switches are more likely to become damaged. Also, such switch arrangements result in light gap, which is undesired effect in an architectural covering.

Some known motor assemblies are operated by a wireless remote control. However, the remote control may be misplaced (lost) and/or the batteries in the remote control need to be replaced periodically. Thus, users may be left without the ability to control the architectural covering. Sometimes, a user simply may desire to operate the motorized architectural covering manually, by hand power without motorized operation. Further, users often desire to operate the motor assembly with a familiar gesture or tactile feel, which a remote control does not provide.

BRIEF DESCRIPTION OF THE DRAWINGS

Implementations of architectural covering motor assemblies constructed in accordance with principles of inventions disclosed herein will be described through the use of the following drawings, which are not to be considered as limiting, but rather, illustrations of examples of manners of implementing principles of the disclosure. Many other implementations will occur to persons of ordinary skill in the art upon reading this disclosure.

DETAILED DESCRIPTION

Figure 1:
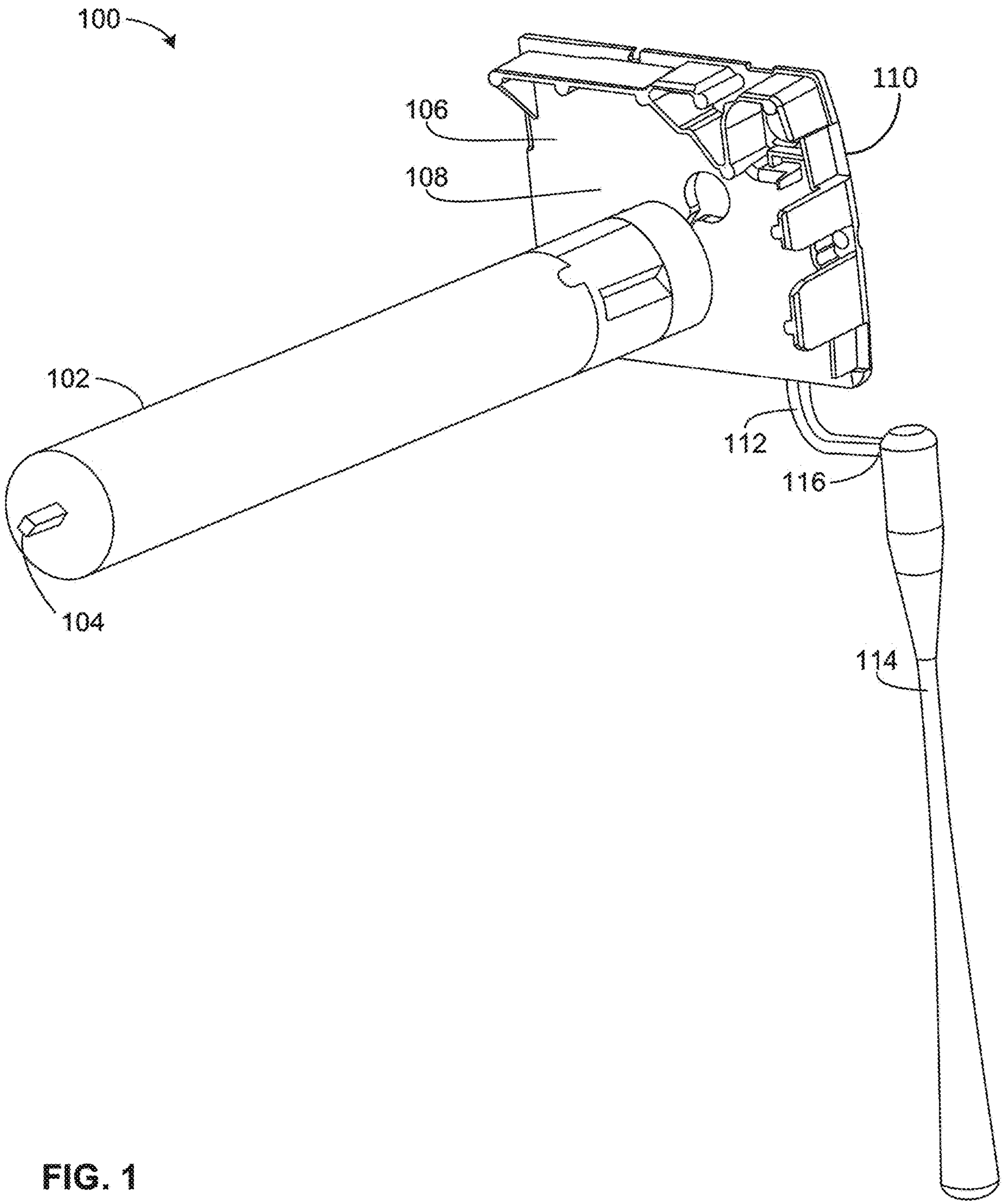
FIG. 1 is a perspective view of an example of a motor assembly for an architectural covering constructed in accordance with the teachings of this disclosure.

Disclosed herein are examples of motor assemblies for architectural coverings facilitating control of raising and lowering of an architectural covering. Examples of motor assemblies include a motor to raise or lower an architectural opening (e.g., by rotating a roller tube). In particular, the motor operates in one direction to raise the covering and in the opposite direction to the lower the covering.

In some examples, a consumer touchpoint is provided to facilitate user interaction with the motor assembly. The consumer touchpoint may be used to mechanically/electro-mechanically actuate the motor. The consumer touchpoint preferably is readily accessible and manipulatable by a user's hand, yet may be coupled to the motor assembly (in contrast with a remote control). In particular, the consumer touchpoint transforms gestures of a user's hand into operations by the motor assembly. For example, a user may lift the consumer touchpoint vertically upward to command the motor to raise the covering, or pull down on the consumer touchpoint to command the motor lower to the covering. Example consumer touchpoints require relatively little effort from a user to operate (as compared to manual pull cords) while still providing that intuitive and traditional feel for causing the covering to open or close.

In some examples, the motor assembly includes a rotatable actuator that rotates about a central rotational axis to actuate the motor in one direction or the other direction. Specifically, the actuator is positioned such that when the actuator is rotated in one direction, the actuator contacts or otherwise actuates a switch or other operational element that triggers the motor to raise the architectural covering, and when the actuator is rotated in the opposite direction, the actuator contacts or otherwise actuates another switch or operational element that triggers the motor to lower the architectural covering. In some examples, the consumer touchpoint is operatively coupled to the actuator. A user may move the consumer touchpoint linearly up or down to rotate the actuator, which triggers the motor to raise or lower the architectural covering. In some examples, the actuator is disposed adjacent the motor. For example, the actuator may be disposed adjacent an end of the motor (e.g., coaxial with the motor), thereby forming a motor assembly housing incorporating both the motor and the actuator. In some examples, the actuator is disposed between the motor and an end plate, which is a structure (e.g., a mounting bracket) for mounting the motor assembly in or near an architectural structure or opening. As such, the motor assembly has a smaller or more compact construction than known motor assemblies, which enables the example motor assembly to be incorporated into more places and reduces light gap. Further, by disposing the actuator closer to the motor, fewer part(s)/component(s) of the motor assembly are exposed or in locations that may otherwise become damaged.

Further, unlike known motor assemblies that have switches spaced from the motor assembly and/or the electronic components associated therewith, such as out front or on a wall near the motor assembly, example motor assemblies disclosed herein utilize less wiring between the motor and the actuator. For instance, the power cord or wiring may be routed to only one location, such as inside the motor assembly housing where the electronic components (e.g., switches) and the motor are powered. As a result, the example motor assemblies are less expensive to manufacture and generally require less maintenance compared to known motor assemblies.

In some examples, to convert linear movement of the consumer touchpoint to rotational movement of the actuator, a control lever is provided. The control lever is coupled to the actuator and extends from the actuator in a direction transverse to the rotational axis of the actuator. The control lever enables operation of the actuator at a point spaced apart from the actuator. For example, the control lever extends outward from a front headrail of the architectural covering, which enables the consumer touchpoint be disposed in front of the architectural covering, which is easily accessible by a user. Also, in some examples, the control lever acts as a lever arm that converts linear movement of the consumer touchpoint (e.g., in a direction perpendicular to and offset from an axis of rotation) to rotational movement of the actuator. For example, pushing up on the consumer touchpoint (e.g., moving the consumer touchpoint vertically upward) causes the actuator to rotate in one direction, and pulling down on the consumer touchpoint (e.g., moving the consumer touchpoint vertically downward) causes the actuator to rotate in the opposite direction. In some examples, the consumer touchpoint is implemented as a lever actuator, such as a rigid wand or push/pull rod, that operates to actuate the control lever and, thus, the actuator. In some examples, the actuator is biased to a neutral position, such that after a user releases the consumer touchpoint, the consumer touchpoint returns to the neutral position. In some examples, when the user releases the consumer touchpoint and the consumer touchpoint returns to the neutral position, the motor stops. Thus, unlike known motor assemblies that require complicated gestures, in some examples the motor of the disclosed motor assembly turns off when the user releases the consumer touchpoint. In other examples, when the user releases the consumer touchpoint and the consumer touchpoint returns to the neutral position, the motor continues to operate and move the architectural covering until a subsequent movement of the consumer touchpoint is detected, which causes the motor to cease moving the architectural covering.

In some examples, the actuator activates the motor by triggering one or more switches. For example, the actuator may be rotated in one direction (from the neutral position) to trigger one switch that activates the motor to raise the architectural covering, and the actuator may be rotated in the other direction (from the neutral position) to trigger another switch that activates the motor to lower the architectural covering. In some examples, the switches are implemented as snap dome switches. In the neutral position, neither of the switches is activated. In some examples, the switches may bias the actuator to the neutral position (e.g., by releasing the corresponding switch). Thus, in some examples, a separate biasing feature (e.g., a spring) may not be required to bias the consumer touchpoint to the neutral position. In other examples, a separate biasing feature may be included to bias the actuator to the neutral position.

Further, the control lever advantageously converts a larger range of motion (e.g., a few inches) provided by the consumer touchpoint to a relatively small range of motion in the actuator. In some instances, only a relatively small motion may be needed by the actuator to trigger the switches. However, such a small range of motion is not intuitive to a user. Therefore, the control lever converts a larger movement of the consumer touchpoint (which is desired for tactile purposes) to a relatively small rotational movement to trigger the switches. Further, the consumer touchpoint remains in relatively the same location and is readily and easily accessible by a user at any time, unlike manual lift cords that move to higher or lower locations that typically are difficult to access, or remote controls that may become inoperable or be lost.

The ranges of movement of some example control levers and/or actuators may be limited, which prevents the actuators from being over rotated and causing damage to switches or other components of the motor assembly. For example, in one example, the control lever of the motor assembly is disposed within a channel formed in an end plate. The channel may include an upper wall and a lower wall that limit the up and down movement of the control lever. Alternatively, the channel may not be included. However, example motor assemblies with a design that includes a range limiting feature may have a longer product life and require less maintenance.

Also disclosed herein are example consumer touchpoints, such as lever actuators, that detach from the motor assembly (e.g., by detaching from the control lever) for preventing injury to a person and/or damage to the motor assembly. In some examples, the consumer touchpoint is magnetically coupled to the motor assembly. As a result, if an excessive force is applied to the consumer touchpoint, the consumer touchpoint disconnects from the motor assembly. For example, if a child pulls on the consumer touchpoint (or otherwise becomes snagged or caught on the consumer touchpoint), the consumer touchpoint disconnects, thereby reducing the risk of injury. Further, by disconnecting the consumer touchpoint from the motor assembly, the risk of damage to the motor assembly is reduced or eliminated.

Also disclosed herein are example gestures that may be used to operate a motor assembly. A gesture may include one or more movements of a consumer touchpoint (e.g., a particular sequence of movements). Based on certain movements and/or combinations of movements of the consumer touchpoint, the motor assembly may be configured to perform various operations or functions, such as moving the architectural covering in a first direction (e.g., up), moving the architectural covering in a second direction (e.g., down), stopping the architectural covering from moving, moving the architectural covering to a stored or predetermined position (e.g., a favorite position), setting the stored position, setting an upper limit position and/or a lower limit position, moving the architectural covering to an upper limit position or a lower limit position while bypassing one or more transition limit positions, and/or programming one or more limits, for example.

All apparatuses and methods discussed in this document and illustrated in the accompanying drawings are examples of apparatuses and/or methods implemented in accordance with one or more principles of this disclosure, which principles may be applied singly or in combination. These examples are not the only way to implement these principles but are merely examples. Other examples of manners of implementing the disclosed principles will occur to a person of ordinary skill in the art upon reading this disclosure. It will be appreciated that the drawings illustrate examples of embodiments of the disclosure incorporating one or more principles or features, and thus reference to or description of a particular structure or element in the figures is to be understood as reference to or description of an example of an embodiment, but not necessarily the only manner of embodying the disclosure.

Turning now to the figures, FIG. 1 illustrates an example architectural covering motor assembly 100 (e.g., an operating system) constructed in accordance with the teachings of this disclosure. Example motor assembly 100 may be used to effect movement of an architectural covering, such as retracting (e.g., raising) or extending (e.g., lowering) an architectural covering. An architectural covering may be used to cover an architectural structure, such as a wall, and/or an architectural opening, such as a window, a door, a sky light, an archway, etc. Example motor assembly 100 may be implemented with any type of covering, such as conventional draperies, shutters, horizontal and vertical blinds, and various other kinds of shades, including roller and cellular shades, etc.

In the illustrated example of FIG. 1, motor assembly 100 includes a motor 102 with an output shaft 104. Motor 102 drives output shaft 104 in one direction to raise the corresponding architectural covering (or otherwise uncover the architectural structure and/or opening) and drives output shaft 104 in the opposite direction to lower the corresponding architectural covering (or otherwise cover the architectural structure and/or opening). As mentioned above, motor assembly 100 may be incorporated into various types of architectural coverings. For example, output shaft 104 may be coupled to a roller tube for lifting a shade or blinds. In some examples, the roller tube is disposed around motor 102 (e.g., concentric with motor 102). In other examples, output shaft 104 may be coupled to one or more mechanism(s) such as a lift cord drive (e.g., a drive shaft that translates rotation for winding of a cord on a spool), a traverse drive (e.g., a pulley that drives a belt, cord and/or bead chain), a drum and cradle, a sliding drive, a tilting drive (e.g., a rack and pinion to tilt louvers of a shutter or blinds), etc.) and/or any other mechanism for otherwise moving (e.g., extending or retracting) the corresponding architectural covering between one position and another (e.g., moving an architectural covering from side-to-side). In some examples, a rotatable element (e.g., a roller tube, a lift cord drive, etc.) or other element driven by output shaft 104 has a rotation axis that is aligned with or parallel to output shaft 104. Example motor assembly 100 may be used to move an architectural covering in any direction, such as vertically, side-to-side (traverse), diagonally, etc. Example motor assembly 100 may be implemented to move an architectural covering in different shaped openings, for example, a rectangular opening, an octagon-shaped opening, an arch, etc.

Figure 2:
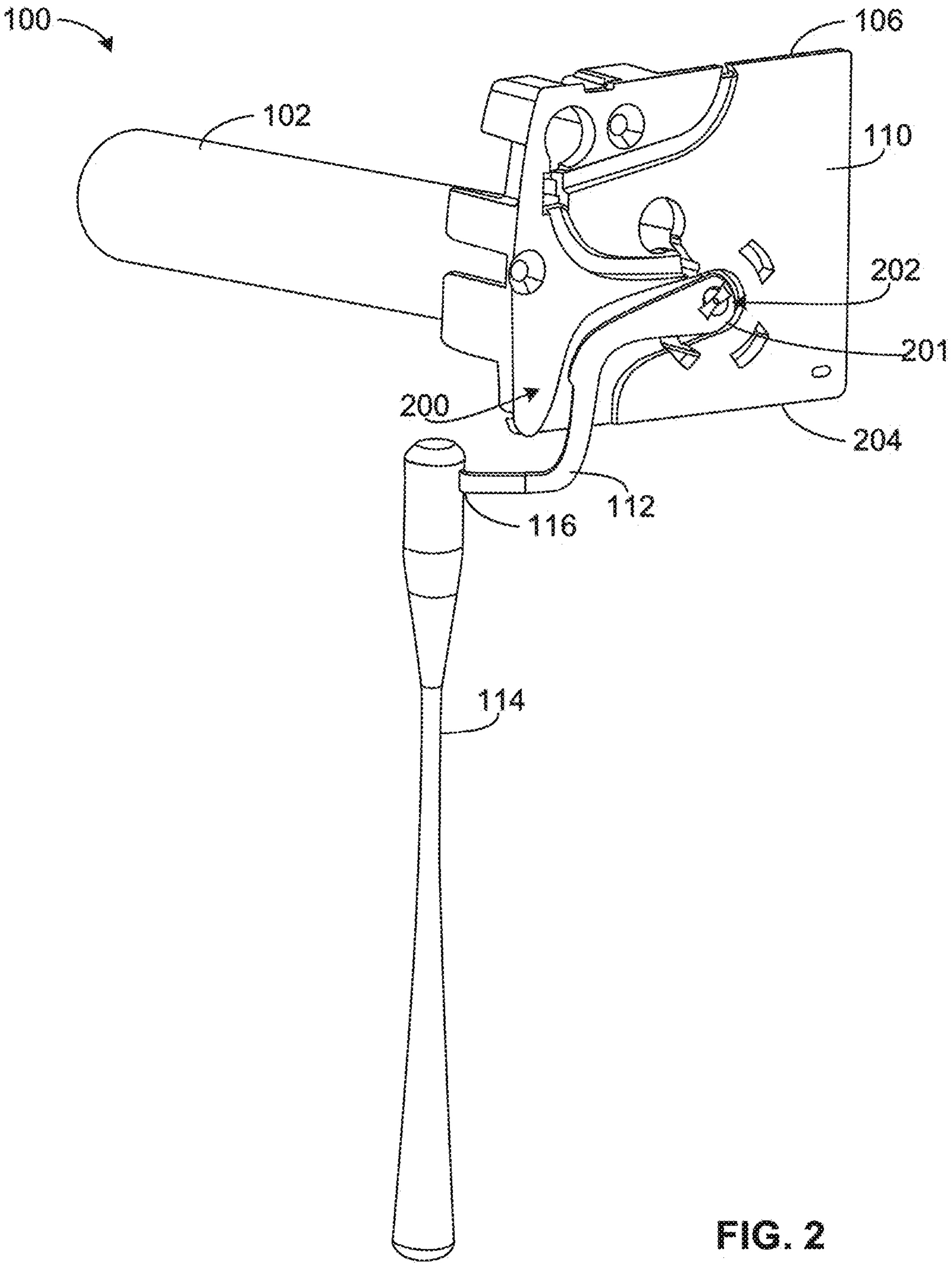
FIG. 2 is another perspective view the motor assembly illustrated in FIG. 1 illustrated at a different angle.

FIG. 2 illustrates another perspective view of example motor assembly 100. As illustrated in the embodiment of FIGS. 1 and 2, example motor assembly 100 may include a control lever 112 (e.g., a lever arm, an actuator arm, an operating element, etc.). Control lever 112 is movable (e.g., rotatable) up or down to activate motor 102. For example, when control lever 112 is moved or rotated in one direction, motor 102 is activated to raise the architectural covering (e.g., by driving output shaft 104 in one direction), and when control lever 112 is moved or rotated in the opposite direction, motor 102 is activated to lower the architectural covering (e.g., by driving output shaft 104 in the other direction). As discussed in further detail herein, control lever 112 may be operatively coupled to an actuator or other operating element at an end of control lever 112 so that movement of control lever 112 rotates the actuator or other operating element that engages one or more switches that selectively activate motor 102. In the illustrated example, control lever 112 is curved (e.g., s-shaped), which enables control lever 112 to extend from below and/or outward from a front cover or headrail of an architectural covering (e.g., as described in conjunction with FIGS. 3 and 19). In other examples, control lever 112 may be straight or shaped differently depending on size and structural constraints. In the illustrated example of FIGS. 1 and 2, motor assembly 100 includes an end plate 106 having a first side 108 and a second side 110 opposite first side 108. As illustrated in FIG. 2, control lever 112 may be disposed within a channel 220 (e.g., a track) formed in second side 110 of end plate 106, discussed in further detail herein.

To move example control lever 112 illustrated in FIGS. 1 and 2, a consumer touchpoint is provided. A consumer touchpoint facilities user interaction with motor assembly 100 to activate motor 102, such as by causing movement of control lever 112 to activate motor 102. In some examples, the consumer touchpoint enables a user to access and/or operate control lever 112 from a distance from control lever 112 (e.g., when motor assembly 100 is located at a height or distance that is not easily accessible by a user). The consumer touchpoint may be coupled to control lever 112 to have more than one degree of freedom, such that movement in one or more directions of the consumer touchpoint causes movement of control lever 112. In the illustrated example, the consumer touchpoint is implemented as a lever actuator 114 in the form of a semi-rigid member, such as a wand or push/pull rod, that enables a user to operate control lever 112 by movement of lever actuator 114 in more than one direction. Lever actuator 114 may be coupled to control lever 112, such as at end 116. A user may move control lever 112 by lifting or lowering (e.g., pulling down on) lever actuator 114. In some examples, when a user moves the consumer touchpoint in one direction, such as by lifting lever actuator 114, control lever 112 is moved upward, which triggers example motor 102 to raise the architectural covering (e.g., while lever actuator 114 is lifted, until lever actuator 114 is lifted a second time, or until lever actuator 114 is moved downward). When the user lowers lever actuator 114, control lever 112 is moved downward, which triggers example motor 102 to lower the architectural covering (e.g., while lever actuator 114 is lowered, until lever actuator 114 is lowered a second time, or until lever actuator 114 is lifted). Alternatively, any other motion may be based on movement of lever actuator 114 (e.g., raise lever actuator 114 to lower the covering). In addition to or as an alternative to triggering motor 102 to raise or lower the architectural covering, one or more gestures may be performed with a consumer touchpoint, such as lever actuator 114 and/or control lever 112, to trigger one or more other operations of motor assembly 100 disclosed further in connection with FIGS. 28-33 and 37 (e.g., setting upper and/or lower limit positions for motor assembly 100). In some examples, control lever 112 triggers motor 102 by activating one or more switches, as described in further detail herein. In other examples, other types of consumer touchpoints may be implemented in addition or as an alternative to lever actuator 114, such as a handle, a rail, a pull cord, a remote control, a bead chain, etc.

Figure 3:
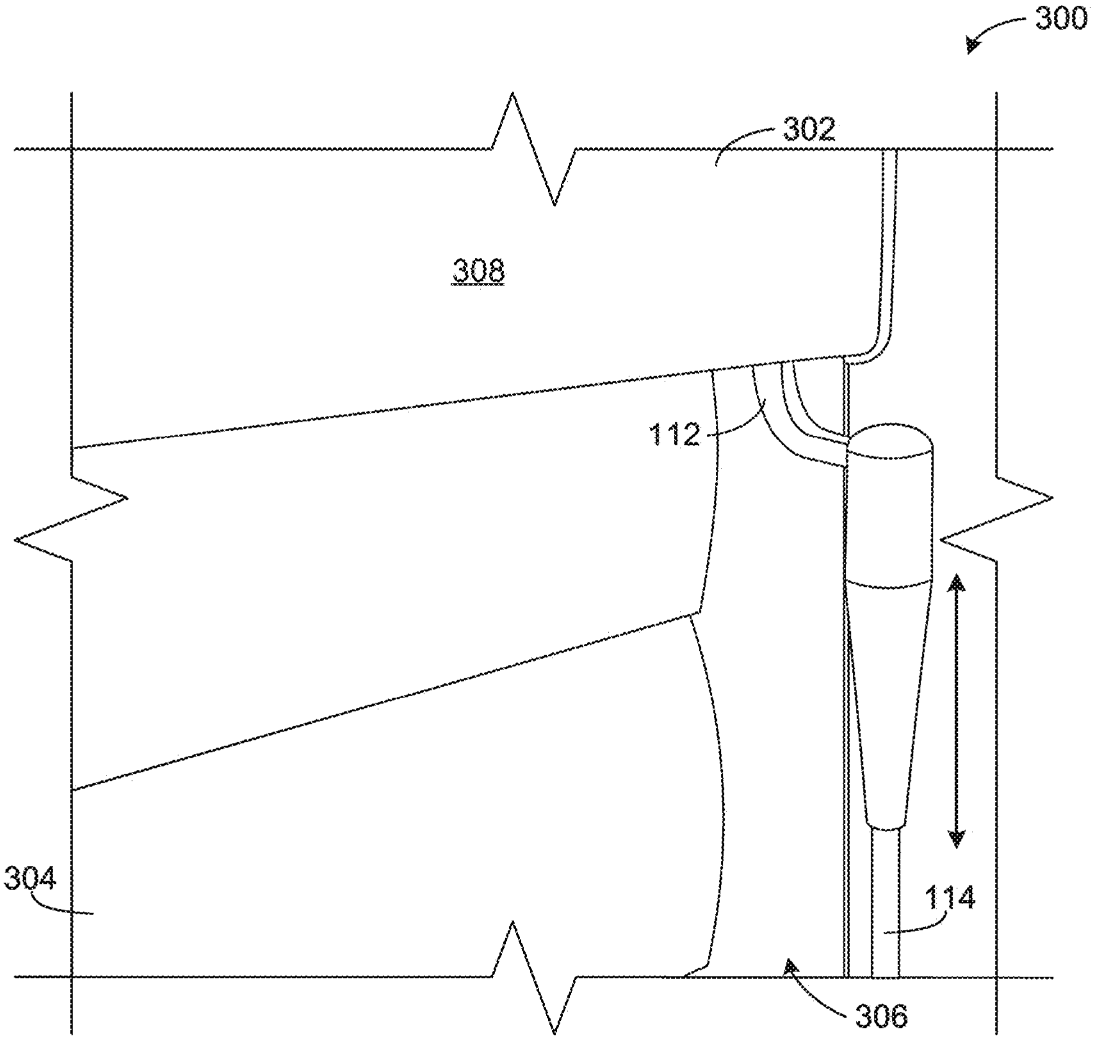
FIG. 3 illustrates an example of an architectural covering that incorporates the motor assembly illustrated in FIG. 1.

Example motor assembly 100 of FIGS. 1 and 2, along with the corresponding architectural covering, can be mounted to or adjacent an architectural structure and/or a frame of an architectural opening, such as a window frame. For example, end plate 106 can be mounted (e.g., via one or more fasteners) to a window frame and/or a headrail or other structure incorporating the architectural covering. FIG. 3 illustrates an example of an architectural covering assembly 300 that incorporates example motor assembly 100 (FIGS. 1 and 2). Architectural covering assembly 300 includes a headrail 302 and a covering 304 (e.g., a shade) that covers an architectural opening 306 (e.g., a window). Motor assembly 100 is disposed behind a front cover 308 (e.g., a piece of trim, a valance, etc.) of headrail 302. In the illustrated example, control lever 112 extends outward from below front cover 308 (e.g., because of the curved shape of control lever 112), and lever actuator 114 hangs down from control lever 112. As mentioned above, in some examples, a user can lift lever actuator 114 (e.g., move lever actuator 114 vertically upward) to trigger motor 102 (FIGS. 1 and 2) to raise covering 304 (e.g., move covering 304 in one direction), or the user can pull down on lever actuator 114 (e.g., move lever actuator 114 vertically downward) to trigger motor 102 to lower covering 304 (e.g., move covering 304 in an opposite direction). In other examples, a user may pull down on lever actuator 114 to trigger motor 102 to raise covering 304 and lift lever actuator 114 to trigger motor 102 to lower covering 304. In still other examples, one or more gestures of a consumer touchpoint, such as control lever 112 and/or lever actuator 114, may trigger one or more other operations of motor assembly 100, as disclosed in further detail herein.

Figure 4:
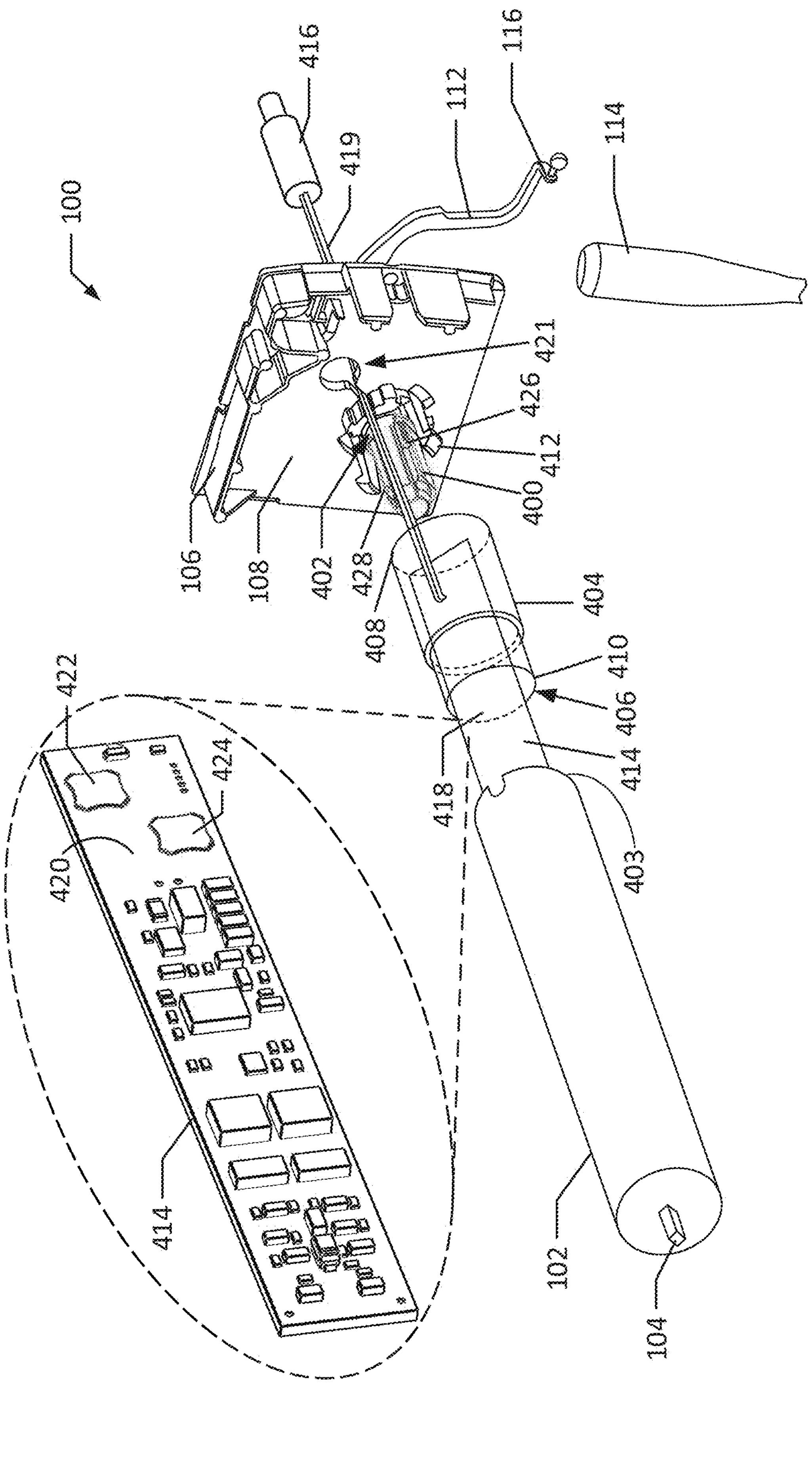
FIG. 4 is a partially exploded view of the motor assembly illustrated in FIG. 1.
Figure 5:
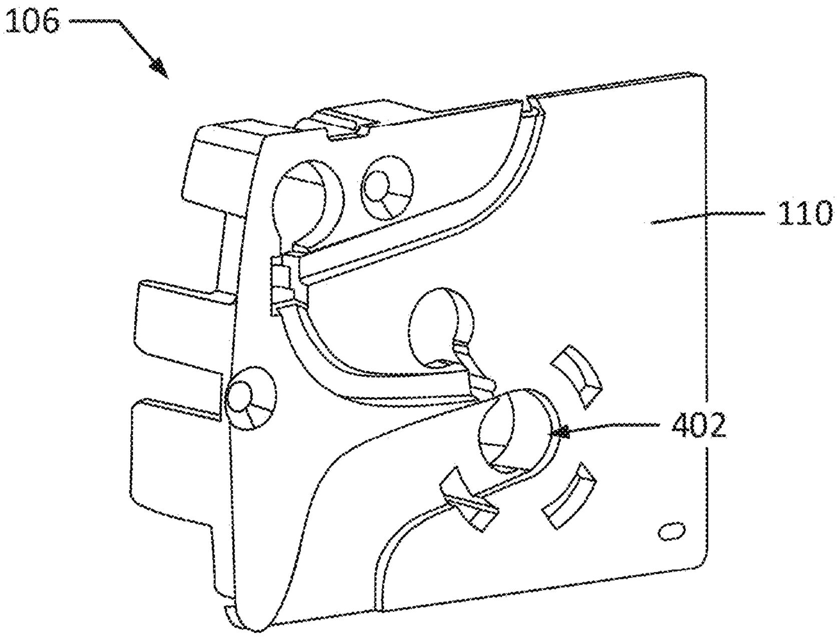
FIG. 5 is a perspective view of an example of an end plate that may be used with the motor assembly illustrated in FIG. 1.
Figure 6:
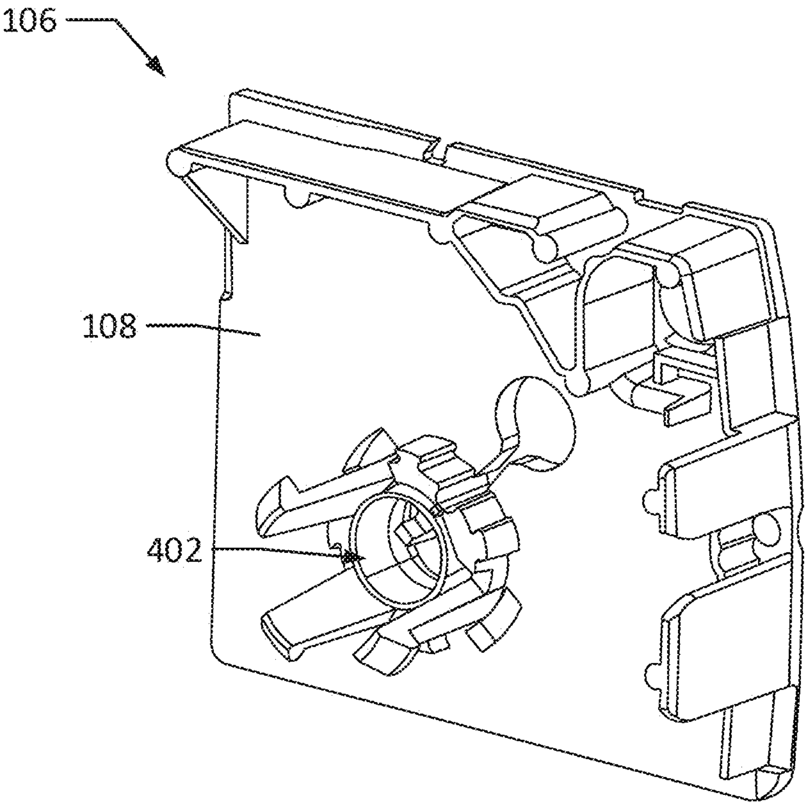
FIG. 6 is another perspective view (from an opposite side) of the end plate illustrated in FIG. 5.

FIG. 4 is a partially exploded view of example motor assembly 100. In the illustrated example of FIG. 4, motor assembly 100 includes an actuator 400 (e.g., a cam axle). In one example embodiment, actuator 400 rotates to activate motor 102 to drive output shaft 104 in one direction or the opposite direction to cause the architectural covering to be moved from one position to another, such as lifted, lowered, moved horizontally, move diagonally, etc. (e.g., by rotating a roller (e.g., a hollow tube) about which the architectural covering is wound or unwound, by rotating a lift rod which causes lift cords to lift or lower a stacking shade, by turning a drive pulley to move a timing belt, cord and/or bead chain to traverse the architectural covering, etc.). Actuator 400 is coupled to control lever 112, such that moving control lever 112, e.g., up or down, moves (e.g., rotates) actuator 400. In other words, control lever 112 extends from actuator 400 and translates movement (e.g., linear movement) into rotational movement of actuator 400. In particular, a first end 201 (FIG. 2) of control lever 112 is coupled to actuator 400 and a second end (end 116) of control lever 112 is coupled to lever actuator 114. Thus, in some examples, control lever 112 converts or translate movement (e.g., linear movement) of lever actuator 114 to movement (e.g., rotational movement) in actuator 400 to activate motor 102. In some examples, when control lever 112 moves, e.g., rotates, actuator 400 in one direction, motor 102 is triggered to raise the architectural covering, and when control lever 112 moves, e.g., rotates, actuator 400 in the opposite direction, motor 102 is triggered to lower the architectural opening. Therefore, control lever 112 rotates actuator 400 in one direction (a first direction) when end 116 is moved vertically upward (e.g., by linear movement of lever actuator 114, causing pivoting of control lever 112 (e.g., pivoting about a pivot axis coincident with rotational axis 706 (FIG. 7) of actuator 400, discussed in further detail here)), and control lever 112 rotates actuator 400 in the other direction (a second direction) when end 116 is moved vertically downward (e.g., by linear movement of lever actuator 114). In the illustrated example, actuator 400 is rotatably coupled to end plate 106. FIGS. 5 and 6 are isolated views of end plate 106. Referring back to FIG. 4, an end of actuator 400 is movably (e.g., rotatably) disposed within an opening 402 (also shown in FIGS. 5 and 6) formed in end plate 106 between first side 108 of end plate 106 and second side 110 of end plate 106. Thus, actuator 400 is supported by end plate 106. Additionally or alternatively, another supporting structure may be utilized to support actuator 400. When motor assembly 100 is assembled, actuator 400 is disposed adjacent an end 403 of motor 102, which enables motor assembly 100 to achieve a relatively small envelope, as discussed herein.

As may be seen in the example embodiment illustrated in FIG. 4, motor assembly 100 may include a housing 404 (e.g., a covering), which is shown as transparent to expose the internal components. Example actuator 400 is disposed within and rotatable within housing 404 when motor assembly 100 is assembled (as depicted in FIG. 1, for example). In the illustrated example, housing 404 is cylindrical and has an opening 406 between first end 408 and second end 410. In other examples, housing 404 may have another shape. Example housing 404 is coupled to and extends from first side 108 of end plate 106. In the illustrated example, first end 408 of housing 404 couples to end plate 106 via a mounting clip 412, which is inserted into opening 406 of housing 404. In other examples, housing 404 may be coupled to end plate 106 using mechanical fastening mechanisms. Motor 102 couples to second end 410 of housing 404 and, thus, is coupled to end plate 106 via housing 404. Motor 102 and housing 404 form a motor assembly housing, which is a substantially continuous cylindrical structure (as illustrated in FIG. 1) coupled to end plate 106.

Figure 7:
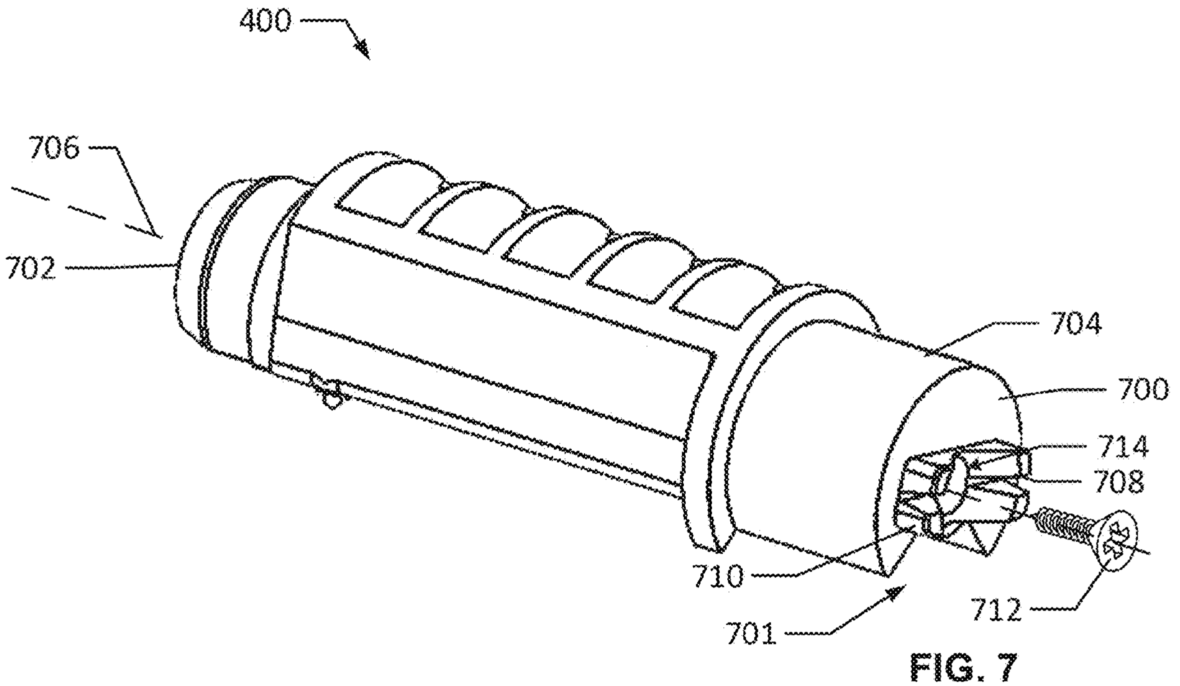
FIG. 7 is a perspective view of an example of an actuator usable with the motor assembly illustrated in FIG. 1.
Figure 8:
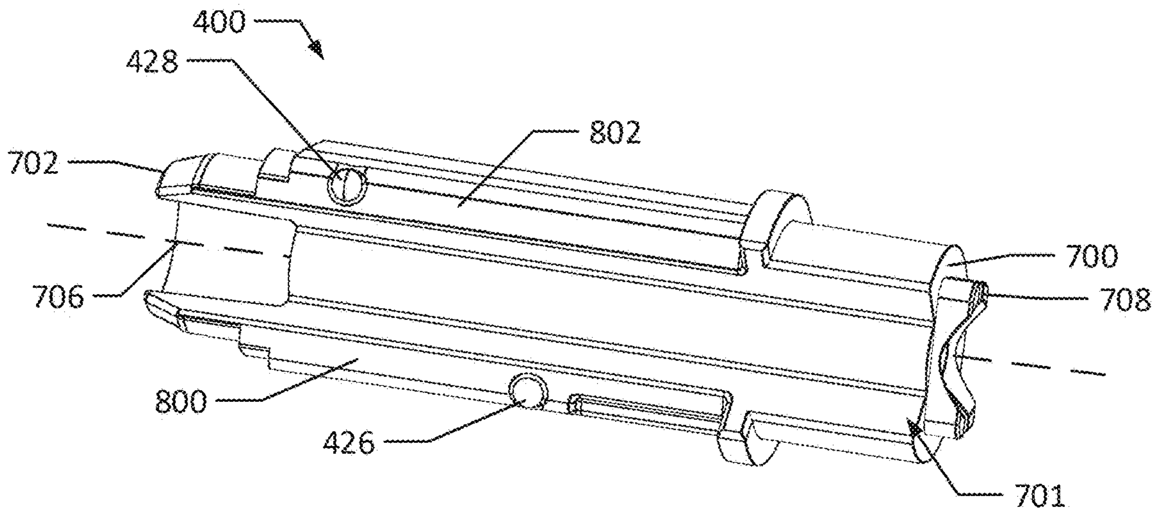
FIG. 8 is another perspective view of the actuator of FIG. 7 illustrated at a different angle.

FIGS. 7 and 8 are isolated views of an example embodiment of an actuator 400. In the illustrated example embodiment, actuator 400 is rotatable and may be used to actuate motor 102 (FIG. 4) to raise the architectural covering, lower the architectural covering, and/or trigger any other operation. In the illustrated example of FIGS. 7 and 8, actuator 400 is a rigid, cylindrical member having lengthwise groove 701 formed along a side of actuator 400 (where first and second surfaces 800, 802 (disclosed in further detail here) are located). In other examples, actuator 400 may have other shapes. Example actuator 400 includes a first end 700 and a second end 702 opposite first end 700. Actuator 400 may include a journal 704 (e.g., a plain bearing, a cylindrical surface) at or near first end 700 of actuator 400. Journal 704 is to be disposed within opening 402 (FIG. 4) in end plate 106 (FIG. 4) and facilitates rotation of actuator 400 (e.g., by forming a bearing). Actuator 400 rotates about axis 706 (a rotational axis). As used herein, "rotate," "rotation" and variations thereof in reference to actuator 400 mean moving or turning about an axis extending through a center or substantial center (e.g., away from an end/edge) of actuator 400. In the illustrated example, axis 706 is a longitudinal axis of actuator 400, which is a lengthwise axis of the actuator 400. Alternatively, actuator 400 may move or turn about another axis or point (e.g., an axis at or near an edge, an axis not extending through actuator 400, an axis that is not a longitudinal axis, etc.).

In the illustrated example of FIGS. 7 and 8, example actuator 400 includes an engagement tab 708 (e.g., a torque feature) extending from first end 700 of actuator 400. Example engagement tab 708 of the illustrated embodiment is to be disposed within an opening 202 in control lever 112 (shown in FIG. 2) and allows coupling of control lever 112 to actuator 400. For example, as illustrated in FIG. 7, engagement tab 708 has four prongs 710 (only one of which is labeled in FIG. 7). A screw 712 is to be screwed into a bore 714 formed in first end 700, which causes prongs 710 to separate or spread out, thereby fastening engagement tab 708 to opening 202 (FIG. 2) in control lever 112 (FIG. 2). Engagement tab 708 is used to transmit torque from control lever 112 (FIG. 2) to actuator 400 and functions as a pivot axis for control lever 112 so that movement of control lever 112 drives rotation of actuator 400 around a rotational axis (e.g., a rotational axis that passes through a pivot axis of control lever 112). Thus, in some examples, control lever 112 is pivotable about rotational axis 706 of actuator 400. Additionally or alternatively, in some examples a chemical fastener such as an adhesive and/or a mechanical fastener(s) may be used to couple actuator 400 to control lever 112 (FIG. 2). In some examples, engagement tab 708 may extend through opening 202 (FIG. 2) and may be coupled to opening 202 via an interference fit (e.g., friction or press fit). Thus, as illustrated in FIG. 4, control lever 112 is coupled to actuator 400 through opening 402 in end plate 106. Control lever 112 extends from first end 700 of actuator 400 in a direction transverse (e.g., perpendicular) to axis 706 (FIG. 7) of actuator 400.

In the illustrated example of FIG. 4, example motor assembly 100 may include a circuit board 414. Circuit board 414 may be disposed within housing 404 (when motor assembly 100 is assembled, as illustrated in FIG. 1, for example). Circuit board 414 has a first side 418 and a second side 420 opposite first side 418. Second side 420 of circuit board 414 is illustrated in the callout shown in FIG. 4. Example circuit board 414 is electrically coupled to motor 102 and includes the electrical components (e.g., an architectural covering controller such as architectural covering controller 2700 of FIG. 27) for operating motor 102. Circuit board 414 and/or motor 102 may be powered by any combination of internal and/or external power line connections, battery(ies), fuel cells, solar panels, wind powered generators, and/or any other power source. In the illustrated example, motor assembly 100 includes a power connector 416, which may be connected to a battery pack, an outlet (e.g., a wall outlet), etc. For example, a battery pack may be located in a headrail of the architectural covering. In some examples, power connector 416 may be adapted for a variety of different setups (e.g., converting from battery to power line). In the illustrated example, power connector 416 is electrically coupled to circuit board 414 via a cord 419. In the illustrated example, cord 419 extends through an opening 421 in end plate 106. In other examples, cord 419 may be routed through other path(s).

In some examples, to activate motor 102 of the example embodiment of FIG. 4, example motor assembly 100 includes two switches: a first switch 422 that, when activated (e.g., a change in state such as opening a switch, closing a switch, etc.), triggers motor 102 to drive output shaft 104 in one direction (e.g., to uncover the architectural structure and/or opening) and a second switch 424 that, when activated, triggers motor 102 to drive output shaft 104 in the other direction (e.g., to cover the architectural structure and/or opening). In other words, in some examples, when first switch 422 is activated, a control signal and/or power is transmitted to motor 102 to drive output shaft 104 in one direction, and when second switch 424 is activated, a control signal and/or power is transmitted to motor 102 to drive output shaft 104 in the opposite direction. First switch 422 and second switch 424 may be implemented by any type of switch or control that may be selectively activated by actuator 400. In the illustrated example, the first and second switches 422, 424 are implemented as snap dome switches (also known as a snap dome or dome switch that include a deformable element that activates a switch when an activation force is applied to the switch). Thus, in some examples, when the activation force is applied to first switch 422 (e.g., when first switch 422 is depressed), motor 102 is activated to drive output shaft 104 in one direction, and when the activation force is applied to second switch 424, motor 102 is activated to drive output shaft 104 in the opposite direction. Alternatively, the switches 422, 424 may be implemented by any type of switch or selectively actuatable control (e.g., a toggle switch, a force sensor that is activated by a sufficient force, a pressure sensor that is activated by a sufficient pressure, a capacitive sensor, a Hall effect sensor that is triggered by a magnet associated with actuator 400, etc.). In the illustrated example of FIG. 4, first and second switches 422, 424 are disposed on second side 420 of circuit board 414. Thus, when motor assembly 100 is assembled, first and second switches 422, 424 are disposed within housing 404 adjacent actuator 400. Groove 701 (FIG. 7) in actuator 400 enables circuit board 414 to be positioned relatively close to actuator 400, such that only a relatively small movement in actuator 400 is used to activate first and second switches 422, 424.

In the illustrated example of FIG. 4, example actuator 400 rotates to activate first switch 422 or second switch 424. For example, when actuator 400 is rotated in one direction, actuator 400 activates first switch 422 (e.g., by engaging first switch 422) and when actuator 400 is rotated in the opposite direction, actuator 400 activates second switch 424 (e.g., by engaging second switch 424). First and second switches 422, 424 are radially spaced from the rotational axis (axis 706 (FIG. 7)) of actuator 400. In some examples, actuator 400 includes engaging features, such as protrusions, configured to activate first and second switches 422, 424 upon engagement with first and second switches 422, 424. For example, actuator 400 may include a first nub 426 (e.g., a protrusion, a cam lobe, an extension, etc.) to activate (e.g., press, engage) first switch 422 and a second nub 428 to activate second switch 424. FIG. 8 shows first nub 426 extending from a first surface 800 of actuator 400 and second nub 428 extending from a second surface 802 of actuator 400. In the illustrated example, first nub 426 (and/or first surface 800) and second nub 428 (and/or second surface 802) are located on opposite sides of a plane containing axis 706. Referring back to FIG. 4, when actuator 400 is rotated in one direction, first nub 426 engages (e.g., contacts and depresses to activate) first switch 422, which may trigger motor 102 to raise the architectural covering (and/or trigger one or more other operations of motor assembly 100 disclosed in further detail herein). When actuator 400 is rotated in the opposite direction, second nub 428 engages second switch 424, which may trigger motor 102 to lower the architectural covering (and/or trigger one or more other operations of motor assembly 100 disclosed in further detail herein). In the illustrated example of FIG. 8, first nub 426 and second nub 428 are offset from each other. In other examples, first nub 426 and second nub 428 may be aligned (e.g., along a same cross-sectional plane). While in the illustrated example of FIG. 4, two switches are implemented, in other examples only one switch may be implemented. For example, actuator 400 may rotate in one direction to engage a switch (e.g., a toggle switch) from a first side and may rotate in the other direction to engage the switch from a second side.

As can be seen in FIG. 4, actuator 400, first and second switches 422, 424 and circuit board 414 are disposed proximate to end 403 of motor 102, which results in a smaller envelope and/or footprint realized by motor assembly 100 as compared to, for example, known motor assemblies that have switches actuated by linear movement and are radially spaced from the motor. Motor 102 and housing 404 form a motor assembly housing (e.g., a substantially continuous cylindrical structure as illustrated in FIG. 1) that incorporates motor 102 and the actuation components including, for example, actuator 400, circuit board 414 and first and second switches 422, 424. In some examples, rotational axis 706 (e.g., the longitudinal axis of actuator 400) is aligned with a longitudinal axis of motor 102 (and/or output shaft 104), which enables a more compact configuration than known motor assemblies. In other examples, rotational axis 706 of actuator 400 and the longitudinal axis of motor 102 may be offset (e.g., axis 706 may be offset and parallel to a longitudinal axis of motor 102 and still within a circumference extending longitudinally from motor 102). Further, by disposing the actuation component(s) adjacent motor 102, less wiring is utilized. For example, unlike known motor assemblies that have switches distanced from the motor and require complex wiring, motor assembly 100 is operable by only one cord 419 entering into housing 404, which supplies power to circuit board 414 and, thus, to first and second switches 422, 424 and motor 102.

Figure 9A:
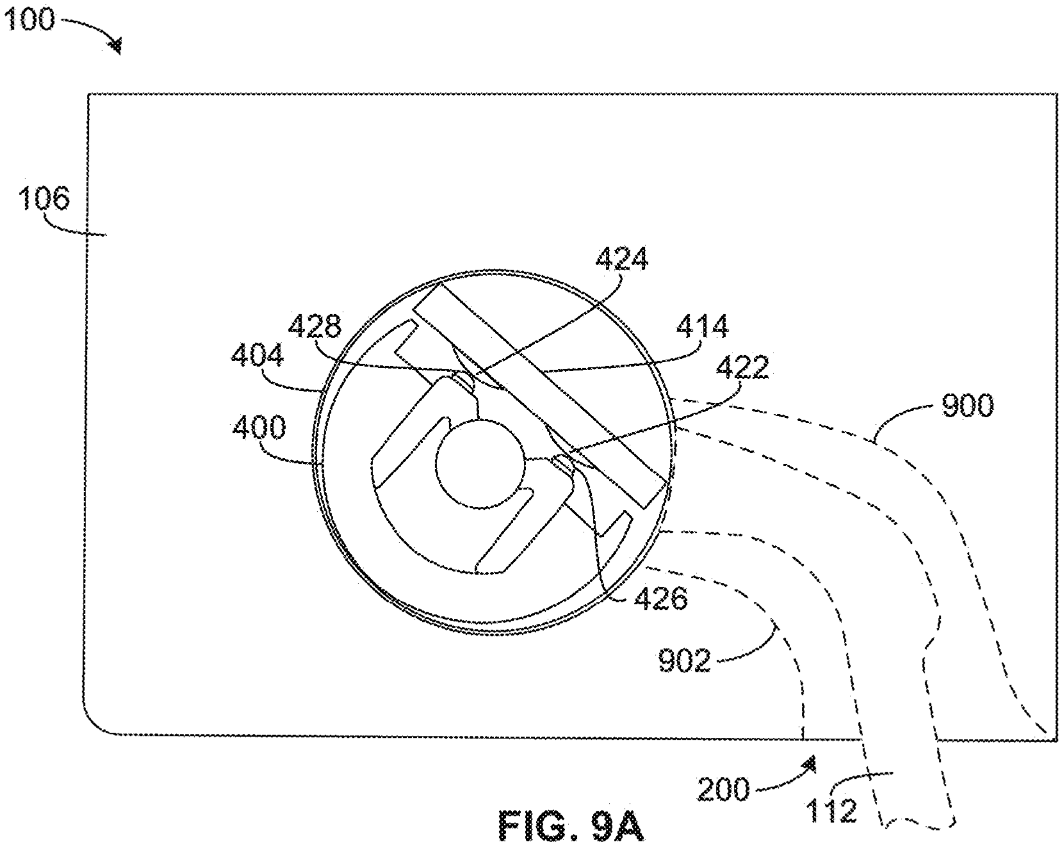
FIG. 9A illustrates the actuator of FIG. 7 in a neutral position.
Figure 9B:
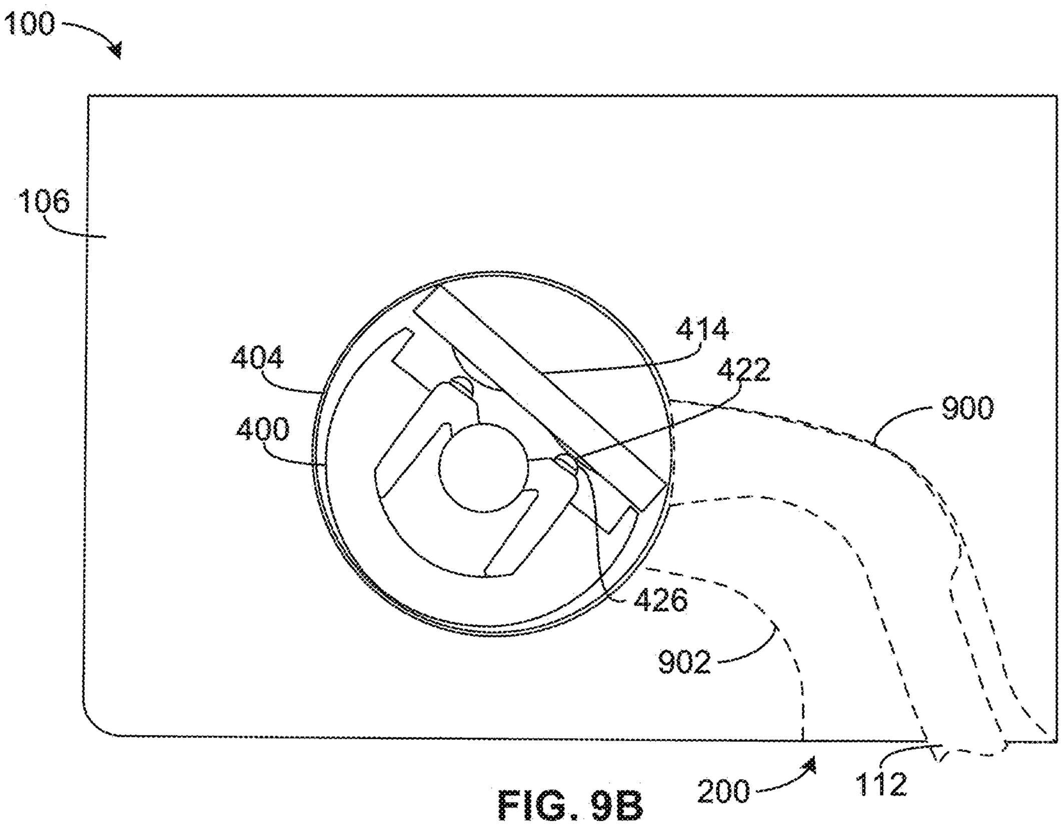
FIG. 9B illustrates the actuator of FIG. 7 as rotated in a first direction in which the actuator triggers a first example of a switch.
Figure 9C:
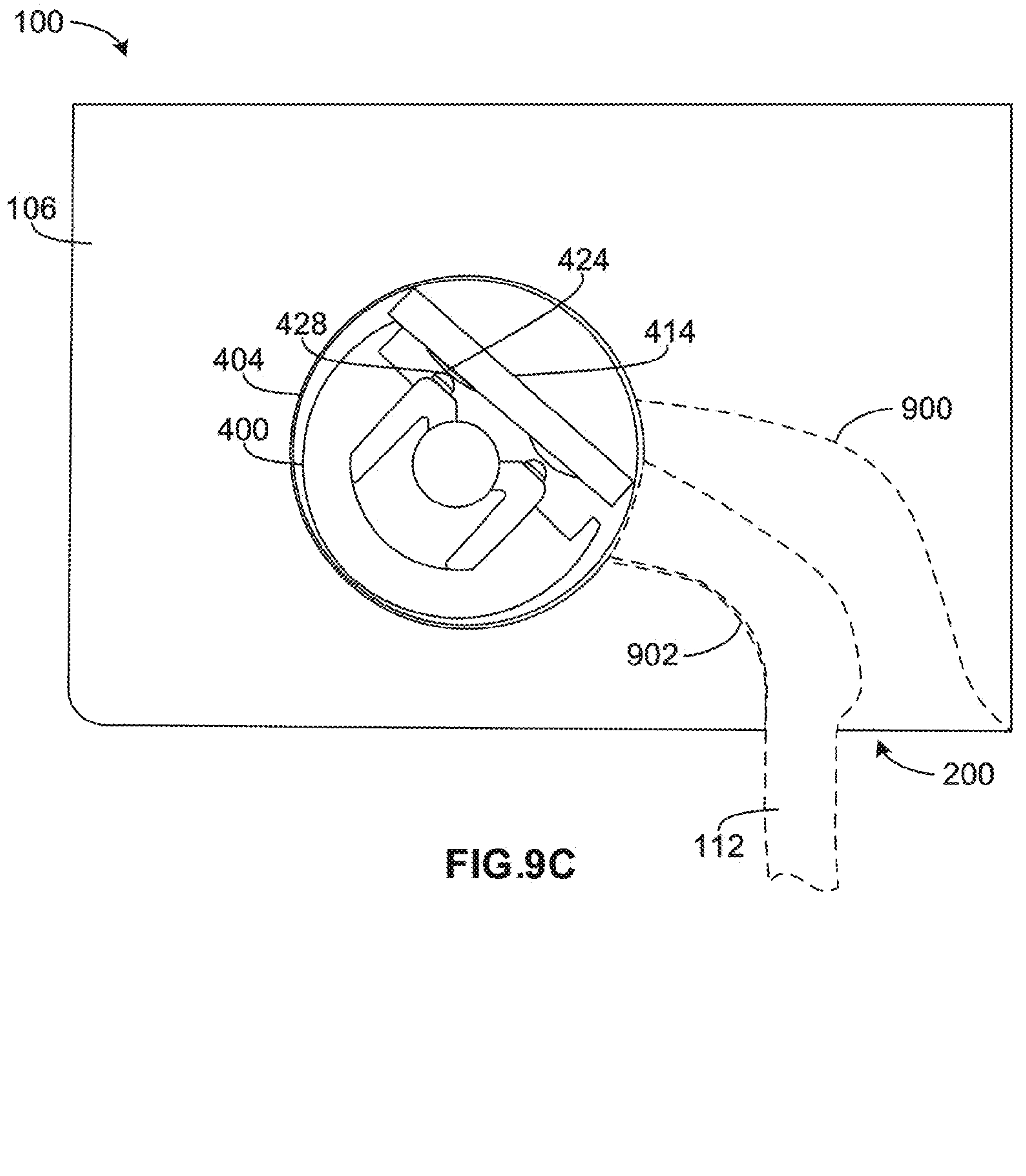
FIG. 9C illustrates the actuator of FIG. 7 as rotated in a second direction in which the actuator triggers a second example of a switch.

FIGS. 9A-9C are cross-sectional views of example motor assembly 100 along housing 404 viewed toward end plate 106. In the illustrated example of FIG. 9A, control lever 112 and actuator 400 are in a central or neutral position. In the neutral position, first and second switches 422, 424 are not engaged (e.g., not depressed) and, thus, are not activated. In some examples, when neither switch 422, 424 is activated, motor 102 (FIG. 4) is not activated and the corresponding architectural covering remains idle. In one embodiment, when a user desires to raise the architectural covering, the user raises (e.g., pushes up on) lever actuator 114 (FIG. 1), which pivots control lever 112 and thereby rotates actuator 400 in a first direction (e.g., the counter-clockwise direction in FIG. 9B), as illustrated in FIG. 9B. In the position illustrated in FIG. 9B, actuator 400 has been rotated in the first direction from the neutral position, such that first nub 426 is engaged with (e.g., depresses) first switch 422, which triggers activation of motor 102 (FIG. 1) to raise the corresponding architectural covering. In some examples, motor 102 continues to raise the corresponding architectural covering until the user releases lever actuator 114, at which point lever actuator 114 moves back to the neutral position and motor 102 is deactivated. In other examples, motor 102 continues to raise the corresponding architectural covering even after the user releases lever actuator 114. In some such examples, one or more other gestures may be used to cease activation of motor 102. Similarly, in some examples, when a user desires to lower the architectural covering, the user pulls lever actuator 114 (FIG. 1) downward, which rotates control lever 112 and actuator 400 in a second opposite direction (e.g., the clockwise direction in FIG. 9C), as illustrated in FIG. 9C. In the position illustrated in FIG. 9C, actuator 400 has been rotated in the second direction from the neutral position, such that second nub 428 is engaged with (e.g., depresses) second switch 424, which triggers activation of motor 102 (FIG. 1) to lower the corresponding architectural covering. In some examples, motor 102 continues to lower the corresponding architectural covering until the user releases lever actuator 114, at which point lever actuator 114 moves back to the neutral position and motor 102 is deactivated. In other examples, motor 102 continues to lower the corresponding architectural covering even after the user releases lever actuator 114. In some such examples, one or more other gestures may be used to cease activation of motor 102. In some examples, first and second switches 422, 424 provide a counter-force to bias actuator 400 to rotate back to the neutral position (FIG. 9A) when lever actuator 114 (FIG. 1) is released. Additionally or alternatively, in some examples a spring, flexible element, or other biasing element is provided to bias actuator 400 to the neutral position when lever actuator 114 is not operated. An example spring that may be used with an actuator is disclosed in further detail in conjunction with FIGS. 10A, 10B, and 11. In some examples, in the neutral position (as illustrated in FIG. 9A), first and second nubs 426, 428 are in contact with but not depressing (e.g., activating) first and second switches 422, 424. This contact holds actuator 400 in the neutral position. In other examples, in the neutral position, there may be a gap between first nub 426 and first switch 422 and/or between second nub 428 and second switch 424. In some examples, actuator 400 is balanced in the neutral position (e.g., based on the force from control lever 112 and/or lever actuator 114) and returns to the neutral position upon release of lever actuator 114.

While in the illustrated example of FIG. 4 first and second switches 422, 424 are coupled to (e.g., mounted on) circuit board 414, in other examples, first and second switches 422, 424 may be coupled to a different structure (e.g., a mounting plate, an inside surface of housing 404, etc.) separate from circuit board 414. In some instances, disposing first and second switches 422, 424 directly on circuit board 414 results in a more compact assembly, thereby reducing the overall footprint or envelope of motor assembly 100. In some examples, other types of switches are implemented in addition to or as an alternative to first and second switches 422, 424. In some examples, motor 102 may be separate from (e.g., distanced from, disposed in another location relative to) actuator 400 and first and second switches 422, 424. In other words, the motor control component(s) (e.g., actuator 400, first and second switches 422, 424, and/or control lever 112) may be disposed in another location, separate from motor 102 (and electrically connected via one or more wires, for example).

As illustrated in FIGS. 9A-9C, control lever 112 is disposed within channel 200, which is formed in second side 110 (FIG. 2) of end plate 106. In FIGS. 9A-9C, control lever 112 and channel 200 are shown in dashed lines. In the illustrated example, channel 200 has a shape accommodating, e.g., corresponding to, the shape of control lever 112. Channel 200 is defined by an upper wall 900 and a lower wall 902. Upper and lower walls 900, 902 prevent control lever 112 from over-rotating in either direction, thereby protecting first and second switches 422, 424 from being over-pressed (which could otherwise result in damage to first and/or second switches 422, 424 and/or to circuit board 414) by first and second nubs 426, 428. For instance, as illustrated in FIG. 9B, when control lever 112 is rotated upwards, control lever 112 engages upper wall 900 as first nub 426 engages first switch 422. Similarly, when control lever 112 is rotated downwards, as illustrated in FIG. 9C, control lever 112 engages lower wall 902 as second nub 428 engages second switch 424. In other examples, other stopping structure(s) (e.g., a tab) may be used in addition to or as an alternative to upper wall 900 and/or lower wall 902 to prevent control lever 112 and/or actuator 400 from rotating actuator 400 beyond a desired limit in either direction.

While, in the illustrated examples of FIGS. 9C-9C, control lever 112 effects rotation of actuator 400 (and, thus, activates motor 102 (FIG. 1)), in other examples other structures may effect rotation of actuator 400. For example, in addition to or as an alternative to control lever 112, a wheel with a pull cord may be coupled to actuator 400. Pulling on the cord in one direction or the other rotates actuator 400, thereby activating motor 102 (FIG. 1) to raise or lower the architectural covering (and/or triggers one or more other operations of motor assembly 100, as disclosed in further detail herein). In another example, a rotatable knob may be coupled to actuator 400 and used to rotate actuator 400.

In some aspects of this disclosure, a spring, flexible element, or other biasing element may be provided to bias the actuator to the neutral position when the lever actuator is not operated. For example, a spring may be disposed between the actuator and the housing of the actuator. As such, if the lever actuator is moved to rotate the actuator (e.g., to activate one of the switches) and then released, the spring biases the actuator (and, thus, the control lever and the lever actuator) back to the neutral position where neither switch is activated. In some examples, such as with a heavier lever actuator that may tend to pull/rotate the actuator in one direction, using a spring or other flexible biasing member helps urge the actuator, control lever, and lever actuator back to the neutral position.

Figure 10A:
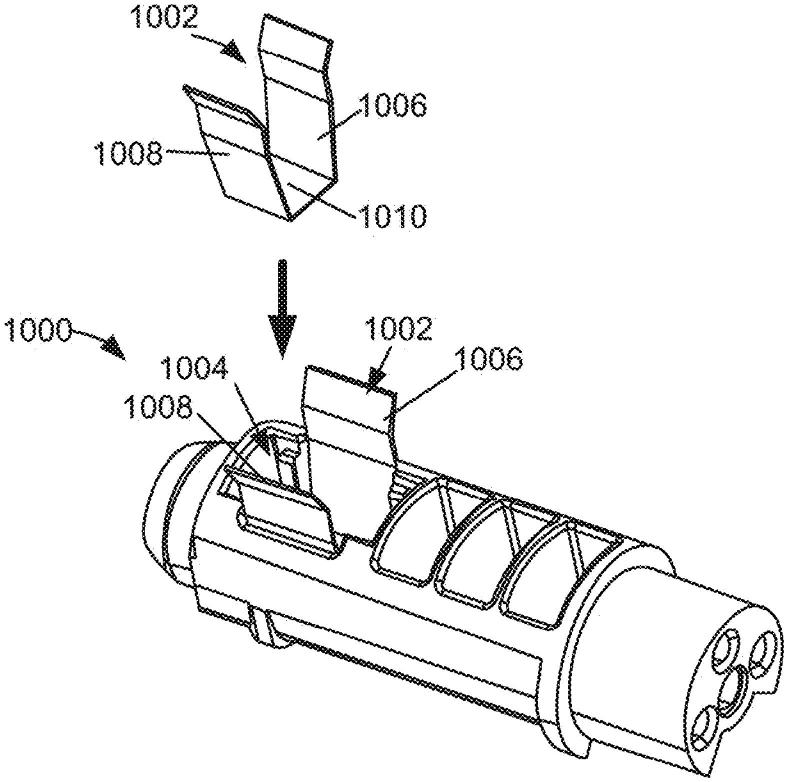
FIG. 10A is a perspective view of another example of an actuator and a spring usable with the motor assembly illustrated in FIG. 1.
Figure 10B:
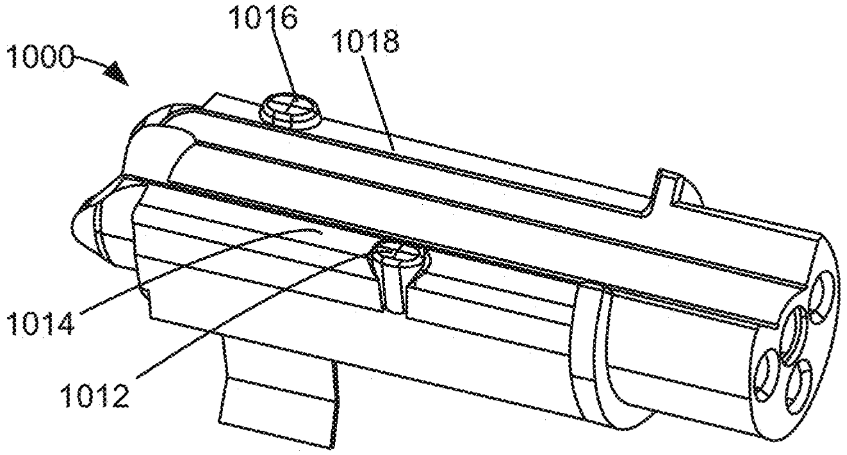
FIG. 10B is another perspective view of the actuator of FIG. 10A illustrated at a different angle.

For example, FIGS. 10A and 10B illustrate another example of an actuator 1000 that may be implemented with motor assembly 100 (in place of actuator 400 (FIG. 4)) and uses an example spring 1002 to bias actuator 1000 to a neutral position. As mentioned above, in some examples, using a spring or other flexible biasing member helps hold and/or center control lever 112 (FIG. 1) in the neutral or central position, which may be advantageous for use with heavier lever actuators that may tend to move/pull control lever 112 downward. Spring 1002 is shown twice in FIG. 10A: once in an isolated view away from actuator 1000 and once in a cavity 1004 (e.g., a notch) formed in a side of actuator 1000. Spring 1002 is a flexible C- or U-shaped structure having a first flexible arm 1006, a second flexible arm 1008, and a connector plate 1010 connecting first and second flexible arms 1006, 1008. First and second flexible arms 1006, 1008 may be compressed or pressed together to insert spring 1002 into cavity 1004. In some examples, once spring 1002 is released in cavity 1004, the biasing force of first and second flexible arms 1006, 1008 holds spring 1002 (e.g., via frictional force) in cavity 1004. Additionally or alternatively, any mechanical and/or chemical (e.g., an adhesive) fastener may be used to hold spring 1002 in cavity 1004. As illustrated in FIG. 10A, when spring 1002 is disposed in cavity 1004, first and second arms 1006, 1008 of spring 1002 extend outward from cavity 1004.

As illustrated in FIG. 10B, the actuator 1000 includes a first nub 1012 extending from a first surface 1014 of actuator 1000 and a second nub 1016 extending from surface 1018 of actuator 1000. First and second nubs 1012, 1016 are located in substantially the same locations as first and second nubs 426, 428 of actuator 400 (FIG. 8), and may be used to similarly engage first and second switches 422, 424, respectively. However, first and second nubs 1012, 1016 of actuator 1000 are shaped differently than first and second nubs 426, 428. In particular, unlike the dome-shaped nubs of actuator 400 (FIG. 8), first and second nubs 1012, 1016 of actuator 1000 are substantially flat or have a planar surface. Actuator 400 and/or any other actuator disclosed herein may use similarly-shaped nubs. In some examples, using a planar or flat nub results in more surface area contact between the nub and the respective switch. Further, using flat nubs, which have larger contact areas, may enable lower manufacturing tolerances. For example, if during manufacturing or assembly of the motor assembly the centers of first and second switches 422, 424 are not aligned with the centers, respectively, of first and second nubs 1012, 1016, the larger surface areas of first and second nubs 1012, 1016 enable the first and second nubs 1012, 1016 to still contact the first and second switches 422, 424 during use. In other examples, the actuator 1000 may have other shaped nubs.

Figure 11:
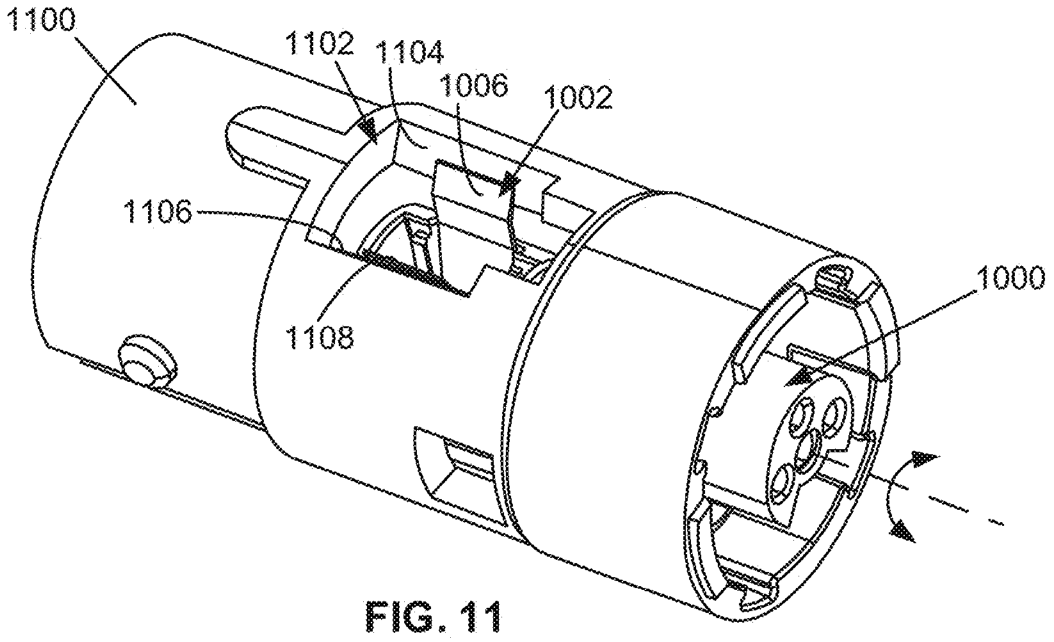
FIG. 11 illustrates the actuator and the spring of FIG. 10A disposed in a housing where the spring interacts with the housing to bias the actuator to a neutral position.

FIG. 11 shows actuator 1000 disposed inside a housing 1100. Housing 1100 may be used instead of housing 404 (FIG. 4), for example. In the illustrated example, housing 1100 includes an opening 1102. First flexible arm 1006 of spring 1002 engages a first side wall 1104 defining a portion of opening 1102. Similarly, second flexible arm 1008 of spring 1002 engages a second side wall 1106 defining a portion of opening 1102 opposite first side wall 1104. Therefore, if actuator 1000 is rotated in either direction, first or second flexible arms 1006, 1008 of spring 1002 bias actuator 1000 back to a center or neutral position. Thus, in this example, first and second switches 422, 424 may still provide tactile feel to a user interacting with lever actuator 114, whereas spring 1002 provides the return or biasing force to move actuator 1002, control lever 112, and lever actuator 114 back to the neutral position.

In the illustrated example, each of first and second flexible arms 1006, 1008 includes a curve or profile that matches the angle or taper of first and second side walls 1104, 1106, respectively. In other examples, first and/or second flexible arms 1006, 1008 may be shaped differently. Further, in other examples, other types of springs may be used. For example, one or more circular torsion springs may be partially wrapped around actuator 1000 and be otherwise arranged to bias actuator 1000 to the neutral position.

Figure 12:
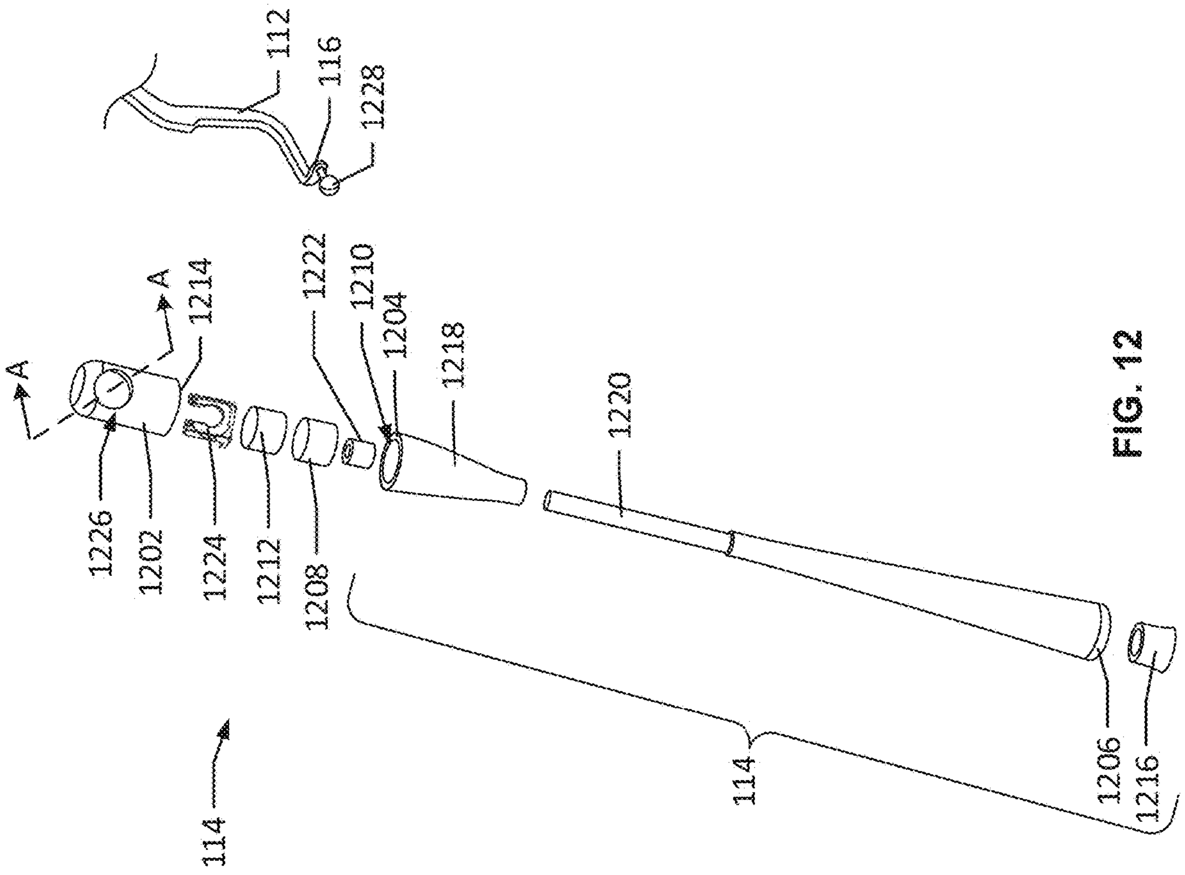
FIG. 12 is an exploded view of an example of a lever actuator and an example of an end joiner used with the motor assembly of FIG. 1.

FIG. 12 is an exploded view of example lever actuator 114 and an end joiner 1202. As mentioned above, in some examples, lever actuator 114 may move or rotate control lever 112 to activate motor 102 (FIG. 1) to raise or lower the architectural covering. In some instances, motor assembly 100 (FIG. 1) may be located at a height that is inconvenient and/or impossible for user to reach control lever 112. Thus, lever actuator 114 extends to a height that enables a user to activate motor assembly 100 while, for example, standing below motor assembly 100. Thus, lever actuator 114 provides an extension to a user to effect movement of the control lever 112. Lever actuator 114 may have different lengths depending on the location (e.g., height) where motor assembly 100 is to be installed, for example.

Figure 13:
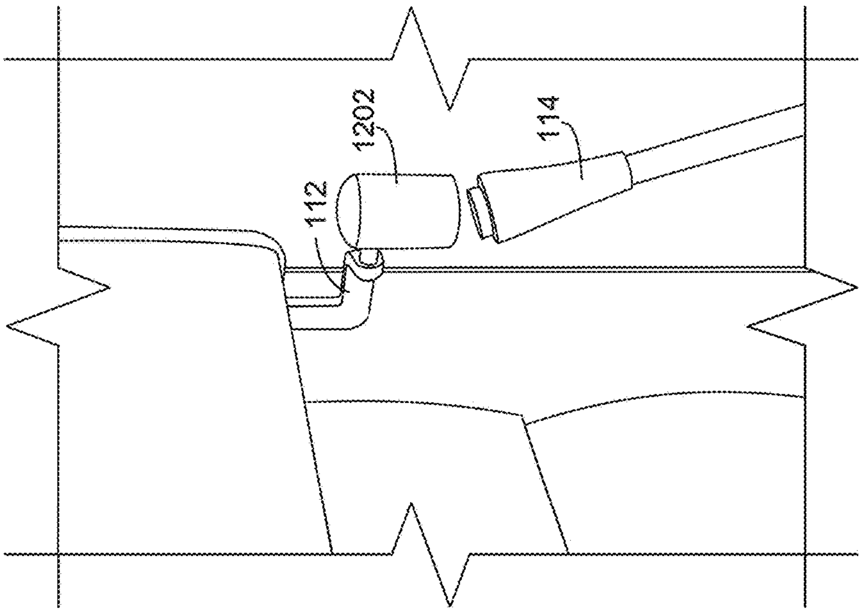
FIG. 13 illustrates the example lever actuator of FIG. 12 disconnected from the end joiner.

In some examples, lever actuator 114 is detachable (e.g., removably couplable) from control lever 112 (FIG. 1) upon application of excessive force. Thus, lever actuator 114 can be detached from motor assembly 100 (FIG. 1). In some examples, lever actuator 114 removably couples to an end joiner 1202 (e.g., a connector), which is coupled to end 116 of control lever 112. In other words, end joiner 1202 is to remain coupled to control lever 112 and lever actuator 114 is detachably coupled to end joiner 1202 and, thus, control lever 112. FIG. 13 shows lever actuator 114 disconnected from end joiner 1202. This disconnection enhances safety to the user and prevents damage to motor assembly 100 (FIG. 1) and the architectural covering itself. For instance, if excessive force is applied to the lever actuator 114 and/or the lever actuator otherwise gets snagged or caught, lever actuator 114 can easily disconnect from control lever 112. Additionally, this disconnection prevents significant damage being caused to the parts of motor assembly 100 (FIG. 1) if an excessive force is applied to lever actuator 114.

In the illustrated example of FIG. 12, lever actuator 114 has a first end 1204 (e.g., a top end) and a second end 1206 (e.g., a bottom end) opposite first end 1204. A first magnet 1208 is coupled to first end 1204 of lever actuator 114. In particular, in the illustrated example, first magnet 1208 is to be disposed within an opening 1210 (e.g., a bore) formed in first end 1204 of lever actuator 114. In some examples, first magnet 1208 is coupled to opening 1210 via an interference fit. Additionally or alternatively, in some examples a chemical fastener such as an adhesive and/or a mechanical fastener (s) may be used to couple first magnet 1208 to opening 1210. In the illustrated example, a second magnet 1212 is coupled to a bottom end 1214 of end joiner 1202. First and second magnets 1208, 1212 magnetically couple lever actuator 114 to end joiner 1202. Therefore, if an excessive force is applied to lever actuator 114 (e.g., a force that overcomes the magnetic coupling force between first and second magnets 1208, 1212), lever actuator 114 disconnects from end joiner 1202 to prevent damage to motor assembly 100 (FIG. 1).

If lever actuator 114 is disconnected from end joiner 1202, lever actuator 114 can be recoupled to end joiner 1202 by bringing first end 1204 of lever actuator 114 in close proximity to end joiner 1202 (e.g., as illustrated in FIG. 13), such that first and second magnets 1208, 1212 magnetically couple. While in the illustrated example of FIG. 12 two magnets (first magnet 1208 and second magnet 1212) are employed, in other examples, one of the magnets may be replaced by a metal element to which the other magnet is attracted. In other examples, other types of fastening mechanisms (e.g., a hook and loop fastener, a hook and/or latch with a sacrificial retainer (e.g., a shear pin), etc.) may be used to detachably couple lever actuator 114 to control lever 112.

In the illustrated example of FIG. 12, lever actuator 114 includes a cap 1216 coupled to second end 1206 of lever actuator 114. In the illustrated example, lever actuator 114 is constructed of multiple pieces or parts that are coupled together. For example, lever actuator 114 may be constructed of a first section 1218 and a second section 1220 (e.g., a handle) that are coupled together. In some examples, first section 1218 and second section 1220 are coupled by a crimp 1222. In other examples, lever actuator 114 may be constructed of a substantially unitary piece or structure. In the illustrated example, end joiner 1202 also includes a retainer 1224 (e.g., a clip), discussed in further detail below in conjunction with FIG. 14.

Figure 14:
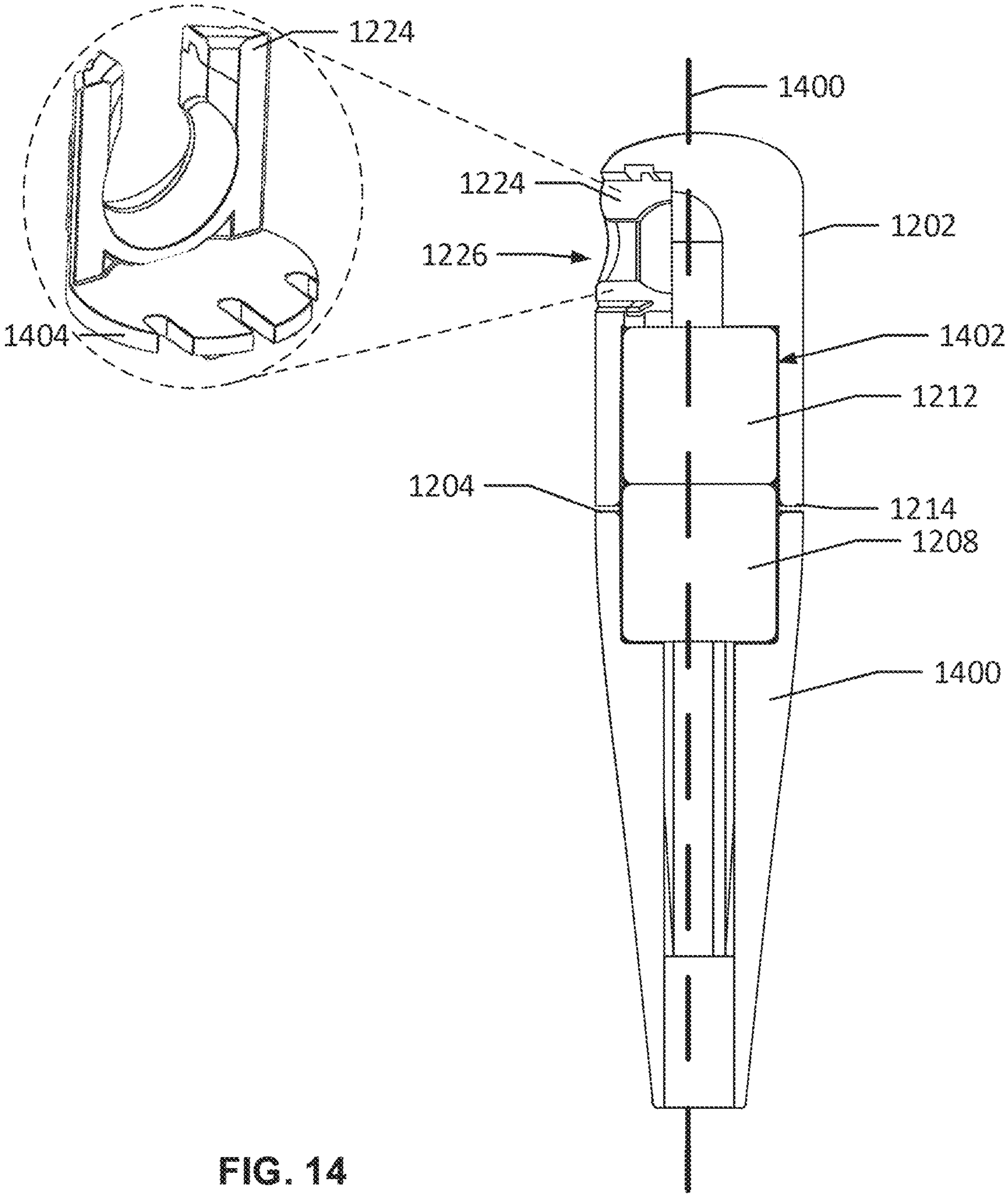
FIG. 14 is a cross-sectional view of the lever actuator and the end joiner of FIG. 12 taken along line A-A of FIG. 12.

In the illustrated example of FIG. 12, end joiner 1202 includes a socket 1226 (e.g., a cavity, a bore, an opening, etc.). Socket 1226 receives a connector 1228 on end 116 of control lever 112. In some examples, connector 1228 enables end joiner 1202 (and, thus, lever actuator 114) to rotate in one or more degrees of freedom with respect to control lever 112. For example, in the end of FIG. 12, connector 1228 is implemented as a ball (e.g., a sphere). FIG. 14 is a cross-sectional view along line A-A in FIG. 12 showing lever actuator 114 coupled to end joiner 1202. In the illustrated example, first and second magnets 1208, 1212 are magnetically coupled. In the illustrated example, socket 1226 extends into a side of end joiner 1202 in a direction that is transverse (e.g., perpendicular) to a longitudinal axis 1400 of lever actuator 114. In other examples, socket 1226 may be formed in another location on end joiner 1202. When connector 1228 of control lever 112 (FIG. 12) is inserted into socket 1226, connector 1228 and socket 1226 form a joint (e.g., a ball joint), which enables lever actuator 114 to rotate (e.g., pivot) in multiple directions on connector 1228. As such, end joiner 1202 is rotatably coupled to connector 1228 to have more than one degree of freedom. In other examples, connector 1228 and socket 1226 may form a fixed joint, such that end joiner 1202 is not rotatable or only partially rotatable (e.g., along one axis) relative to control lever 112.

In some examples, to retain connector 1228 within socket 1226, end joiner 1202 may include a retainer 1224, which is illustrated in FIGS. 12 and 14. An enlarged perspective view of the retainer 1224 is illustrated in the callout in FIG. 14. During assembly, connector 1228 (FIG. 12) is inserted into socket 1226 and retainer 1224 is inserted into socket 1226 through an opening 1402 formed in bottom end 1214 of end joiner 1202. Once retainer 1224 is disposed in socket 1226, retainer 1224 prevents connector 1228 (FIG. 12) from being removed from socket 1226. In other words, retainer 1224 fixedly couples end joiner 1202 to connector 1228 (FIG. 12) and, thus, to control lever 112. In the illustrated example, retainer 1224 includes bottom plate 1404. In some examples, bottom plate 1404 acts as a barrier to block any excess adhesive (which may be used to couple second magnet 1212 to end joiner 1202) from passing into socket 1226. In other examples, retainer 1224 may not include bottom plate 1404. In other examples, connector 1228 may be retained within socket 1226 without retainer 1224 or with another retaining feature.

After retainer 1224 is inserted into socket 1226, second magnet 1212 may be disposed into opening 1402, as illustrated in FIG. 14. In some examples, second magnet 1212 is coupled to opening 1402 via an interference fit. Additionally or alternatively, in some examples a chemical fastener such as an adhesive and/or a mechanical fastener(s) may be used to couple second magnet 1212 to opening 1402.

In the illustrated example of FIG. 14, first magnet 1208 extends above or beyond first end 1204 of lever actuator 114, and second magnet 1212 is disposed below or is recessed from bottom end 1214 of end joiner 1202. As a result, when lever actuator 114 is coupled to end joiner 1202, first magnet 1208 extends into opening 1402 in end joiner 1202, thereby enabling first end 1204 of lever actuator 114 and bottom end 1214 of end joiner 1202 to be relatively close, which results in a substantially smooth and aligned lateral surfaces of lever actuator 114 and end joiner 1202.

Figure 15:
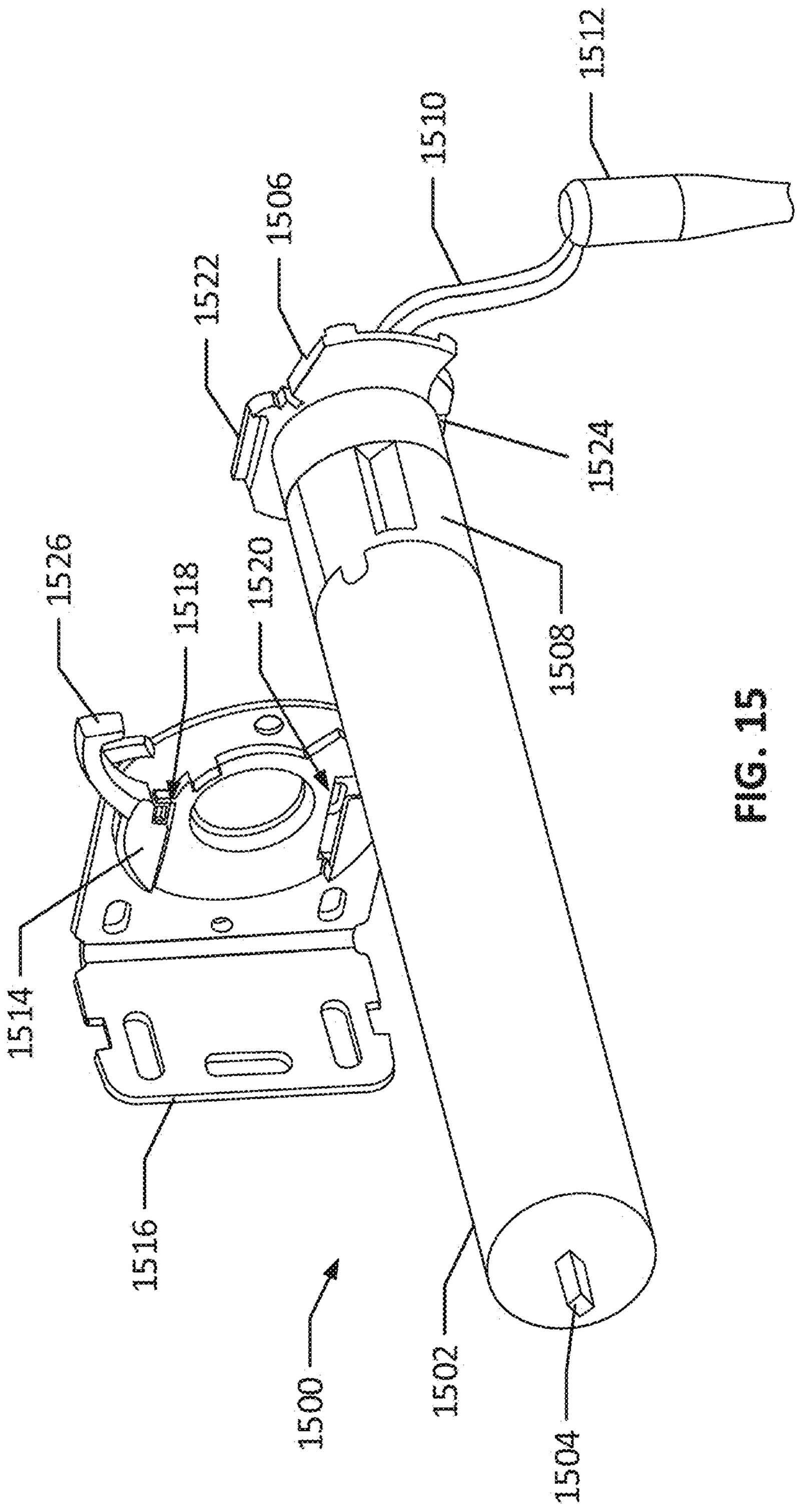
FIG. 15 illustrates another example of a motor assembly for an architectural covering and an example of a cassette mounted to an example of a bracket constructed in accordance with the teachings of this disclosure.

FIG. 15 illustrates another example architectural covering motor assembly 1500 constructed in accordance with the teachings of this disclosure. Similar to motor assembly 100 of FIG. 1, motor assembly 1500 of FIG. 15 includes a motor 1502 having an output shaft 1504, an end plate 1506, a housing 1508 (e.g., in which an actuator, a circuit board, and/or one or more switches are disposed for activating motor 1502), a control lever 1510 and a lever actuator 1512. Example motor assembly 1500 operates substantially the same as motor assembly 100 of FIG. 1, in that lever actuator 1512 may be moved up or down to rotate control lever 1510 and trigger motor 1502 to raise an architectural covering, lower an architectural covering, and/or perform one or more other operations of/on an architectural covering. Thus, to avoid redundancy, a description of these parts and functions is not repeated.

Figure 16:
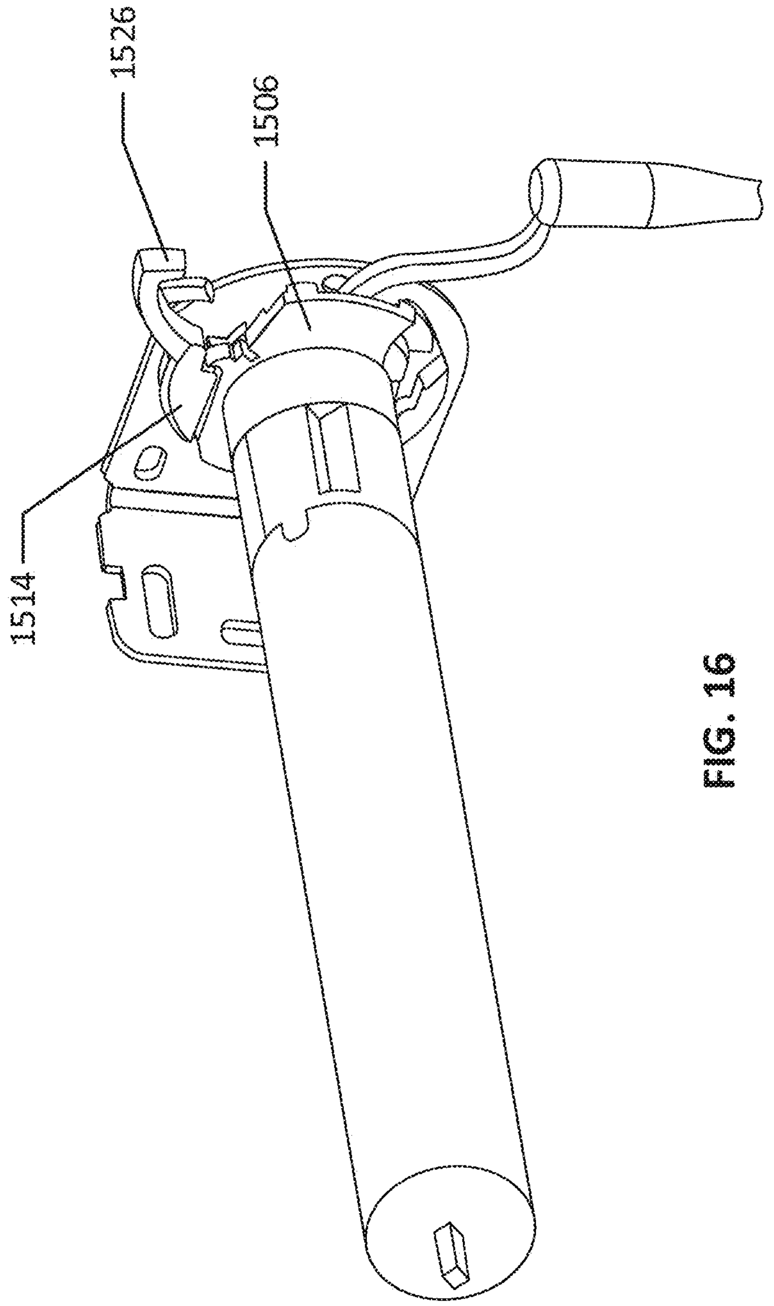
FIG. 16 illustrates the motor assembly of FIG. 15 inserted into the cassette.
Figure 17:
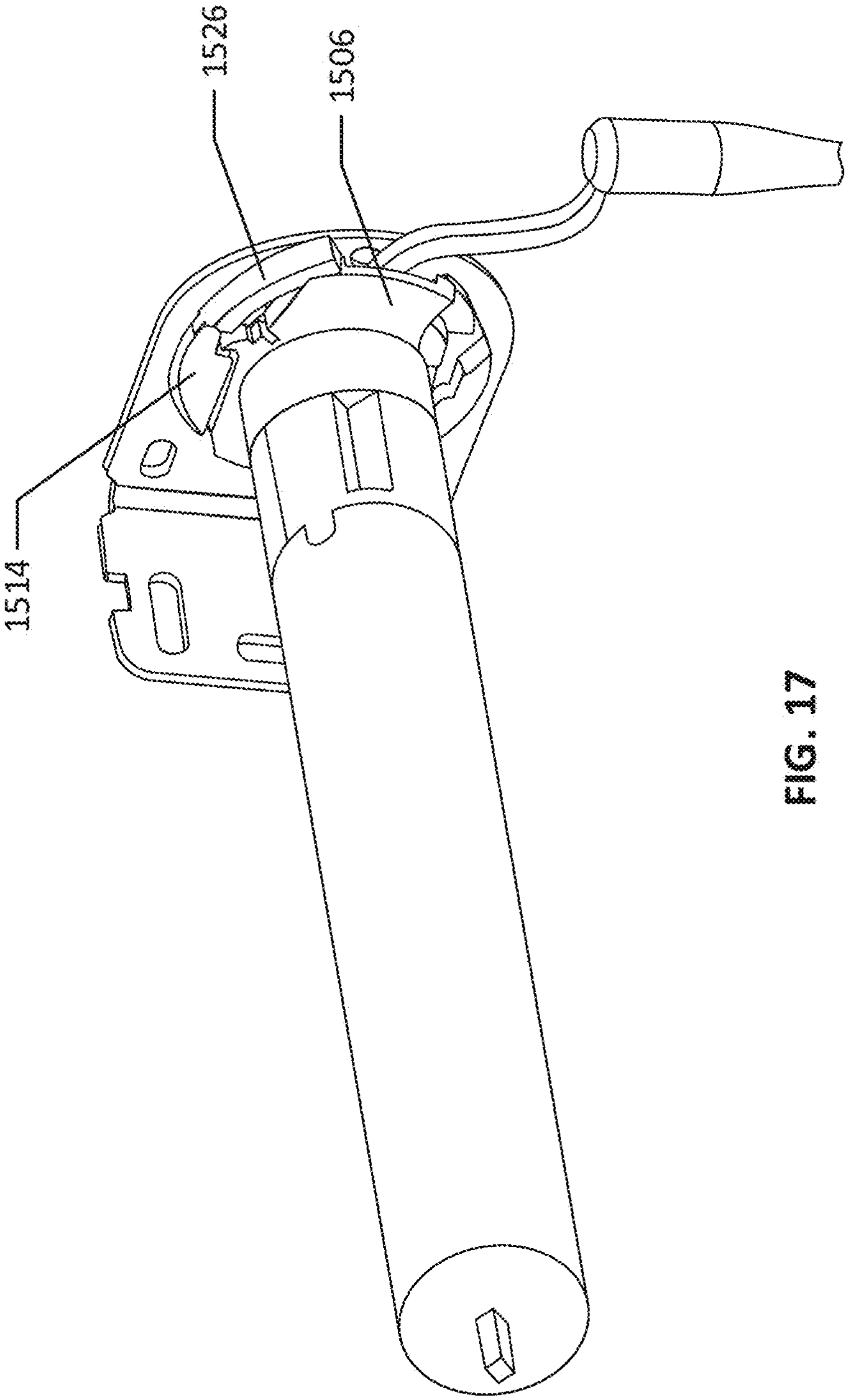
FIG. 17 illustrates the motor assembly of FIG. 15 locked in the cassette.

One difference between motor assembly 1500 and motor assembly 100 (FIG. 1) is the size and shape of end plate 1506 and the shape of control lever 1510. In the illustrated example of FIG. 15, end plate 1506 is designed to be coupled with (e.g., received by) a cassette 1514. Cassette 1514 is a retainer or mounting clip to which end plate 1506 can be connected. In the illustrated example, cassette 1514 is coupled to an L-shaped bracket 1516. L-shaped bracket 1516 can be mounted to a frame of an architectural opening, for example. In the illustrated example, cassette 1514 includes a first slot 1518 and a second slot 1520 to receive a first tab 1522 and a second tab 1524, respectively, of end plate 1506. Cassette 1514 includes a latch 1526 (e.g., a door, a lock, etc.) to lock end plate 1506 in first and second slots 1518, 1520. For example, to couple motor assembly 1500 to cassette 1514, first and second tabs 1522, 1524 of end plate 1506 can be inserted into first and second slots 1518, 1520 of cassette 1514 (as illustrated in FIG. 16) and latch 1526 can be closed to lock end plate 1506 in cassette 1514 (as illustrated in FIG. 17).

Figure 18:
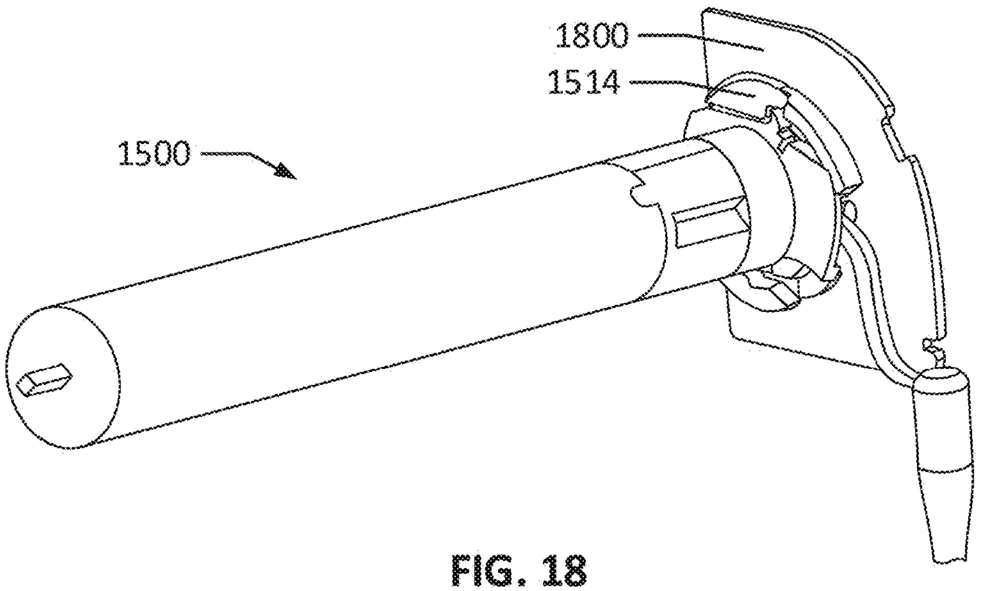
FIG. 18 illustrates the cassette of FIG. 15 mounted to an example of a plate.

In other examples, cassette 1514 can be coupled to other structures to enable motor assembly 1500 to be mounted to other structures. For example, as illustrated in FIG. 18, cassette 1514 is coupled to a plate 1800 (e.g., an end cap) (as opposed to L-shaped bracket 1516 of FIG. 15). As a result, motor assembly 1500 (FIG. 15) can be coupled to or integrated into various other structures for use with an architectural covering. For example, motor assembly 1500 may be disposed within a headrail.

Figure 19:
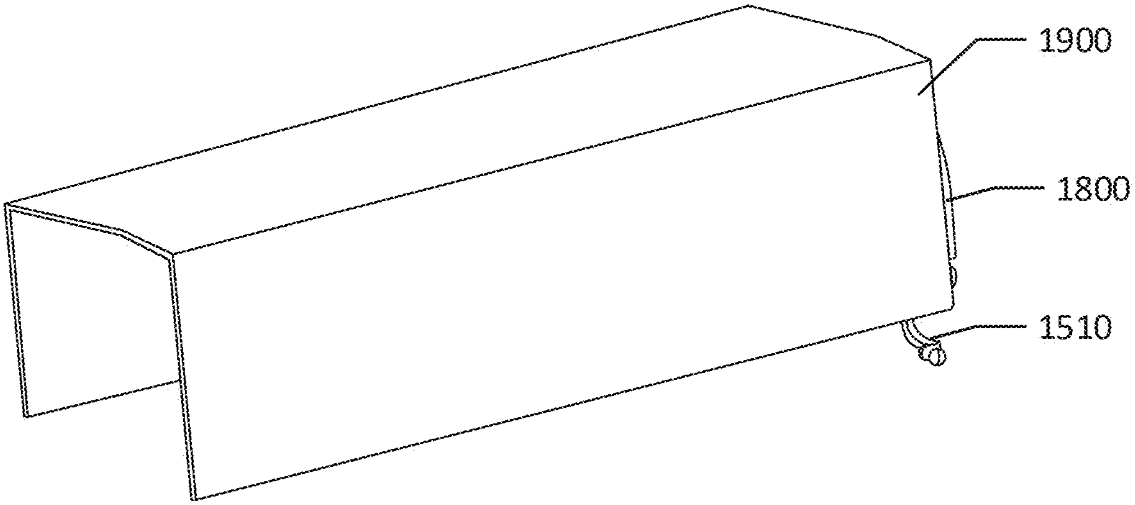
FIG. 19 illustrates an example of a headrail into which the motor assembly of FIG. 15 is incorporated.

FIG. 19 shows plate 1800 coupled to a headrail 1900. Headrail 1900 may be mounted at or near a top of an architectural structure and/or opening, for example. Motor assembly 1500 is disposed within headrail 1900. Control lever 1510 of FIG. 19 extends outward from the bottom of the front of headrail 1900. Lever actuator 1512 (FIG. 15) may be coupled to control lever 1510 and used to move control lever 1510 up or down to activate motor 1502 (FIG. 15).

Figure 20:
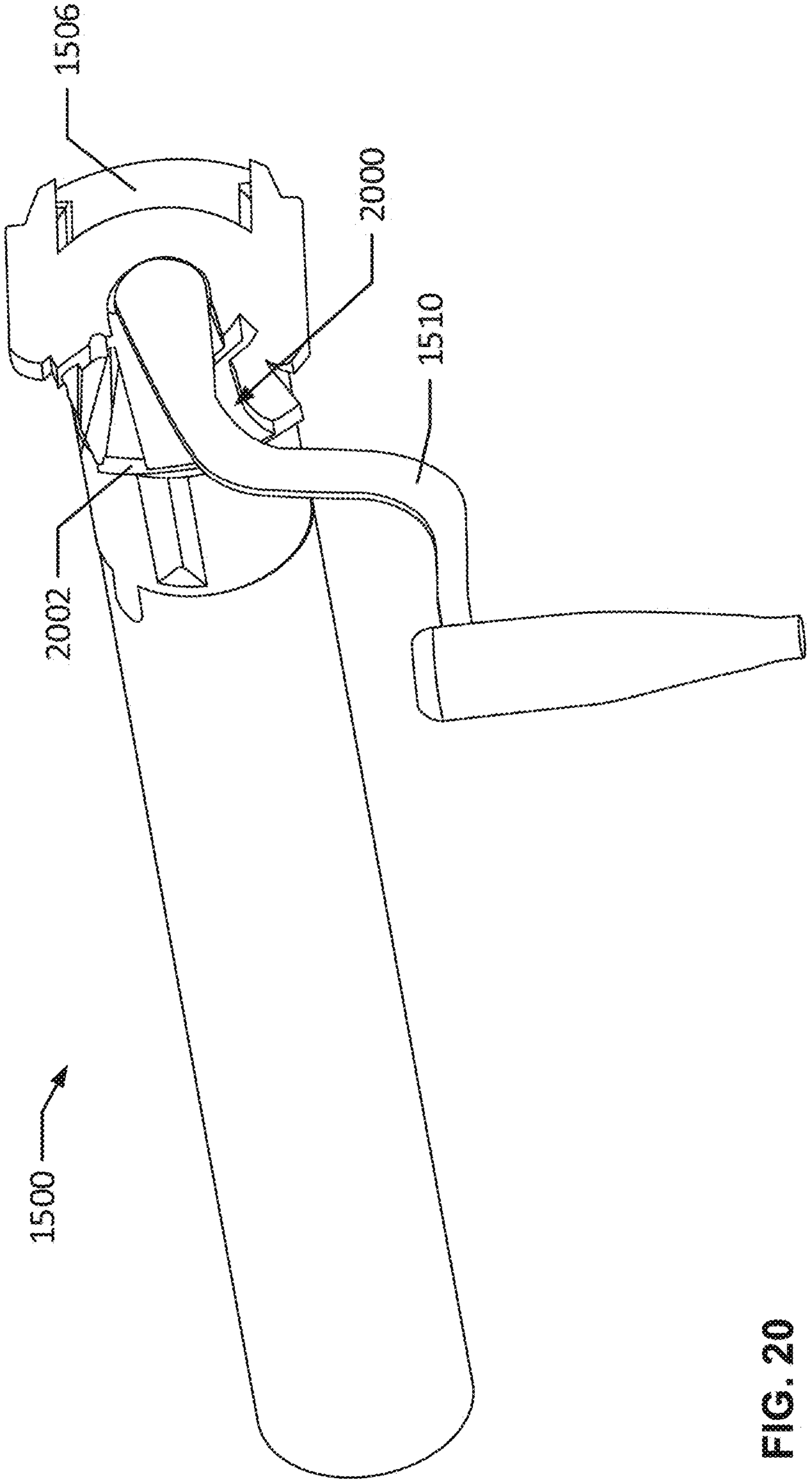
FIG. 20 is a perspective view of the motor assembly of FIG. 15.

FIG. 20 shows example motor assembly 1500 from the other side of end plate 1506 (as compared to FIG. 15). Similar to end plate 106 illustrated in FIG. 2, example end plate 1506 includes a channel 2000 in which control lever 1510 is disposed and which prevents control lever 1510 from rotating beyond a predetermined distance. In the illustrated example of FIG. 20, control lever 1510 extends outward from a front end 2002 of end plate 1506. Whereas, in the illustrated example of FIG. 2, control lever 112 extends from a bottom end 204 of end plate 106. Various geometries of control levers and plate shapes may be utilized depending on the space and structural constraints of the architectural covering. In other examples, control levers and/or plates having different shapes and/or sizes may be employed.

In some aspects of this disclosure, a control lever having a shape that results in a greater angle-of-operation may be utilized. The angle-of-operation refers to the angle of the lever actuator from vertical. In some examples, as disclosed herein, the lever actuator is moved linearly (along a longitudinal axis of the lever actuator) to activate the motor assembly. Additionally, in some instances, it may be desired to move/rotate the lever actuator outward from a wall or other structure before moving the lever actuator to activate the motor assembly. However, moving the lever actuator outward from vertical changes the angle-of-operation. In some instances, the shape of the control lever may limit the allowable angle-of-operation that can be used to rotate the control lever and activate the motor. Therefore, disclosed herein are example control levers that may be used to facilitate larger angles-of-operation, thereby providing a user with a greater range of allowable movement for the lever actuator.

Figure 21:
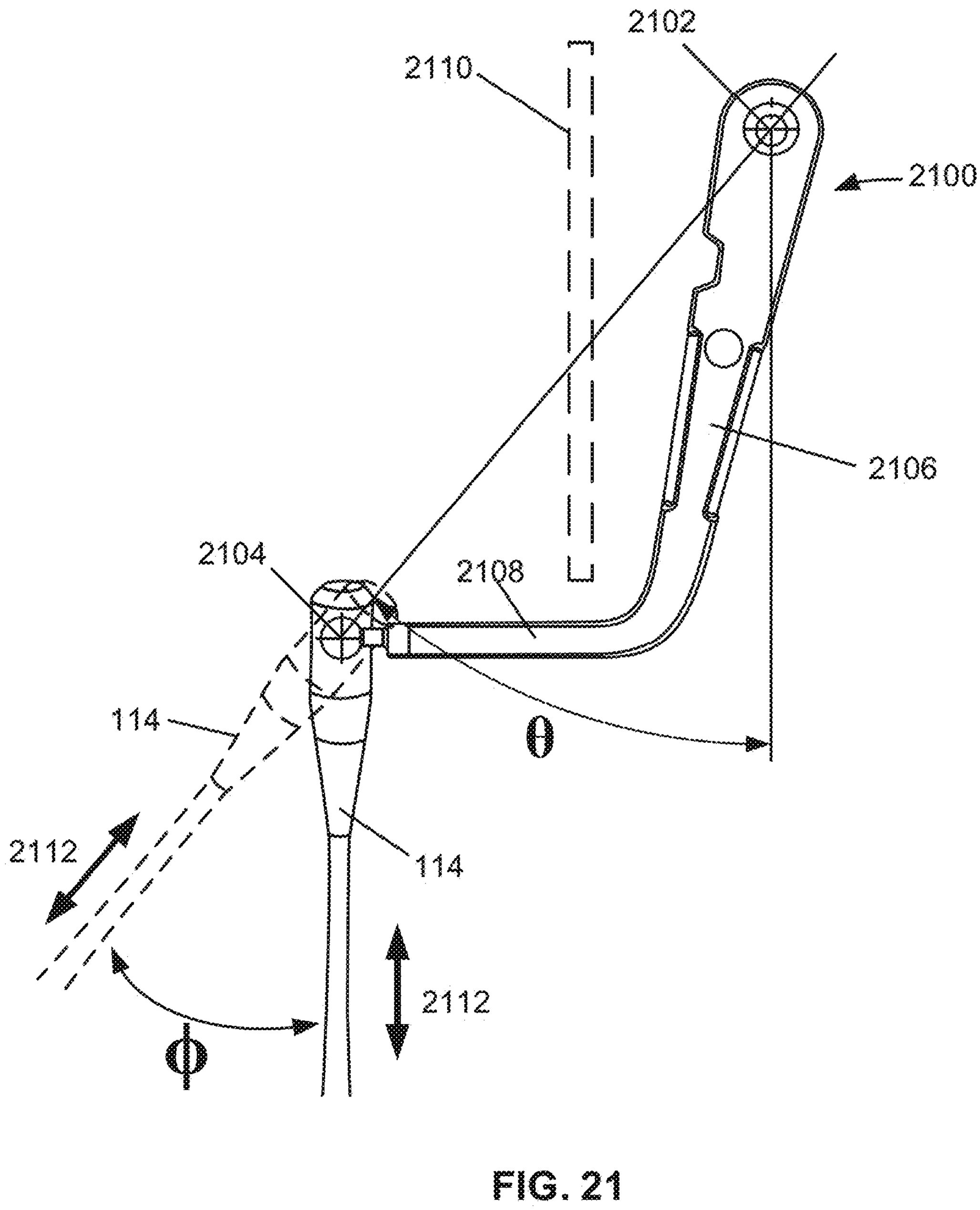
FIG. 21 illustrates an example of a control lever and an angle-of-operation defined by the shape of the control lever.

FIG. 21 illustrates another example of a control lever 2100 that may be used to activate a motor of a motor assembly, such as motor assembly 100 (FIG. 1) or motor assembly 1500 (FIG. 15). For example, controller lever 2100 may be used instead of control lever 112 of FIG. 1 to activate motor 102 by rotating actuator 400. A first attachment point 2102 (at a first end) of control lever 112 may be coupled to actuator 400, and a second attachment point 2104 (at a second end) of control lever 112 may be coupled to lever actuator 114, similar to the joint (e.g., ball joint) disclosed in connection with FIGS. 12-14 above. Lever actuator 114 may be moved linearly up or down (e.g., along a longitudinal axis of lever actuator 114) to rotate control lever 2100 about first attachment point 2102 to activate the motor.

Control lever 2100 may be beneficial to use with a taller front cover, headrail, and/or valance. For example, a front cover 2110 is shown in dashed lines in FIG. 21. As illustrated in FIG. 21, control lever 2100 has a first portion 2106 and a second portion 2108 that form an L-shape. First portion 2106 extends in a downward direction (e.g., in a direction along or parallel to front cover 2110) from the first attachment point 2102 (where control lever 2100 attaches to the actuator) and second portion 2108 extends in an outward or transverse direction from the distal end of first portion 2102 (e.g., in a transverse direction to front cover 2110 and/or in a generally horizontal direction). The orientation and shape of control lever 2100 (e.g., such as having a longer first portion 2106) enables lever arm 2100 to extend under and outward from front cover 2110 to allow sufficient movement of control lever 2100 for activation of the motor assembly.

A control lever angle, labeled θ, is the angle from vertical between first attachment point 2102 and second attachment point 2104. In this example, the control lever angle θ is about 40°. However, in other examples, first and/or second portion 2106, 2108 may be longer or shorter to result in a different control lever angle θ. While control lever 2100 may be beneficial in some instances, the control lever angle θ of control lever 2100 may limit an angle-of-operation ϕ of lever actuator 114. In particular, the angle-of-operation ϕ is the angle of lever actuator 114 (the longitudinal axis of lever actor 114) from the normal, hanging position of lever actuator 114, which, in this example, is a vertical line or axis. For example, as shown in FIG. 21, lever actuator 114 may be pulled or rotated outward away from vertical to the position shown in dashed lines. A user may desire to move lever actuator 114 outward to avoid hitting a couch, a window sill, and/or another obstacle when using lever actuator 114, for instance. However, if the angle-of-operation ϕ becomes too large, movement of lever actuator 114 may not properly rotate control lever 2100. For example, if the angle-of-operation ϕ is close to the control lever angle θ (e.g., ±5°), linear movement of control lever 112 may not cause control lever 2110 to rotate because a line of action 2112 (the direction of linear movement) is substantially aligned with first attachment point 2102 (i.e., the axis of rotation) and not radially or angularly offset from first attachment point 2102. Thus, movement of lever actuator 114 may not activate the motor to move the architectural covering. While extending second portion 2108 of control lever 2100 may increase the control lever angle θ, it is often desired to keep second attachment point 2104 close to the headrail for a more aesthetically pleasing design.

Figure 22:
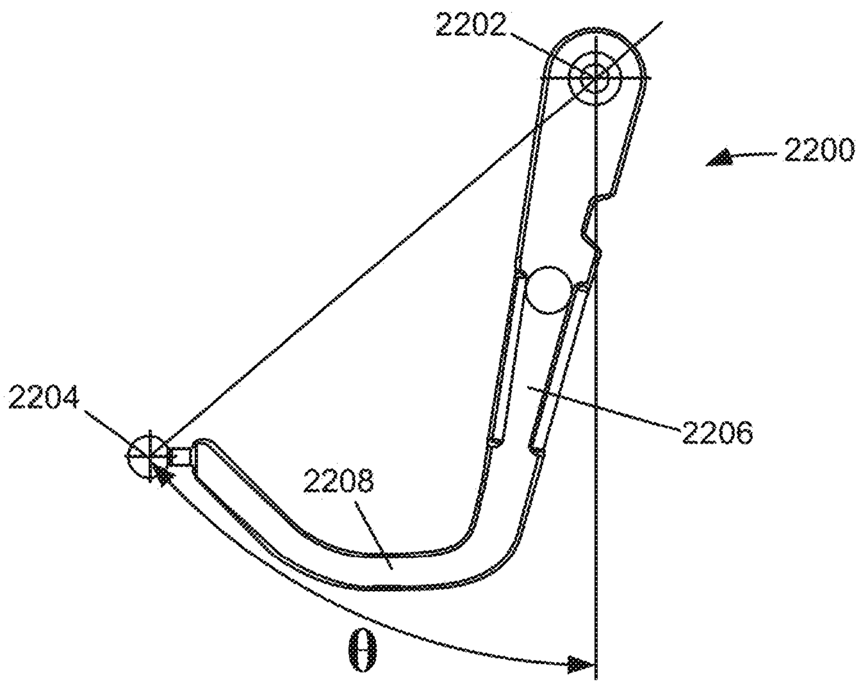
FIG. 22 illustrates an example of another control lever having a different shape than the control lever of FIG. 21 and that results in a greater angle-of-operation.

FIG. 22 illustrates an example of a control lever 2200 that has a larger control lever angle θ than the control lever angle θ of FIG. 21 and, thus, enables use of lever actuator 114 in positions with a greater angle-of-operation ϕ. Similar to control lever 2100, control lever 2200 includes a first attachment point 2202 (at a first end) to attach to an actuator, a second attachment point 2204 (at a second end opposite the first end) to attach to lever actuator 114 (or another consumer touchpoint), a first portion 2206 extending substantially downward from first attachment point 2202 (e.g., in a direction along or parallel to a front cover of a headrail) and a second portion 2208 extending outward from first portion 2206 (e.g., in a direction transverse to a front cover or a headrail). In this example, second portion 2208 of control lever 2200 extends outward (horizontally) and also curves upward (vertically), thereby forming a hook, curve, or J-shaped profile. The curved shape of second portion 2208 displaces second attachment point 2204 upward (compared to control lever 2100), which results in a larger control lever angle θ. In other examples, a similar result may be achieve with a control lever having portions that are angled relative to each other without curved/smooth edges (e.g., the portions may project at acute, right, or obtuse angles from the other portion(s)). As explained above, with a larger control lever angle θ, the angle-of-operation ϕ of lever actuator 114 can be increased while still enabling linear movement of lever actuator 114 to rotate control lever 2200. In this example, the control lever angle θ is about 50°. However, in other examples, the curve of second portion 2208 may be shaped differently to result in larger or smaller control lever angles θ.

Figure 23:
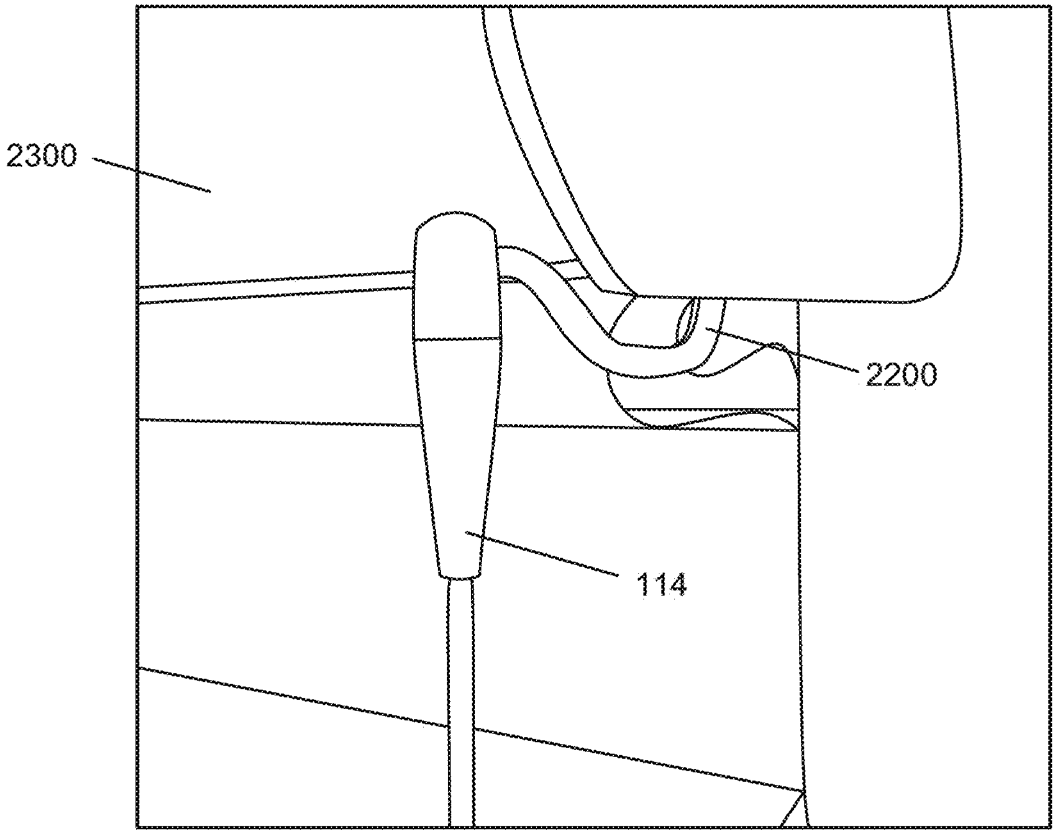
FIG. 23 illustrates the control lever of FIG. 22 utilized in a headrail.

FIG. 23 shows control lever 2200 projecting outward from a front cover 2300 (e.g., a piece of trim, a valance, etc.) of a headrail. As illustrated, the curvature of control lever 2200 enables lever actuator 114 to remain relatively close to front cover 2300 of the headrail (which is more desirable for aesthetic reasons and which reduces the risk of control lever 2200 and/or lever actuator 114 hitting a nearby obstacle) while still enabling a relatively large angle-of-operation ϕ to be used for moving control lever 2200 to activate the motor. In particular, in this example, the larger control lever angle θ enables a larger angle-of-operation f.

Figure 26:
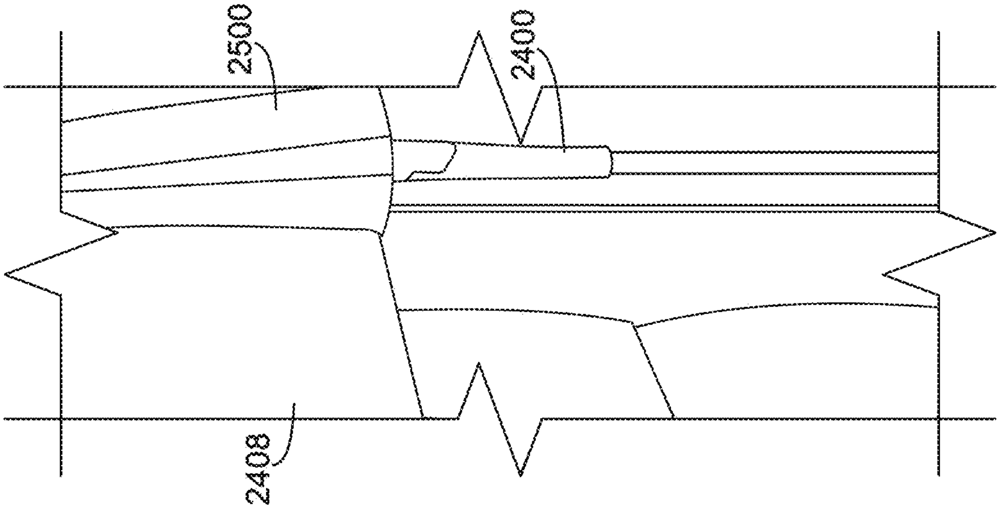
FIG. 26 illustrates the headrail of FIG. 25 with an example of a cover over an example of a connection between the lever actuator and the control lever.
Figure 25:
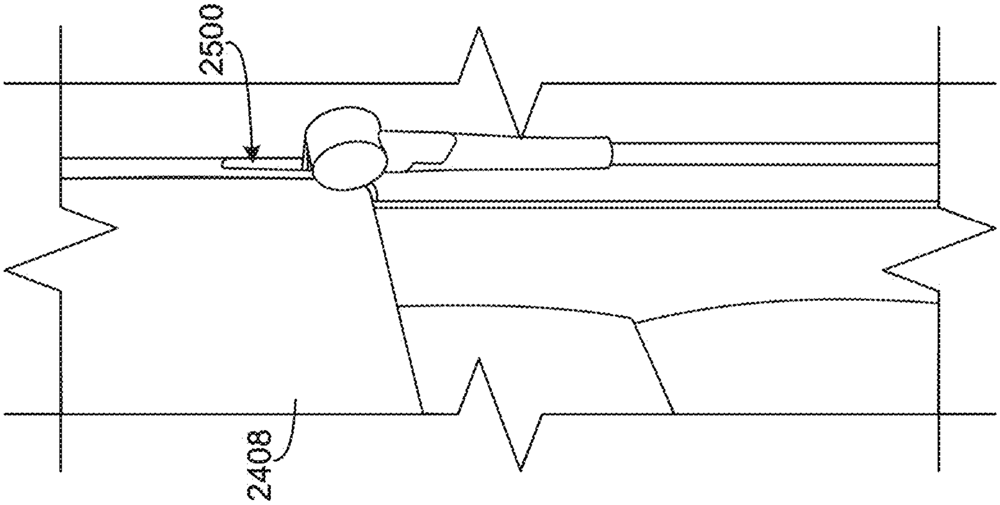
FIG. 25 illustrates an alternative shape for the control lever of FIG. 24 in which the control lever extends from an example of a front cover of an example of a headrail.
Figure 24:
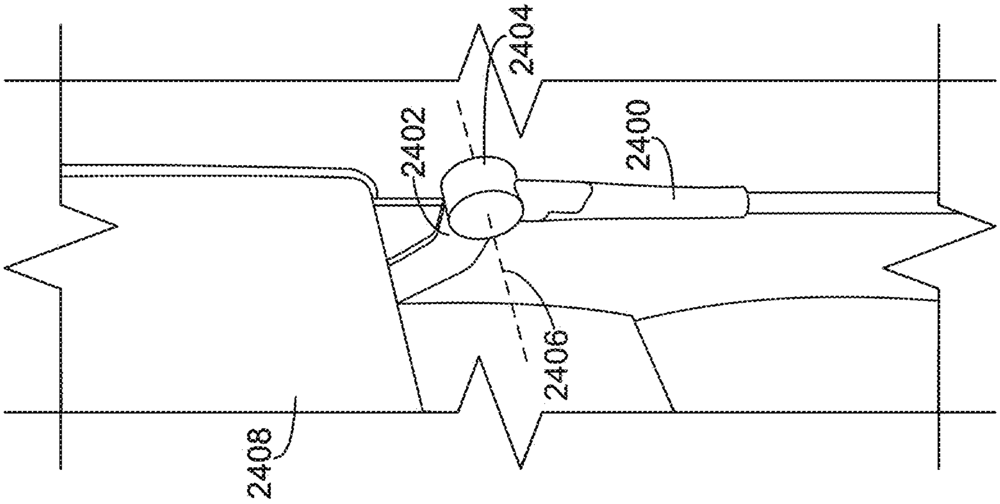
FIG. 24 illustrates an example of a connection between an example of a lever actuator and an example of a control lever that may be implemented by the motor assemblies of FIGS. 1 and 15.

FIGS. 24-26 illustrate other example connections between a lever actuator and a control lever that may be implemented by example motor assemblies 100, 1500 of FIGS. 1 and 15. In FIG. 24, for example, a lever actuator 2400 is coupled to a control lever 2402 via a hub 2404. Control lever 2402 is rotatable, via hub 2404, about an axis 2406. In the illustrated example of FIG. 24, control lever 2402 is shaped to extend from below and outward (e.g., away) from a front cover 2408 (e.g., a piece of trim, a valance, etc.) of a headrail, similar to control lever 112 of FIG. 3, for example. In other examples, control lever 2402 may have a different shape and/or extend outward from front cover 2408 in another location. For example, as illustrated in FIG. 25, control lever 2402 extends outward from a slot 2500 formed in front cover 2408. Further, in some examples, such as in FIG. 26, a cover 2600 may be coupled to front cover 2408 to hide or shield hub 2404 (e.g., the joint between lever actuator 2400 and control lever 2402).

Figure 27:
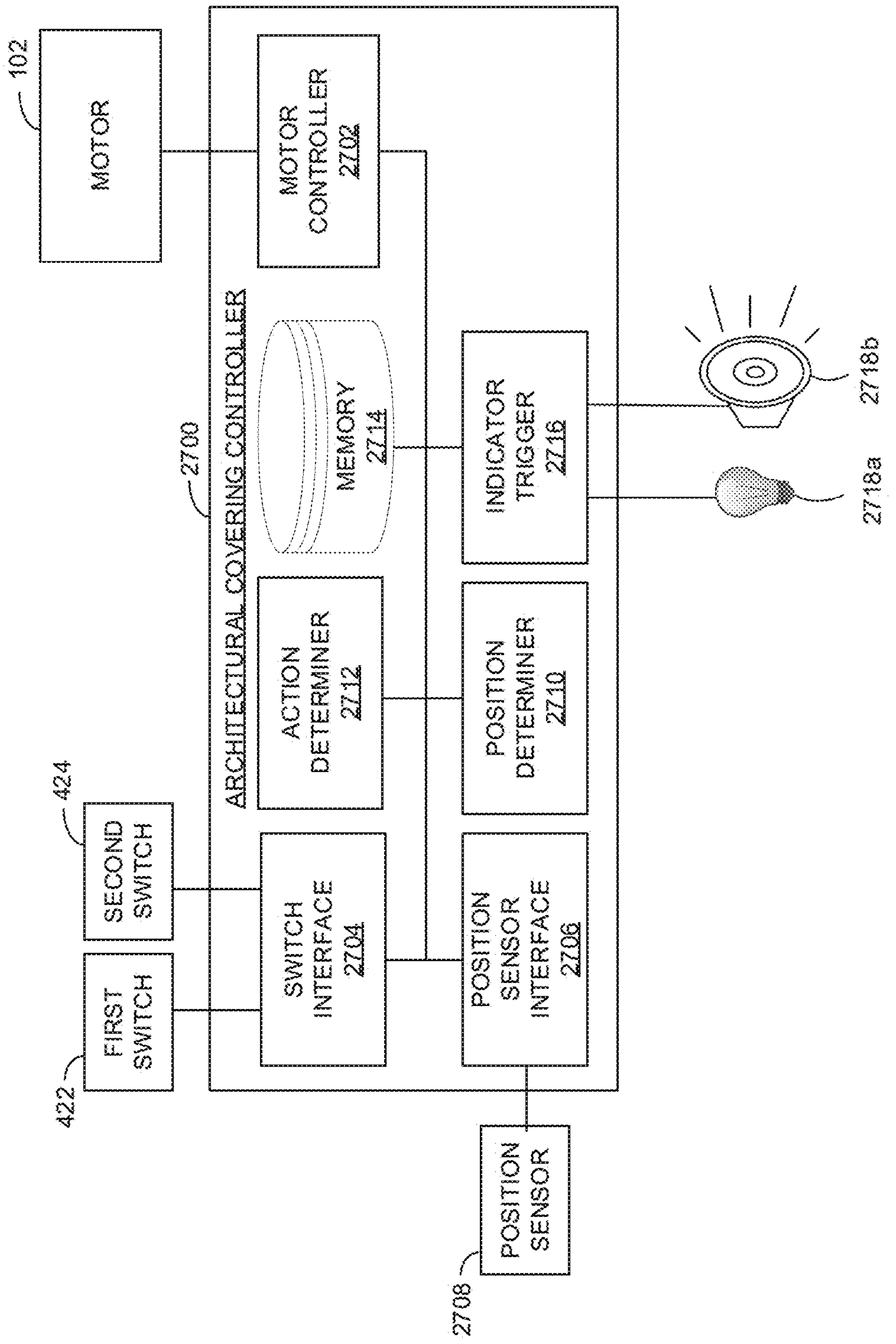
FIG. 27 illustrates a block diagram of an architectural covering controller to control a motorized architectural covering.

FIG. 27 is a block diagram of an architectural covering controller 2700 that may be used to control a motorized architectural covering. For instance, architectural covering controller 2700 may be implemented by a motor assembly, such as motor assembly 100 illustrated in FIG. 1, for controlling an architectural covering assembly, such as architectural covering assembly 300 illustrated in FIG. 3. In the examples below, architectural covering controller 2700 is described in connection with motor assembly 100 and architectural covering 304 of architectural covering assembly 300. However, it is understood that architectural covering controller 2700 may likewise be implemented in any other motor assembly, such as motor assembly 1500 of FIG. 15, as part of other architectural covering assemblies.

In some aspects of this disclosure, architectural covering controller 27 of FIG. 27 may be implemented on circuit board 414 of motor assembly 100 illustrated in FIG. 4. Architectural covering controller 2700 includes a motor controller 2702 that controls motor 102 based on one or more commands. Motor controller 2702 controls the direction of rotation of output shaft 104 of motor 102 (e.g., by controlling the direction of current applied to motor 102), the speed of output shaft 104 of motor 102 (e.g., by controlling the voltage applied to motor 102), and/or other operations of motor 102, as disclosed in further detail herein.

In the illustrated example of FIG. 27, architectural covering controller 2700 includes a switch interface 2704 that receives one or more signals from first switch 422 and/or second switch 424 (represented by blocks in FIG. 27) to detect when first switch 422 and/or second switch 424 is triggered or activated. For example, when first switch 422 is activated (e.g., by depressing first switch 422 via movement of actuator 400), a circuit may be closed that transmits a signal (e.g., a voltage signal) to switch interface 2704, which determines that first switch 422 is triggered. Likewise, when second switch 424 is triggered (e.g., by depressing second switch 424 via movement of actuator 400), another circuit may be closed that transmits a signal (e.g., a voltage signal) to switch interface 2704, which determines that second switch 424 is triggered. In some examples, a first voltage signal may be produced when first switch 422 is triggered and a second voltage signal may be produced when second switch 424 is triggered. In such an example, switch interface 2704 may determine which switch (if any) is activated based on the received voltage signal. Thus, switch interface 2704 may detect movement of a consumer touchpoint, such as lever actuator 114, in a first direction (e.g., up) or a second direction (e.g., down) opposite to the first direction.

In the illustrated example of FIG. 27, architectural covering controller 2700 includes a position sensor interface 2706 that receives signals (e.g., an analog signal) from a position sensor 2708. Position sensor 2708 may include, for example, a magnetic encoder, a rotary encoder, a gravitational sensor (e.g., an accelerator, a gyrometer, etc.), etc. Position sensor 2708 may be used to count pulses or rotations of motor 102, to track the position of the rotating element (e.g., a roller tube, lift rod, etc.), etc. while driving architectural covering 304 up or down. Position sensor interface 2706 processes the signals from position sensor 2708 (e.g., converts analog signals to digital signals, filters the signals, etc.). A position determiner 2710 determines a position of architectural covering 304 based on the processed signal(s) from position sensor interface 2706.

In the illustrated example of FIG. 27, architectural covering controller 2700 includes an action determiner 2712 that determines what action (if any) is to be performed by the motor 102 based on input information from switch interface 2704 and/or position determiner 2710. For example, if architectural covering 304 is stationary and switch interface 2704 detects that first switch 422 is activated (by pushing up on lever actuator 114), action determiner 2712 may determine that architectural covering 304 is to be retracted (e.g., raised). As such, action determiner 2712 commands motor controller 2702 to activate motor 102 in the direction to retract architectural covering 304. Similarly, if architectural covering 304 is stationary and switch interface 2704 detects that second switch 424 is activated (by pulling down on lever actuator 114), action determiner 2712 may determine that architectural covering 304 is to be extended (e.g., lowered). As such, action determiner 2712 sends a signal to motor controller 2702 to activate motor 102 in the opposite direction to extend architectural covering 304. In some examples, motor 102 may continue to move architectural covering 304 up or down until another gesture is detected, such as a subsequent movement of lever actuator 114 up or down. In other examples, motor 102 may only drive architectural covering 304 while lever actuator 114 is held in the up or down position. If the user releases lever actuator 114 and lever actuator 114 returns to the neutral position, motor 102 may stop.

In some examples, an upper limit position and/or a lower limit position may be used to prevent motor assembly 100 from moving architectural covering 304 beyond a set position in either direction. For example, if position determiner 2710 determines that architectural covering 304 has reached an upper limit position (e.g., a position at or near a top of a window), action determiner 2712 may command motor controller 2702 to cease activation of motor 102 and, thus, cease movement of architectural covering 304. This prevents architectural covering 304 from being retracted too far in a manner that may otherwise cause damage to motor assembly 100 and/or architectural covering 304. Similarly, a lower limit position may be used to prevent motor 102 from extending architectural covering 304 too far in the opposite direction. Additionally or alternatively, the upper and/or lower limit positions may also be used to customize motor assembly 100 to stop at a top and/or bottom of a user's architectural opening, for example. Thus, example motor assembly 100 can be used with various sized architectural structures and programmed to meet the appropriate boundaries. In some examples, the upper limit position and/or lower limit position are stored in a memory 2714 of architectural covering controller 2700. In some examples, the upper limit position and/or the lower limit position may be reprogrammed by a user based on a sequence of operations, as disclosed in further detail in connection with FIGS. 31 and 32.

In another example operation, architectural covering controller 2700 may control motor assembly 100 to move architectural covering 304 to a predetermined position, referred to herein as a stored position or a favorite position. The favorite position may be a position (e.g., a height, a midpoint between an upper limit and a lower limit, etc.) of architectural covering 304 that the user prefers. In some examples, the favorite position may be stored in memory 2714. Based on a gesture of a consumer touchpoint, such as control lever 112 and/or lever actuator 114, architectural covering controller 2700 may activate motor 102 to move architectural covering 304 to the favorite position. An example gesture may include a rapid up-and-down (up/down) movement or a down-and-up (down/up) movement of lever actuator 114. For example, if switch interface 2704 detects that first switch 422 and second switch 424 are activated within a threshold time (e.g., less than 0.5 seconds, less than 1 second, less than 5 seconds, less than 10 seconds, etc.), action determiner 2712 may determine that architectural covering 304 is to be moved to the stored favorite position. As such, action determiner 2712 sends a command signal to motor controller 2702 to activate motor 102 to extend or retract architectural covering 304 to the favorite position. Action determiner 2712 may determine whether architectural covering 304 is to be moved up or down based on a current position as detected by position determiner 2710. If the current position of architectural covering 304 is above the favorite position, motor controller 2702 activates motor 102 to extend architectural covering 304 (e.g., move architectural covering 304 downward). On the other hand, if the current position of architectural covering is below the favorite position, motor controller 2702 activates motor 102 to retract architectural covering 304 (e.g., move architectural covering 304 upward). When architectural covering 304 reaches the favorite position (e.g., determined by position determiner 2710), action determiner 2712 sends a command signal to motor controller 2702 to cease activation of motor 102. In some examples, having a favorite position advantageously enables a set of architectural coverings to be easily moved to the same position. For example, a user may have a row of windows, each with a separate architectural covering and motor assembly. The favorite position of each motor assembly may be set to the same height or position (e.g., 50%). Then, the user can trigger each of the motor assemblies (e.g., with a gesture of a consumer touchpoint) to move the corresponding architectural covering to the favorite position, where all of the architectural coverings are at the same position and aligned along the row of windows. Thus, a user would not have to manually move each of the architectural coverings one-by-one to the same height.

In some examples, an architectural covering may be configured to have two or more phases or modes during operation. As used herein, a phase (or mode) is a transition or configuration of movement (e.g., a speed, a direction, etc.) between different positions (e.g., an upper limit position, a transition limit position, a lower limit position) of the architectural covering. For example, an architectural covering may have a first phase or mode where a shade is extended or retracted and a second phase or mode where vanes in the shade are moved (e.g., tilted) to allow more or less light through the covering. In some examples, motor controller 2702 activates motor 102 at different speeds depending on the phase or mode of the architectural covering. For example, motor controller 2702 may activate motor 102 to move the architectural covering (e.g., to extend or retract the architectural covering) at a first, fast speed during a first phase and activate motor 102 to move architectural covering (e.g., to open or close vanes) in a second, slow speed during a second phase. Any number of phases and relative speeds may be utilized. Examples of such architectural coverings are disclosed in further detail in connection with FIGS. 33-36C.

In some examples, one or more indicators may be used to alert a user of a particular operation that is being performed by motor assembly 100 (e.g., moving up, moving down, moving to the favorite position, setting a favorite position, adjusting a limit position, etc.). In the illustrated example of FIG. 27, architectural covering controller 2700 includes an indicator trigger 2716 that may activate one or more indicators. One example indicator is a first indicator 2718*a*, which is a light such as a light-emitting-diode (LED) light. In some examples, the first indicator 2718*a* includes different color lights (e.g., a green light, a red light, etc.). In some examples, the light(s) may be activated to blink or flash. The lights may be positioned on an outside of a headrail (e.g., headrail 302 of FIG. 3) of an architectural covering and/or any other location to be seen by a user. Another example indicator is a second indicator 2718*b*, which is a sound generator (e.g., a speaker, a piezoelectric element, and/or another device capable of generating sound) that may generate an audible sound (e.g., one or more beeps). In other examples, other types of indicators may be used in addition to or as an alternative to first and second indicators 2718*a*, 2718*b*. For example, indicator trigger 2716 may command motor controller 2702 to activate motor 102 to move architectural covering 304 up and/or down a small amount in a rapid manner (e.g., a "jog"). These visual and audible indicators may be triggered alone or in combination to indicate to a user that a particular operation is being or has been performed. For example, if the user gestures to move architectural covering 304 to the favorite position, action determiner 2712 may send a signal to indicator trigger 2716 to activate first indicator 2718*a* (e.g., to display a green blinking light). The blinking light provides a visual signal to the user that motor assembly 100 is moving architectural covering 304 to the favorite position, thus confirming the user's instruction.

These and many other operations are possible based on the configuration of architectural covering controller 2700. A few example operations are disclosed in further detail in conjunction with the flowcharts illustrated in FIGS. 28-33 and 37 below.

While an example manner of implementing architectural covering controller 2700 is illustrated in FIG. 27, one or more of the elements, processes and/or devices illustrated in FIG. 27 may be combined, divided, re-arranged, omitted, eliminated, and/or implemented in any other way. Further, example motor controller 2702, example switch interface 2704, example position sensor interface 2706, example position determiner 2710, example action determiner 2712, example memory 2714, example indicator trigger 2716, and/or, more generally, example architectural covering controller 2700 of FIG. 27 may be implemented by hardware, software, firmware and/or any combination of hardware, software and/or firmware. Thus, for example, any of example motor controller 2702, example switch interface 2704, example position sensor interface 2706, example position determiner 2710, example action determiner 2712, example memory 2714, example indicator trigger 2716, and/or, more generally, example architectural covering controller 2700 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of example motor controller 2702, example switch interface 2704, example position sensor interface 2706, example position determiner 2710, example action determiner 2712, example memory 2714, and/or example indicator trigger 2716 is/are hereby expressly defined to include a tangible computer readable storage device or storage disk such as a memory, a digital versatile disk (DVD), a compact disk (CD), a Blu-ray disk, etc. storing the software and/or firmware. Further still, example architectural covering controller 2700 of FIG. 27 may include one or more elements, processes, and/or devices in addition to, or instead of, those illustrated in FIG. 27, and/or may include more than one of any or all of the illustrated elements, processes, and devices.

Flowcharts representative of example machine readable instructions for implementing architectural covering controller 2700 are shown in FIGS. 28-33 and 37. In these examples, the machine readable instructions comprise a program for execution by a processor such as processor 3812 shown in example processor platform 3800 discussed below in connection with FIG. 38. The program may be embodied in software stored on a tangible computer readable storage medium such as a CD-ROM, a floppy disk, a hard drive, a digital versatile disk (DVD), a Blu-ray disk, or a memory associated with processor 3812, but the entire program and/or parts thereof could alternatively be executed by a device other than processor 3812 and/or embodied in firmware or dedicated hardware. Further, although the example program is described with reference to the flowcharts illustrated in FIGS. 28-33 and 37, many other methods of implementing example architectural covering controller 2700 may alternatively be used. For example, the order of execution of the blocks may be changed, and/or some of the blocks described may be changed, eliminated, or combined.

As mentioned above, the example processes of FIGS. 28-33 and 37 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 28-33 and 37 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

As mentioned above, a motor assembly, such as motor assembly 100, may be configured to perform various operations based on one or more gestures of a consumer touchpoint, such as lever actuator 114 and/or control lever 112, by a user. A gesture includes one or more movements (e.g., a sequence) and/or hold times of the consumer touchpoint. The motor assembly may detect a gesture (e.g. a movement in one direction) and, based on the gesture, perform one or more operations. Example gestures and operations of a motor assembly are described in the flowcharts below. In the flowcharts of FIGS. 28-33 and 37, the examples are described in connection with motor assembly 100 and architectural covering 304 illustrated in FIGS. 1, 3 and 4. However, it is understood that the example gestures and operations may be similarly implemented with other motor assemblies and/or other architectural coverings. Additionally, as disclosed above, a consumer touchpoint, such as lever actuator 114, may be moved linearly in one direction or the other to trigger first switch 422 or second switch 424. In many of the examples below, the direction of movement of lever actuator 114 is described as being up (e.g., pushing up) or down (e.g., pulling down) in a vertical direction. However, it is understood that motor assembly 100 may be positioned in other orientations and, thus, movement of lever actuator 114 may be in other directions. Thus, when describing any movement as being up or down, it is understood that a similar operation may be performed by moving lever actuator 114 in other directions (e.g., laterally) depending on the orientation of lever actuator 114. Additionally, lever actuator 114 (and/or control lever 112) are only one example of a consumer touchpoint. The example gestures disclosed herein may be similarly performed with other types of consumer touchpoint, such as a handle, a rail, a pull cord, a remote control, a bead chain, etc.

Figure 28:
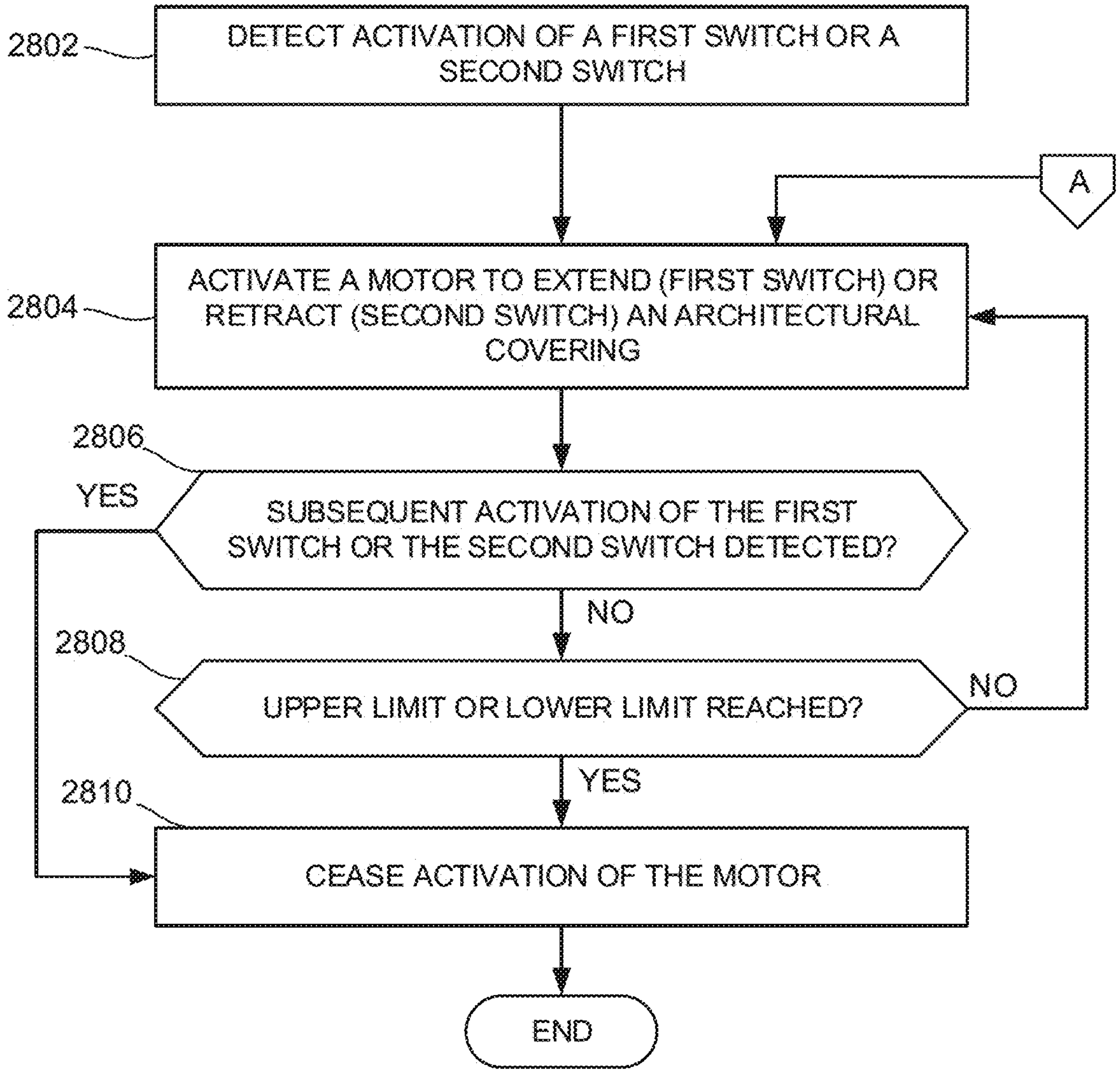
FIG. 28 is a flowchart representative of example machine readable instructions that may be executed to implement the architectural covering controller illustrated in FIG. 27 to control a motorized architectural covering.

FIG. 28 is flowchart representative of example machine readable instructions, implemented by architectural covering controller 2700 of motor assembly 100, to extend or retract an architectural covering, such as covering 304. Depending on the gesture (e.g., a sequence and/or hold time of activation of switches 422, 424), motor assembly 100 may perform various operations to move architectural covering 304. For example, when architectural covering 304 is stationary, a user may activate motor assembly 100 to move architectural covering 304 upward (e.g., retract architectural covering 304) by pushing up on a consumer touchpoint, such as lever actuator 114. In some aspects of this disclosure, once activated, motor assembly 100 continues to drive architectural covering 304 upward until one or more other triggers occur, such as a subsequent movement of lever actuator 114 up or down. Thus, a user may push up on lever actuator 114 and release lever actuator 114 and motor 102 continues to move architectural covering 304 upward. Then, the user may push up or pull down on lever actuator 114 to stop motor 102 and, thus, stop architectural covering 304 at the desired position. Likewise, from the stationary position, a user may activate motor assembly 100 to move architectural covering 304 downward by pulling down on lever actuator 114. Once activated, motor 102 may continue to move architectural covering 304 downward until one or more other triggers occur, such as a subsequent movement of lever actuator 114 up or down.

For example, at block 2802, architectural covering 304 is stationary and switch interface 2704 detects that one of first switch 422 or second switch 424 has been activated (e.g., depressed). In other words, switch interface 2704 detects movement of lever actuator 114 in a first direction (e.g., up) or a second direction (e.g. down) based on activation of switches 422, 424. Based on which switch has been activated, action determiner 2712 commands motor controller 2702 to activate motor 102 to rotate output shaft 104 (FIG. 1) in one direction or the other to retract or extend architectural covering 304 at block 2804. For example, when first switch 422 has been triggered by pushing up on lever actuator 114, action determiner 2712 commands motor controller 2702 to activate motor 102 to drive output shaft 104 in one direction to raise architectural covering 304. Similarly, if second switch 424 has been triggered by pulling down on lever actuator 114, action determiner 2712 commands motor controller 2702 to activate motor 102 to drive output shaft 104 in the other direction to lower architectural covering 304. In some examples, motor 102 continues to drive architectural covering 304 up or down after the user has released lever actuator 114. In other words, motor 102 continues to move architectural covering 304 after first switch 422 or second switch 424 has been deactivated. Thus, a momentary activation of either switch 422, 424 may cause architectural covering 304 to be driven up or down.

In some examples, motor controller 2702 initially activates motor 102 at a first speed and then increases the speed to a second, higher speed over a time period. For example, motor controller 2702 may activate motor 102 at 20% (of full speed) and then increase the speed to 100% (full speed) over 2 seconds. In other examples, other ramp-up speed configurations may be implemented.

In some examples, motor 102 continues to drive architectural covering 304 up or down (extending or retracting) until the user provides another gesture, such as pushing up or pulling down on lever actuator 114. In such examples, another activation of first switch 422 or second switch 424 causes motor 102 to stop. For example, at block 2806, action determiner 2712 monitors for a signal from switch interface 2704 indicating activation of either switch 422, 424. If either switch 422, 424 is activated (as detected by switch interface 2704), action determiner 2712 commands motor controller 2702 to deactivate motor 102 (e.g., by ceasing supply of power to motor 102). Thus, switch interface 2704 detects a subsequent movement of lever actuator 114 in the up or down direction and, in response to detecting the subsequent movement, action determiner 2712 commands motor controller 2702 to cease activation of motor 102. In some examples, either an up gesture or a down gesture of the lever actuator 114 stops motor 102. In other examples, action determiner 2712 may be configured to only cease activation of motor 102 based on a gesture in the opposite direction as architectural covering 304 is moving. For example, if motor 102 is moving architectural covering 304 upward, only a downward pull on lever actuator 114 may stop motor 102.

In some examples, motor assembly 100 may be configured to stop architectural covering 304 when an upper limit position or lower limit position is reached. Upper and lower limit positions may be used to prevent architectural covering 304 from moving too far in either direction. For example, at block 2808, action determiner 2712 determines if architectural covering 304 reaches an upper limit position or a lower limit position. In some examples, action determiner 2712 compares the position of architectural covering 304, as determined by position determiner 2710, to the upper and lower limit positions. In some examples, the upper limit position and the lower limit position are stored in memory 2714. If the upper limit position or the lower limit position is reached, action determiner 2712 commands motor controller 2702 to cease activation of motor 102, at block 2810. In some examples, motor controller 2702 controls motor 102 to reduce speed as architectural covering 304 approaches the upper limit position or lower limit position. For example, motor controller 2702 may control motor 102 to reduce speed from 100% to 20% over the last 2 seconds before reaching the upper limit position or the lower limit position. In other examples, other ramp-down speed configurations may be implemented.

Otherwise, if the upper limit position or the lower limit position is not reached, motor 102 continues to move architectural covering 304 up or down until action determiner 2712 detects a manual stop gesture (block 2806) or the upper or lower limit position is reached (block 2808). In other examples, no upper limit position or lower limit position may be used. Instead, action determiner 2712 may command motor controller 2702 to deactivate motor 102 once a fully extended or fully retracted position is reached (e.g., as sensed by a trigger or sensor). Once architectural covering 304 is stopped, the example process of FIG. 28 ends. The example process of FIG. 28 may begin again upon a new user interaction. For example, a user may again activate motor assembly 100 to move architectural covering 304 up or down via a gesture (e.g., by pushing up or pulling down on lever actuator 114).

In other examples, architectural covering controller 2700 may be configured to move architectural covering 304 up or down while lever actuator 114 is pushed up or pushed down. Once lever actuator 114 is released (and moves back to the neutral position), motor 102 stops. In such an example, action determiner 2712 commands motor controller 2702 to activate motor 102 as long as first switch 422 or second switch 424 is activated. When neither switch 422, 424 is activated (as detected by switch interface 2704), action determiner 2712 commands motor controller 2702 to cease activation of motor 102.

Figure 29:
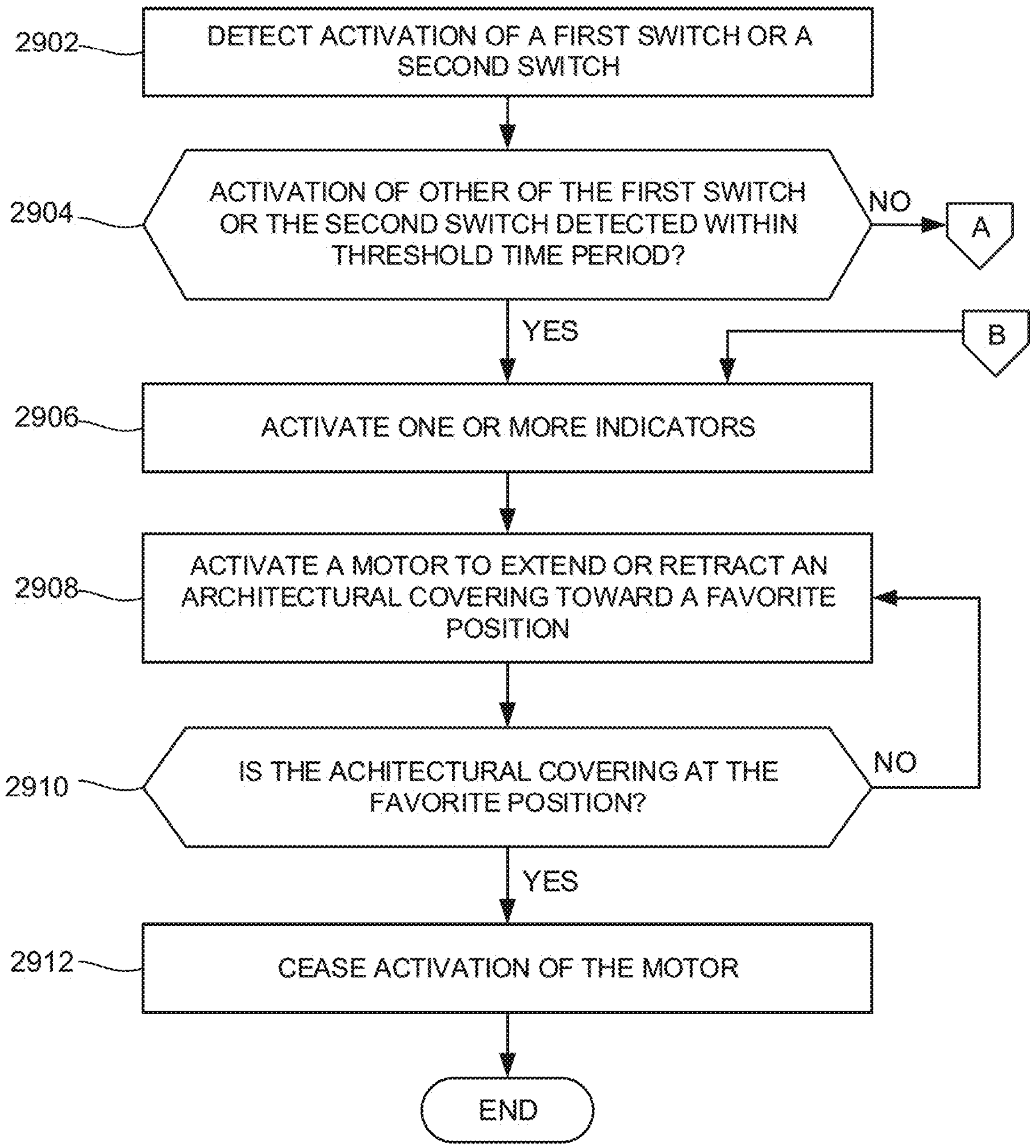
FIG. 29 is a flowchart representative of example machine readable instructions that may be executed to implement the architectural covering controller illustrated in FIG. 27 to move a motorized architectural covering to a stored position.

FIG. 29 is flowchart representative of example machine readable instructions, implemented by architectural covering controller 2700 of motor assembly 100, to move architectural covering 304 to a favorite position. As disclosed above, in some examples, a favorite position may be stored in memory 2714. The favorite position may be a position (e.g., a height) of architectural covering 304 preferred by the user (e.g., an intermediate position between a top and a bottom of a window). A user may activate motor assembly 100 to move architectural covering 304 by performing a gesture (e.g., a favorite gesture) with a consumer touchpoint, such as lever actuator 114. In some examples, the gesture is a rapid up-and-down (up/down) movement or a down-and-up (down/up) movement of the consumer touchpoint. When architectural covering controller 2700 detects the gesture, motor 102 is activated to move architectural covering 304 to the stored favorite position.

For example, at block 2902, switch interface 2704 detects when one of first switch 422 or second switch 424 is activated (e.g., depressed). Switch interface 2704 continues to detect whether the other of first switch 422 or second switch 424 is activated. At block 2904, action determiner 2412 determines whether activation of the other of first switch 422 or second switch 424 has been detected within a threshold time period. In other words, action determiner 2712 determines whether the other of first switch 422 or second switch 424 is activated within the threshold time period after the first one of first switch 422 or second switch 424 has been deactivated. In some examples, the threshold time period is stored in memory 2714. In some examples, the threshold time period is 0.5 seconds. Thus, the other of first switch 422 or second switch 424 is to be activated within 0.5 seconds after the first one of first switch 422 or second switch 424 has been deactivated. In other examples, other threshold time periods may be implemented (e.g., less than 1 second, less than 5 seconds, less than 10 seconds, etc.). If activation of the other of first switch 422 or second switch 424 is detected within the threshold time period (e.g., 0.4 seconds), action determiner 2712 determines that the user desires architectural covering 304 to be moved to the favorite position, and the example instructions continue to block 2906 described below. Otherwise, if activation of the other of first switch 422 or second switch 424 is not detected within the threshold time period (e.g., 1 second), the example process may continue (through block A) to block 2804 of FIG. 28.

In some examples, if action determiner 2712 determines architectural covering 304 is to be moved to the favorite position (e.g., switched into a favorite mode), one or more indicators (e.g., a light, a sound, etc.) are activated to signal to the user that motor assembly 100 is moving architectural covering 304 to the favorite position. For example, at block 2906, indicator trigger 2716 may activate one or both of indicators 2718*a*, 2718*b*. For instance, indicator trigger 2716 may activate a light, such as a blinking green light. In other examples, other indicators (e.g., a sound generated by second indicator 2718*b*, a jog of architectural covering 304, etc.) may be activated in addition to or as an alternatively to the light. At block 2908, action determiner 2712 commands motor controller 2702 to activate motor 102 to rotate output shaft 104 (FIG. 1) to retract or extend architectural covering 304 toward the favorite position. In some examples, the one or more indicators continue to activate while architectural covering 304 is moving (e.g., a blinking green light remains on while architectural covering 304 is moving to the favorite position). In other examples, indicator trigger 2716 may only activate the one or more indicators for a relatively short time (e.g., 1 second) after the gesture is detected. In other examples, no indicators may be triggered.

At block 2910, action determiner 2712 determines whether architectural covering 304 has reached the favorite position. In some examples, action determiner 2712 compares the position of architectural covering 304, as determined by position determiner 2710, to the stored favorite position. If the architectural covering 304 has reached the favorite position, action determiner 2712 commands motor controller 2702 to cease activation of motor 102, at block 2912, and the example process of FIG. 29 ends. Thus, architectural covering 304 is stopped in the favorite position. Otherwise, if architectural covering 304 has not reached the favorite position, motor 102 continues to move architectural covering 304 toward the favorite position (block 2908) and action determiner 2712 continues to monitor the position of architectural covering 304. In some examples, while motor 102 is moving architectural covering 304 to the favorite position, a user may push up or pull down on lever actuator 114 to stop motor 102 and end the operation.

Figure 30:
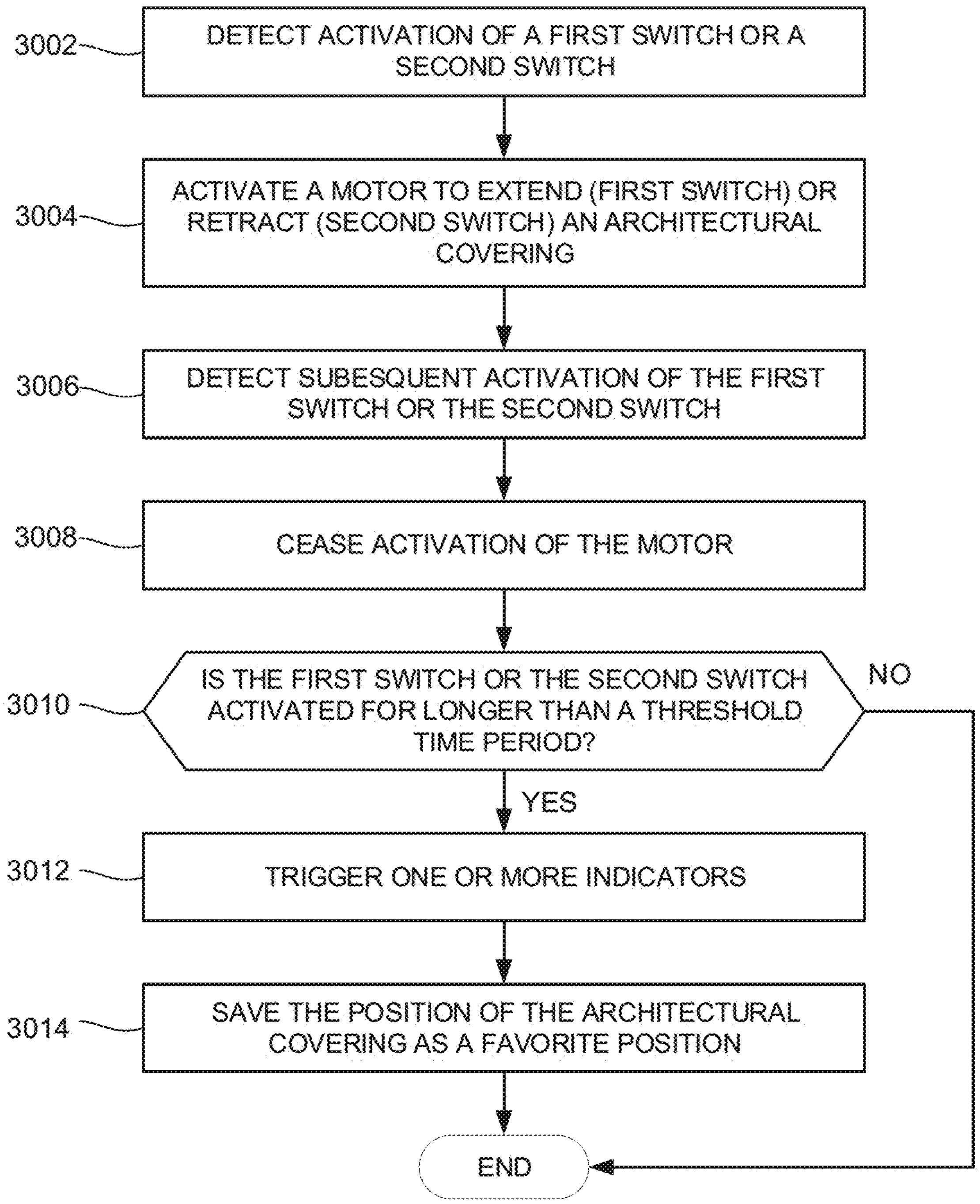
FIG. 30 is a flowchart representative of example machine readable instructions that may be executed to implement the architectural covering controller illustrated in FIG. 27 to set a stored position for a motorized architectural covering.

FIG. 30 is flowchart representative of example machine readable instructions, implemented by architectural covering controller 2700 of motor assembly 100, to set or establish a favorite position. In some examples, a user may set or establish a favorite position by providing a particular gesture. In some examples, to set a favorite position, a user pushes up or pulls down on a consumer touchpoint, such lever actuator 114, and releases to activate motor 102 to move architectural covering 304 up or down. Then, while architectural covering 304 is moving, the user pushes up or pulls down again on lever actuator 114 (e.g., in the same direction or the opposite direction as the original direction that started movement of architectural covering 304), which causes motor 102 to stop (e.g., as disclosed in connection with FIG. 28), and holds lever actuator 114 in the up or down position for a threshold time period (e.g., at least 2.5 seconds), which may be long enough to be indicative of an intentional hold and not an accidental hold. If lever actuator 114 is held for longer than the threshold time period (e.g., 3 seconds), the position of the architectural covering 304 is saved as the favorite position. Thus, an example gesture to save or store a favorite position may be a push/pull and hold.

For example, at block 3002, switch interface 2704 detects when one of first switch 422 or second switch 424 is activated (e.g., depressed) and, based on which switch 422, 424 has been activated, action determiner 2712 commands motor controller 2702 to activate motor 102 to rotate output shaft 104 (FIG. 1) in one direction or the other, at block 3004. At block 3006, switch interface 2704 detects when one of first switch 422 or second switch 424 are subsequently activated. If either switch 422, 424 is subsequently activated, action determiner 2712 commands motor controller 2702 to cease operation of motor 102 (e.g., by ceasing supply of power to motor 102) at block 3008.

At block 3010, action determiner 2712 determines how long first switch 422 or second switch 424 remains activated. For example, action determiner 2712 may compare the length of time to a threshold time period. The threshold time period may be stored in memory 2714. In some examples, the threshold time period 2.5 seconds. In other examples, other threshold time periods (e.g., more than 1 second, more than 2 seconds, more than 5 seconds, another time period not mistaken as an accidental hold, etc.) may be implemented. If first switch 422 or second switch 424 is deactivated (as detected by switch interface 2704) prior to the threshold time period, the example process ends. However, if action determiner 2712 determines that first switch 422 or second switch 424 is activated for a time period (e.g., 3 seconds) that meets the threshold time period, the action determiner 2712 determines that the user desires to save the current position as the favorite position. In some examples, one or more indicators may be triggered to alert the user that a favorite position has been established. For example, at block 3012, indicator trigger 2716 may activate one or both of indicators 2718*a*, 2718*b*. For instance, indicator trigger 2716 may activate a light, such as a blinking red light, and/or generate an audible alert, such as a beep. Additionally or alternatively, one or more other indicators may be performed. For example, indicator trigger 2716 may command motor controller 2702 to activate motor 102 to move architectural covering 304 up and down in jogging manner. At block 3014, the favorite position is saved in memory 2714 and the example process ends. The example process of FIG. 30 may be repeated again to set or save another favorite position.

While in the above example the favorite gesture is described as being a push/pull and hold of lever actuator 114, this is only one possible gesture that may be used. In other examples, the favorite gesture may include a different movement or series of movements and/or hold times. In some examples, multiple gestures may cause motor assembly 100 to save a favorite position.

In some examples, motor assembly 100 may be configured to enable a user to adjust the upper limit position and/or the lower limit position. The upper limit position and lower limit position define the upper and lower allowable limits of architectural covering 304. In other words, motor 102 may drive architectural covering 304 upward or downward until the upper limit position or the lower limit position is reached, at which point motor 102 ceases activation and architectural covering 304 stops moving. For example, the upper limit position may be set at or below a top of a window opening, and the lower limit position may be set at or above the bottom of the window opening. In some examples, a user may provide a gesture that causes motor assembly 100 to operate in an adjust-limit mode that enables the user to set new upper and/or lower limits. For example, the user may provide an adjust-upper-limit gesture, which is a gesture that causes motor assembly 100 to operate in an adjust-upper-limit mode. An example adjust-upper-limit gesture may be when architectural covering 304 is in the current upper limit position, and the user pushes up on lever actuator 114 and releases, followed by another push upward on lever actuator 114 and hold for a threshold time period (e.g., 6 seconds). The threshold time period may be one that is indicative of an intentional hold (and not an accidently push/pull). In other examples, other gestures may be used to cause motor assembly 100 to operate in the adjust-upper-limit mode. In the adjust-upper-limit mode, the user can move architectural covering 304 to a desired upper position and save the position as the new upper limit position (e.g., via a gesture). Likewise, the user may provide an adjust-lower-limit gesture, which causes motor assembly to operate in an adjust-lower-limit mode that enables the user to change the lower limit position. An example adjust-lower-limit gesture may be when architectural covering 304 is in the current lower limit position, and the user pulls down on lever actuator 114 and releases, followed by another pull down on lever actuator 114 and hold for a threshold time period (e.g., 6 seconds). In other examples, other gestures may be used to cause motor assembly 100 to operate in the adjust-lower-limit mode.

Figure 31:
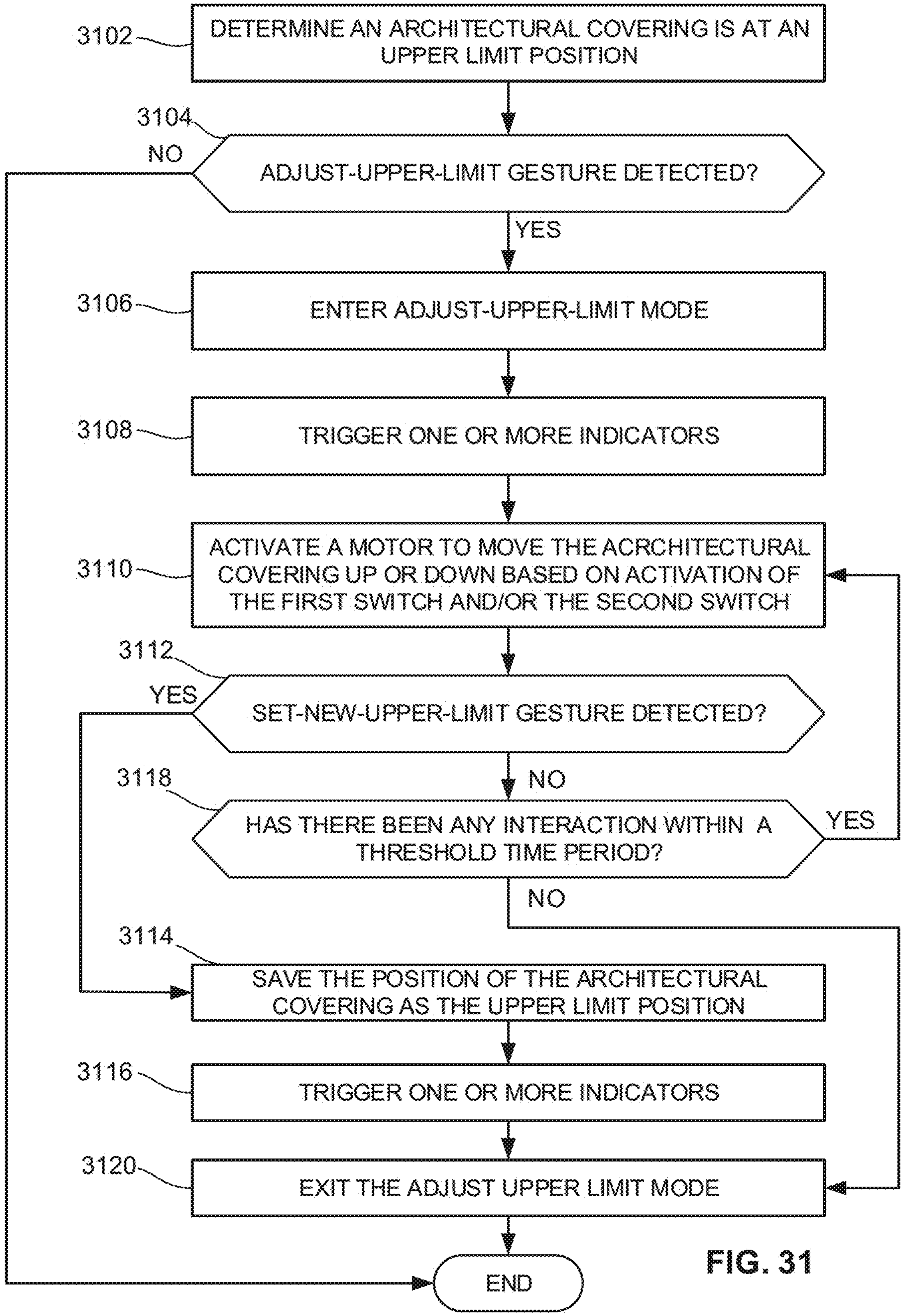
FIG. 31 is a flowchart representative of example machine readable instructions that may be executed to implement the architectural covering controller illustrated in FIG. 27 to adjust an upper limit position of a motorized architectural covering.

FIG. 31 is a flowchart representative of example machine readable instructions, implemented by architectural covering controller 2700 of motor assembly 100, to set or establish an upper limit position. At block 3102, action determiner 2712 determines that architectural covering 304 is at the upper limit position (e.g., the previously stored upper limit position). For example, action determiner 2712 may compare the position of architectural covering 304 (as determined by the position determiner 2710) to the previously stored upper limit position (e.g., saved in memory 2714). At block 3104, action determiner 2712 determines whether an adjust-upper-limit gesture (e.g., a first gesture) has been detected. If an adjust-upper-limit gesture has not been detected, the example process of FIG. 31 may end. Otherwise, if an adjust-upper-limit gesture has been detected, architectural covering controller 2700 enters an adjust-upper-limit mode, which enables a user to establish a new upper limit position. An example adjust-upper-limit gesture may include (1) a relatively fast upward movement and release of a consumer touchpoint, such as lever actuator 114, followed by (e.g., within a threshold time period, such as 0.5 seconds) (2) another upward movement and hold of the consumer touchpoint for a time period (e.g., 6 seconds). The time period may be long enough to indicate an intentional hold and not mistaken for an accidently hold. In such an example, action determiner 2712 may monitor for an activation sequence including a rapid activation of first switch 422 (such as detected by switch interface 2704) followed by a longer activation of first switch 422 (e.g., 6 seconds). In other examples, the adjust-upper-limit gesture may include a different sequence of activation(s) and/or hold time(s).

In some examples, once architectural covering controller 2700 is in the adjust-upper-limit mode (block 3106), one or more indicators (e.g., a light, a sound, a jog, etc.) may be activated to signal to the user that the upper limit position can now be set or established. For example, at block 3108, indicator trigger 2716 may activate one or both of indicators **2718*a*, 2718*b*. For instance, indicator trigger 2716 may activate a light and/or generate an audible alert, such as a beep. In some examples, a first light (e.g., a green light) is activated momentarily and then a second light (e.g., a red blinking light) is activated that remains activated during the adjust-upper-limit mode. In other words, in some examples, one or more of the indicator(s) remain activated while architectural covering controller 2700 is in the adjust-upper-limit mode and deactivated when architectural covering controller 2700 exits the adjust-upper-limit mode (e.g., as disclosed in connection with block 3120** below).

In the adjust-upper-limit mode, a user may move architectural covering 304 up and/or down to the new, desired upper limit position. At block 3110, action determiner 2712 activates motor 102 to move architectural covering 304 up or down based on activation of first switch 422 and/or second switch 424. In some example, the commands for activating motor 102 and deactivating motor 102 are substantially the same as disclosed in connection with FIG. 28. In other examples, activation of motor 102 may not start until after first switch 422 or second switch 424 is deactivated. For example, a user may push up on lever actuator 114, which activates first switch 422. Once the user releases lever actuator 114, and first switch 422 is deactivated, action determiner 2712 commands motor controller 2702 to activate motor 102 to move architectural covering 304 upward. To stop motor 102, the user may push up or pull down on lever actuator 114, which activates first switch 422 or second switch 424.

At block 3112, action determiner 2712 determines whether a set-new-upper-limit gesture (e.g., a second gesture) has been detected. If a set-new-upper-limit gesture has been detected, action determiner 2712 may save the position of architectural covering 304 as the new upper limit position at block 3114 and activate one or more indicators at block 3116, as disclosed in further detail below. If a set-new-upper-limit gesture has not been detected, action determiner 2712 determines whether there has been any interaction within a threshold time period (e.g., 1 minutes) at block 3118. If there has been no interaction within the threshold time period, architectural covering controller 2700 exits the adjust-upper-limit mode at block 3120. If there has been interaction within the threshold period of time, architectural covering controller 2700 continues to operate in adjust-upper-limit mode and activates motor 102 to move architectural covering 304 based on commands from the user.

As mentioned above, if a set-new-upper-limit gesture is detected (at block 3112), action determiner 2712 saves the position of architectural covering 304 as the new upper limit position at block 3114. The set-new-upper-limit gesture may include one or more activations (e.g., a sequence of activations) of first switch 422 and/or second switch 424 and/or include various hold times for each. An example set-new-upper-limit gesture may include pushing up and holding lever actuator 114 for a period of time (e.g., 6 seconds) (which may a period of time indicative of an intentional activation and not an accidental activation). In such an example, action determiner 2412 may monitor for activation of first switch 422 (as detected by switch interface 2704) for the period of time. As mentioned above, in some examples, in the adjust-upper-limit mode, motor 102 may not be activated to move architectural covering 304 until the respective switch is released. Therefore, while holding lever actuator 114 up or down, first or second switch 422, 424 is activated and architectural covering 304 remains stationary. If lever actuator 114 is held in the up or down position for the threshold time period (e.g., indicating an intentional activation), the position of architectural covering 304 is saved as the new upper limit position.

In some examples, at block 3116, indicator trigger 2716 may activate one or more indicators (e.g., a light, a sound, a jog, etc.) to signal to the user that a new upper limit position has been set. For instance, indicator trigger 2716 may activate a light and/or generate an audible alert, such as a beep. In some examples, indicator trigger 2716 may activate a different color light than the light activated when entering the adjust-upper-limit mode. For instance, while in the adjust-upper-limit mode, indicator trigger 2716 may activate a blinking red light, and when a new upper limit position is set (block 3114), the red light may be turned off and a green light may be activated. Additionally or alternatively, indicator trigger 2716 may command motor controller 2702 to activate motor 102 to move architectural covering 304 up and down or down and up (e.g., a jog) (back to the new position) to indicate a new position has been established. After the new upper limit position has been saved and/or one or more indicators have been triggered, architectural covering controller 2700 exits the adjust-upper-limit mode at block 3120. Architectural covering controller 2700 may then operate in the normal mode as disclosed in connection with FIG. 28, for example.

Similar to the process of FIG. 31 for setting an upper limit position, architectural covering controller 2700 may be configured to set a lower limit position. For example, when architectural covering 304 is at the lower limit position, an adjust-lower-limit gesture may trigger architectural covering controller 2700 to enter an adjust-lower-limit mode, where the user can change the lower limit position. An example adjust-lower-limit gesture may be similar to but opposite that of the adjust-upper-limit gesture. Once in the adjust-lower-limit mode, the user can similarly use lever actuator 114 to move architectural covering 304 to a new, desired lower limit position. Then, after a set-new-lower-limit gesture is detected and the new lower limit position is saved, architectural covering controller 2700 may exit the adjust-lower-limit mode, similar to FIG. 31.

Figure 32:
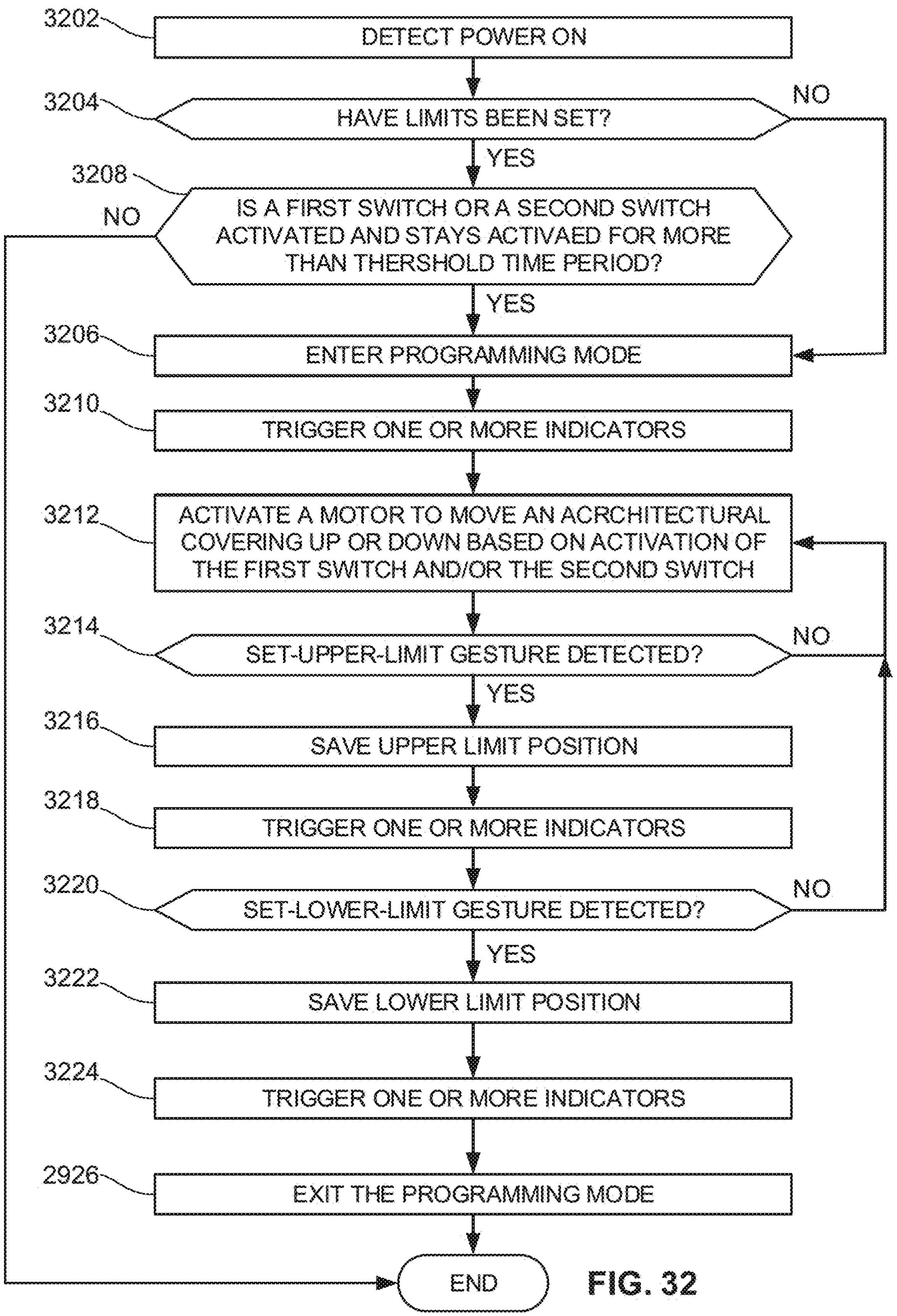
FIG. 32 is a flowchart representative of example machine readable instructions that may be executed to implement the architectural covering controller illustrated in FIG. 27 to program one or more limit positions for a motorized architectural covering.

In some examples, motor assembly 100 may be configured to enter a programming mode, which erases any previously stored limits and requires setting of new limits (e.g., customized limits). In some examples, motor assembly 100 automatically enters the programming mode the first time motor assembly 100 is activated (e.g., powered on after leaving the manufacturer), to ensure the limits are set before use if there are no pre-set factory limits. FIG. 32 is a flowchart representative of example machine readable instructions, implemented by architectural covering controller 2700 of motor assembly 100, to set or establish limits in a programming mode. The example process may begin when motor assembly 100 is plugged into a power source. At block 3202, action determiner 2712 determines when power has been applied to motor assembly 100. At block 3204, action determiner 2712 determines if an upper limit and/or a lower limit has been set. For example, action determiner 2712 may check if any limits have been saved in memory 2714. If the limits have not been set, architectural covering controller 2700 enters a programming mode (sometimes referred to as a set limits mode) at block 3206, which enables a user to set the upper and/or lower limits. If the limits have already been set, a user may perform a gesture with a consumer touchpoint, such as lever actuator 114, to indicate that the user desires to enter the programming mode and reset the upper and lower limits. An example gesture may include pushing up or pulling down on lever actuator 114 while powering on motor assembly 100 and holding lever actuator 114 in the up or down position for a threshold time period (e.g., 6 seconds). The threshold time period may be a relatively longer period of time so as not to misconstrue an accidental movement as a desire to change the limits. For example, at block 3208, action determiner 2712 determines whether first switch 422 or second switch 424 is activated (as detected by switch interface 2704) while powering up motor assembly 100 and stays activated for more than the threshold time period. If action determiner 2712 determines that first switch 422 or second switch 424 is activated while powering up motor assembly 100 and stays activated for more than the threshold time period (e.g., indicating an intentional hold), architectural covering controller 2700 enters the programming mode at block 3206. Otherwise, the example process may end and motor assembly 100 may operate in a normal operating mode, such as disclosed in connection with FIG. 28.

In some examples, once architectural covering controller 2700 enters the programming mode, one or more indicators may be triggered. For example, at block 3210, indicator trigger 2716 may activate one or both of indicators 2718*a*, 2718*b*. For instance, indicator trigger 2716 may activate a light and/or generate an audible alert, such as a beep. In some examples, a first light (e.g., a green light) is activated momentarily and then a second light (e.g., a red blinking light) is activated that remains activated during the programming mode. In other words, in some examples, one or more of the indicator(s) remain activated while architectural covering controller 2700 is in the programming mode and deactivated when architectural covering controller 2700 exits the programming mode (e.g., as disclosed in connection with block 3226 below).

In the programming mode, the user may use lever actuator 114 to move architectural covering 304 up and/or down to the desired upper and/or lower limits. At block 3212, action determiner 2712 commands motor controller 2702 to activate motor 102 to move architectural covering 304 up or down based on activation of first switch 422 and/or second switch 424. In some example, the commands for activating motor 102 and deactivating motor 102 are substantially the same as disclosed in connection with FIG. 28. In other examples, activation of motor 102 may not start until after first switch 422 or second switch 424 is deactivated. For example, a user may push up on lever actuator 114, which activates first switch 422. Once the user releases lever actuator 114, and first switch 422 is deactivated, action determiner 2712 commands motor controller 2702 to activate motor 102 to move architectural covering 304 upward. To stop motor 102, the user may push up or pull down on lever actuator 114, which activates first switch 422 or second switch 424.

At block 3214, action determiner 2412 determines if a set-upper-limit gesture (e.g., a first gesture) has been detected. If a set-upper-limit gesture has been detected, action determiner 2712 saves the position of architectural covering 304 as the upper limit, at block 3216, and indicator trigger 2716 activates one or more indicators, at block 3218, to indicate to the user that the upper limit position has been set. The set-upper-limit gesture may be substantially the same as the set-new-upper limit gesture disclosed in connection with block 3112 of FIG. 31. Additionally, the indicator(s) may be substantially the same as disclosed in connection with block 3116 of FIG. 31. If the set-upper-limit gesture has not been detected (block 3214), action determiner 2712 continues to activate motor 102 to move architectural covering 304 based on user input at block 3212.

In addition to setting the upper limit position, the user may set a lower limit position. At block 3220, action determiner 2712 determines if a set-lower-limit gesture (e.g., a second gesture) has been detected. If a set-lower-limit gesture has been detected, action determiner 2712 saves the position of architectural covering 304 as the lower limit, at block 3222, and indicator trigger 2716 activates one or more indicators, at block 3224, to indicate to the user that the lower limit position has been set. The set-lower-limit gesture may be opposite the set-upper-limit gesture. For example, the set-lower-limit gesture may include pulling down on lever actuator 114 and holding lever actuator 114 for a threshold time period (e.g., 6 seconds). The threshold time period may be a relatively longer period to avoid misconstruing an accidental movement as a desire to change the limit. In such an example, action determiner 2712 may monitor for activation of second switch 424 (as detected by switch interface 2704) for the period of time. Additionally, the indicator(s) at block 3224 may be substantially the same as disclosed in connection with block 3218 above. If the set-lower-limit gesture has not been detected (block 3220), action determiner 2712 continues to activate motor 102 to move architectural covering 304 based on user input, at block 3212.

Once both limits have been set, architectural covering controller 2700 exits the set limits mode at block 3226. While in the illustrated example the upper limit is illustrated as being set first, it is understood that the lower limit may instead be set first, and then the upper limit may be set. The upper and lower limit positions may be saved in memory 2714.

In some aspects of this disclosure, an architectural covering may be configured to have two or more phases or regions of movement that correspond to different functions. For example, an architectural covering may operate in a first phase where the covering is extended or retracted (e.g., similar to the functions disclosed in connection with FIG. 28) and a second phase where vanes in the covering are configured to allow more or less light through the covering (e.g., by tilting). In other examples, other types and/or configurations of coverings may similarly have multiple phases or regions of movement. In some examples, the motor operates to move the covering at different speeds in the different phases. In some examples, the architectural covering may have a transition limit position that separates these different phases or modes. In some such examples, the motor stops the covering at the transition limit position, and a subsequent user gesture is needed to re-activate the motor to move the covering in the next phase. In other examples, the motor may continue to move the architectural covering into the next phase, where the architectural covering is moved at a different speed, without stopping the architectural covering at the transition position until the architectural covering reaches one of the limit positions and/or is stopped by a user gesture.

Figure 33:
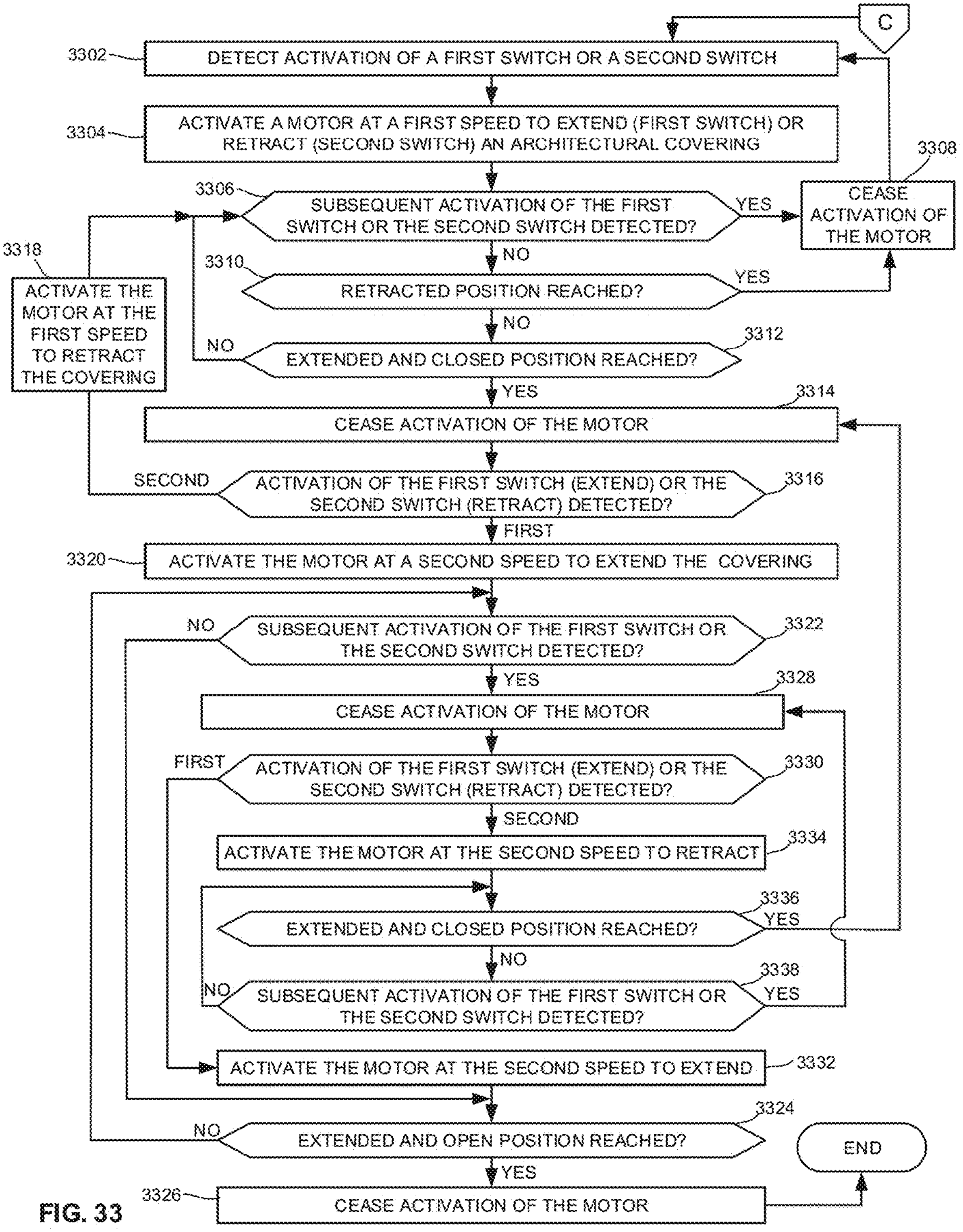
FIG. 33 is a flowchart representative of example machine readable instructions that may be executed to implement the architectural covering controller illustrated in FIG. 27 to operate a motorized architectural covering at multiple speeds.

FIG. 33 is a flowchart representative of example machine readable instructions implemented by architectural covering controller 2700 of motor assembly 100 to operate an architectural covering having two phases and separated by a transition limit position. However, before turning to the flowchart of FIG. 33, an example of a covering 3400 having two phases is disclosed in connection with FIGS. 34A-34C. In the illustrated examples of FIGS. 34A-34C, covering 3400 is coupled to a roller tube 3402 that may be rotated in one direction to extend covering 3400 and an opposite direction to retract covering 3400. Roller tube 3402 and covering 3400 may be used with motor assembly 100. For example, output shaft 104 may be coupled to roller tube 3402, and motor 102 may be used to rotate roller tube 3402 in one direction or the other depending on the gestures or commands input by a user, as disclosed herein.

Figure 34A:
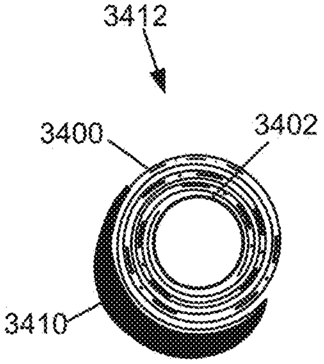
FIGS. 34A-34C illustrate side views of an example of an architectural covering at three limit positions and described in connection with the flowchart of FIG. 33.
Figure 34B:
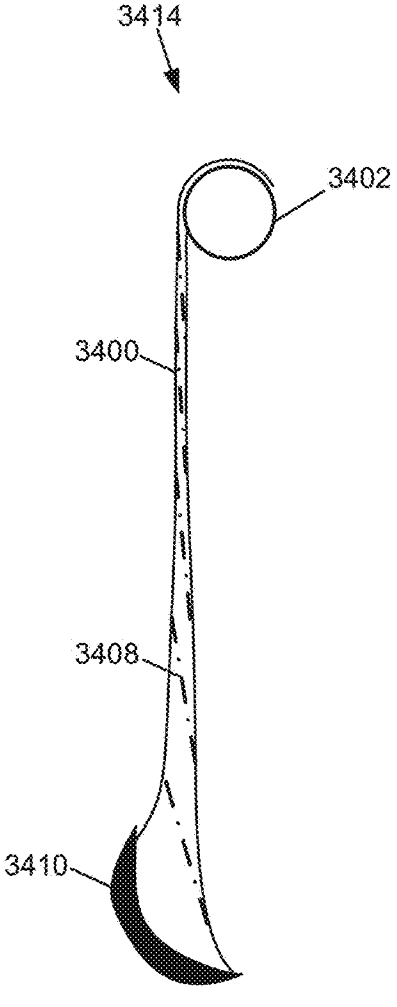
Figure 34C:
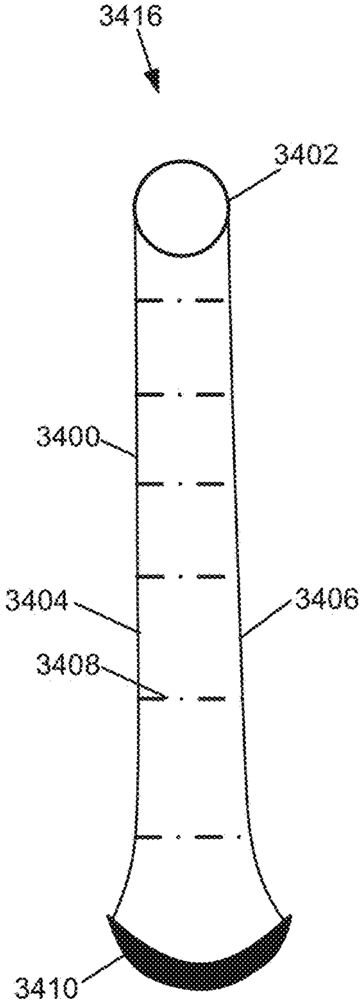
Figures 35A, 35B, 35C, 35D:
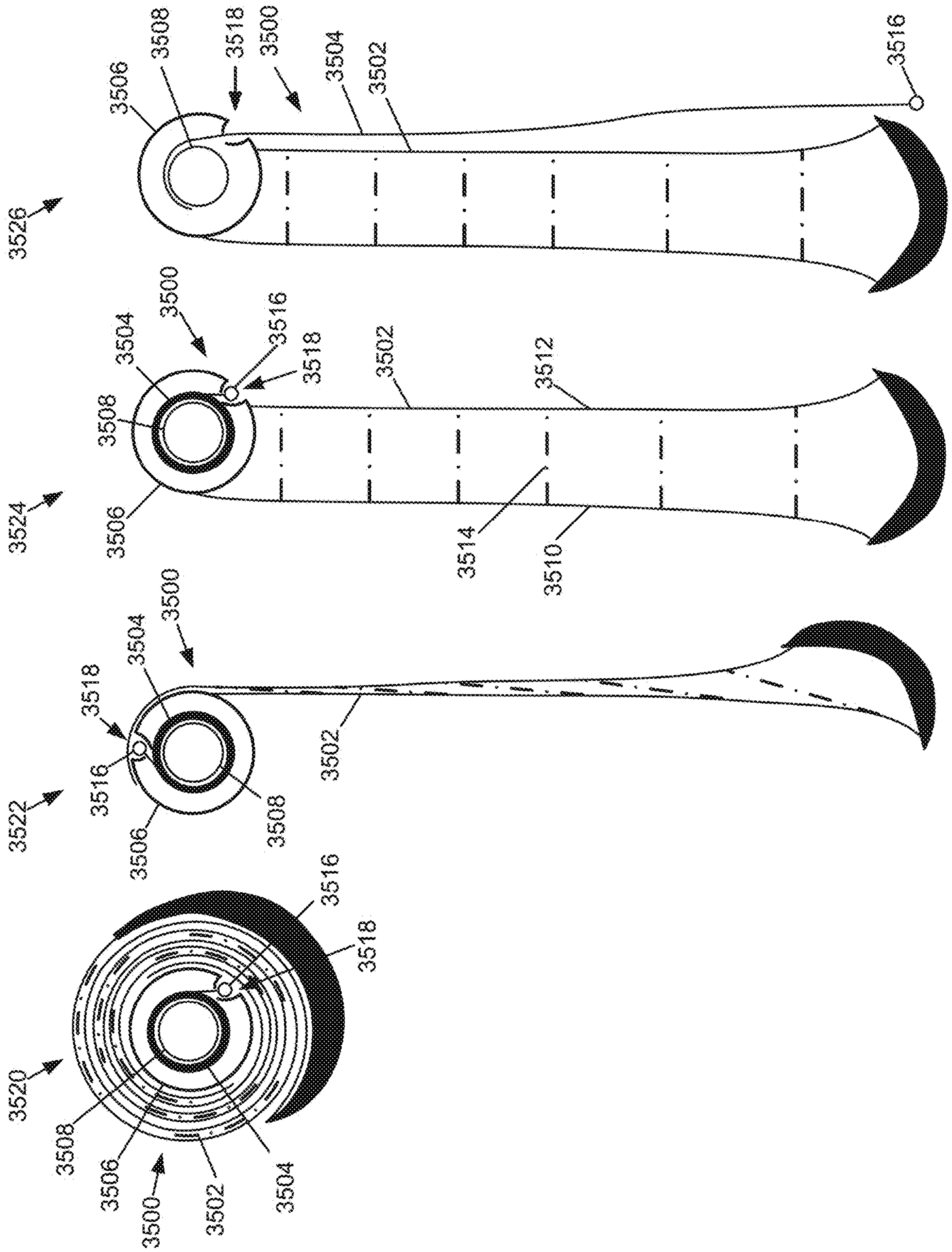
FIGS. 35A-35D illustrate side views of an example of an architectural covering at four limit positions.

In the illustrated example, covering 3400 has a first support element 3404 (e.g., a front panel), a second support element 3406 (e.g., a back panel), and a plurality of vanes 3408 coupled between first and second support elements 3404, 3406. FIGS. 34A-34C show side views of covering 3400 in three positions: a first position 3412 of FIG. 34A (referred to as a retracted position 3412) in which covering 3400 is wrapped around a roller tube; a second position 3414 of FIG. 34B (referred to as an extended and closed position 3414) in which covering 3400 is extended and vanes 3408 are closed; and a third position 3416 of FIG. 34C (referred to as an extended and open position 3416) in which covering 3400 is extended and vanes 3408 are opened. Retracted position 3412 may correspond to, for example, an upper limit position, extended and closed position 3414 may correspond to, for example, a transition limit position, and extended and open position 3416 may correspond to, for example, a lower limit position. First support element 3404, second support element 3406, and vanes 3408 may be constructed of fabric, for example. A bottom rail 3410 is coupled to one or both of the bottom ends of first and second support elements 3404, 3406. As illustrated in the upper limit position, first and second support elements 3404, 3406 (and vanes 3408) are wrapped around roller tube 3402. As roller tube 3402 rotates to extend covering 3400 (in the counter-clockwise direction in FIGS. 34A-34C), both first and second support elements 3404, 3406 are lowered downward.

Between retracted position 3412 and extended and closed position 3414, vanes 3408 are orientated substantially vertically between first and second support elements 3404, 3406. As such, vanes 3408 substantially block light beams passing therethrough and are considered "closed." The phase or region between retracted position 3412 and extended and closed position 3414 may be referred to as a raising/lowering or extending/retracting phase or region. In some example, the commands for activating and deactivating motor 102 in this phase are substantially the same as disclosed in connection with FIG. 28.

To open vanes 3408, roller tube 3402 is rotated (in the counter-clockwise direction in FIGS. 34A-34C) beyond extended and closed position 3414. In other words, after covering 3400 has been dispensed, roller tube 3402 may be further rotated. The phase between extended and closed position 3414 and extended and open position 3416 may be referred to as the tilt phase or region. In this phase, vanes 3408 are tilted and/or otherwise moved to affect the amount of light through covering 3400. For example, as illustrated in FIG. 34C, first and second support elements 3404, 3406 may be coupled to different sides or sections of roller tube 3402. As such, in extended and open position 3416, first and second support elements 3404, 306 hang from opposite sides of roller tube 3402, which results in first and second support elements 3404, 3406 being spaced apart, as compared to first and second support elements 3404, 3406 in extended and closed position 3414. By moving first and second support elements 3404, 3406 or relative to each other (by rotating roller tube 3402 between extended and closed position 3414 and extended and open position 3416), vanes 3408 are rotated to a more horizontal orientation, as shown in extended and open position 3416 in FIG. 34C, thereby allowing more light through covering 3400 (by allowing light between vanes 3408). Retracted position 3412, extended and closed position 3414, and/or extended and open position 3416 may be stored in memory 2714.

In some aspects of this disclosure, first and second support elements 3404, 3406 are constructed of material that allows more light through, such as a sheer fabric, whereas vanes 3408 may be constructed of material that allows less light through (e.g., a light-blocking fabric). Therefore, when covering 3400 is operating in the extending/retracting phase or region between retracted position 3412 and extended and closed position 3414, vanes 3408 are in the vertical orientation and block more light. Vanes 3408 are arranged such that in the vertical orientation vanes 3408 overlap or nearly overlap, thereby providing a continuous wall of light blocking material. However, when vanes 3408 are opened, such as in extended and open position 3416, vanes 3408 are in a more horizontal orientation and, thus, allow more light through covering 3400.

In some examples, based on a gesture from a user (e.g., using lever actuator 114), motor controller 2702 activates motor 102 to rotate roller tube 3402 to extend covering 3400 until extended and closed position 3414 is reached and then stops rotating roller tube 3402. In other words, extended and closed position 3414 operates as a limit position. Then, when another gesture is detected, motor controller 2702 activates motor 102 to rotate roller tube 3402 to move covering 3400 to extended and open position 3416. This process may also be performed in reversed. For example, if covering 3400 is in extended and open position 3416 (and, thus, vanes 3408 are opened), a user may provide a gesture that moves covering 3400 to extended and closed position 3414, in which motor 102 stops moving covering 3400. Then, another gesture is needed to retract covering 3400 back to retracted position 3412. In some aspects of this disclosure, motor controller 2702 activates motor 102 to rotate roller tube 3402 (and, thus, retract or extend covering 3400) at a first speed in the extending/retracting phase or region between retracted position 3412 and extended and closed position 3414, and activates motor 102 to rotate roller tube 3402 at a second speed in the tilt phase or region between extended and closed position 3414 and extended and open position 3416. In some examples, the second speed is slower than the first speed. As such, the movement of opening and/or closing vanes 3408 appears slower and more subtle than the movement of extending or retracting covering 3400. In some examples, a user may provide a gesture to stop motor 102 at any point between the positions. Therefore, a user can pick the desired position and/or amount of light blocking provided by covering 3400.

In some examples, the different phases may be defined by the amount of material extended or retracted. For example, with covering 3400, a first amount of material is extended or retracted during a first phase (between retracted position 3412 and extended and closed position 3414) and a second amount of material is extended or retracted during a second phase (between extended and closed position 3414 and extended and open position 3416), where the second amount of material is less than the first amount of material. In another example, the different phases may be defined by the amount of light transmission or view allowed through the architectural covering. For example, with covering 3400, a first amount of light is able to be transmitted through covering 3400 during a first phase (between retracted position 3412 and extended and closed position 3414 where vanes 3408 are closed) and a second amount of light is able to be transmitted through covering 3400 during a second phase (between extended and closed position 3414 and extended and open position 3416 where vanes 3408 are at least partially opened). In this example, more light is transmitted through covering 3400 during the second phase. A retracted configuration, such as retracted position 3412, is a configuration in which covering 3400 is substantially withdrawn from covering an architectural structure, opening, or the like. A vanes closed configuration, such as in extended and closed position 3414, is a configuration in which vanes 3408 are positioned or configured to substantially block view through vanes 3408 and, thus, through covering 3400. A vanes opened configuration, such as in extended and open position 3416, is a configuration in which vanes 3408 are positioned or configured to allow view through vanes 3408 and, thus, through covering 3400. In some examples, the speed during a first phase is substantially continuous and a speed during a second phase is substantially continuous. The speed(s) during the second phase may be the same or different from the speed of the first phase.

As mentioned above, FIG. 33 is a flowchart representative of example machine readable instructions implemented by architectural covering controller 2700 of motor assembly 100 to operate an architectural covering having two phases separated by a transition limit position, such as extended and closed position 3414. The example flowchart of FIG. 33 is described in connection with covering 3400 of FIGS. 34A-34C. However, the example process of FIG. 33 may likewise be implemented with other types of architectural coverings having two or more phases. The phases may be set by a user and stored in memory 2714, for example.

Assuming covering 3400 is at a position between retracted position 3412 and extended and closed position 3414, the example flowchart begins at block 3302 of FIG. 33, where architectural covering 3400 is stationary and switch interface 2704 detects that one of first switch 422 or second switch 424 has been activated (e.g., depressed). In some example, the commands for activating and deactivating motor 102 are substantially the same as disclosed in connection with the flowchart of FIG. 28. For example, based on which switch has been activated, action determiner 2712 commands motor controller 2702 to activate motor 102 to rotate output shaft 104 (FIG. 1) in one direction or the other to retract or extend architectural covering 3400 at block 3304. For example, when first switch 422 has been triggered by pushing up on lever actuator 114, action determiner 2712 commands motor controller 2702 to activate motor 102 to drive output shaft 104 in one direction to raise architectural covering 3400. Similarly, if second switch 424 has been triggered by pulling down on lever actuator 114, action determiner 2712 commands motor controller 2702 to activate motor 102 to drive output shaft 104 in the other direction to lower architectural covering 3400. In the extending/retracting phase, between retracted position 3412 and extended and closed position 3414, motor 102 is activated to drive roller tube 3402 at a first speed (e.g., 30 revolutions-per-minute (RPMs)), which may be a relatively faster speed than in the tilt phase, as disclosed in further detail below.

In some examples, motor 102 continues to drive architectural covering 3400 up or down until retracted position 3412 or extended and closed position 3414 is reached or the user provides another gesture, such as pushing up or pulling down on lever actuator 114. For example, at block 3306, action determiner 2712 monitors for a signal from switch interface 2704 indicating activation of either switch 422, 424. If either switch 422, 424 is activated (as detected by switch interface 2704), action determiner 2712 commands motor controller 2702 to deactivate motor 102 (e.g., by ceasing supply of power to motor 102), at block 3308. Thus, switch interface 2704 detects a subsequent movement of lever actuator 114 in the up or down direction and, in response to detecting the subsequent movement, action determiner 2712 commands motor controller 2702 to cease activation of motor 102.

Otherwise, if a subsequent activation of either switch 422, 424 is not detected, motor 102 continues to extend or retract covering 3400 until retracted position 3412 (e.g., and upper limit position) or extended and closed position 3414 (e.g., a transition limit position) is reached. For example, at blocks 3310 and 3312, action determiner 2712 determines if architectural covering 3400 reaches retracted position 3412 or extended and closed position 3414 (depending on the direction of travel). In some examples, retracted position 3412 and extended and closed position 3414 are stored in memory 2714. If either position is not reached, motor 102 continues to move architectural covering 3400 up or down until action determiner 2712 detects a manual stop gesture (block 3306) or one of positions 3412, 3414 is reached (blocks 3310, 3312). If retracted position 3412 is reached, action determiner 2712 commands motor controller 2702 to deactivate motor 102, at block 3308. Once architectural covering 3400 is stopped, the example process of FIG. 33 ends, or may be begin again at block 3302.

If extended and closed position 3414 is reached, action determiner 2712 commands motor controller 2702 to deactivate motor 102, at block 3314. At extended and closed position 3414, a user can gesture to move the covering 3400 back up (e.g., to lift covering 3400), or can gesture to move the covering 3400 further downward into the tilt phase, which may cause vanes 3408 to open.

For example, at block 3316, switch interface 2704 detects whether first switch 422 or second switch 424 has been activated (e.g., depressed). If second switch 424 is activated (e.g., by pushing up on lever actuator 114), action determiner 2712 commands motor controller 2702, at block 3318, to activate motor 102 to rotate output shaft 104 (FIG. 1) to retract architectural covering 3400 at the first speed, and control returns to block 3306.

On the other hand, if first switch 422 is activated (e.g., by pulling down on lever actuator 114), action determiner 2712 commands motor controller 2702, at block 3320, to activate motor 102 to rotate output shaft 104 (FIG. 1) to extend architectural covering 3400 at a second speed, which causes covering 3400 to move into the tilt phase. In the tilt phase, motor assembly 100 may operate similar to the extending/retracting phase, in that motor 102 continues to rotate roller tube 3402 until a subsequent gesture is provided or until a position (e.g., a limit) is reached. In the tilt phase, extending or retracting architectural covering 3400 causes vanes 3408 to open or close. In the tilt phase, motor 102 moves architectural covering 3400 at the second speed (e.g., 6 RPMs), which may be slower than the first speed in the extending/retracting phase. In some such examples, it is desired to provide the user with finer control of the movement of vanes 3408. Therefore, running motor 102 at a slower speed enables the user to more easily stop covering 3400 when the desired orientation of vanes 3408 is reached.

For example, at block 3322, action determiner 2712 monitors for a signal from switch interface 2704 indicating activation of either switch 422, 424. If a subsequent activation of either switch 422, 424 is not detected, motor 102 continues to extend covering 3400 until extended and open position 3416 is reached. For example, at block 3324, action determiner 2712 determines if architectural covering 3400 reaches extended and open position 3416. If extended and open position 3416 is not reached, motor 102 continues to rotate roller tube 3402 until action determiner 2712 detects a manual stop gesture (block 3322) or extended and open position 3416 is reached (block 3324). If extended and open position 3416 is reached, action determiner 2712 commands motor controller 2702, at block 3326, to deactivate motor 102. Once architectural covering 3400 is stopped in extended and open position 3416, the example process of FIG. 33 ends. The example process may be performed in reverse to retract architectural covering 3400.

Returning back to block 3322, if either switch 422, 424 is activated (as detected by switch interface 2704), action determiner 2712 commands motor controller 2702 to deactivate motor 102 (e.g., by ceasing supply of power to motor 102), at block 3328. Thus, switch interface 2704 detects a subsequent movement of lever actuator 114 in the up or down direction and, in response to detecting the subsequent movement, action determiner 2712 commands motor controller 2702 to cease activation of motor 102.

Then, a subsequent activation of either switch may be used to move covering 3400 upward or downward. For example, at block 3330, switch interface 2704 detects whether first switch 422 or second switch 424 has been activated (e.g., depressed). If first switch 422 is activated (e.g., by pushing up on lever actuator 114), action determiner 2712 commands motor controller 2702, at block 3332, to activate motor 102 to rotate output shaft 104 (FIG. 1) to extend architectural covering 3400 at the second speed. Then, motor 102 continues to rotate roller tube 3402 (in the counter-clockwise direction shown in FIG. 34) until action determiner 2712 detects extended and open position 3416 is reached (block 3324) or a manual stop gesture is provided (block 3322).

Returning to block 3330, if second switch 424 is activated (e.g., by pushing up on lever actuator 114), action determiner 2712 commands motor controller 2702, at block 3334, to activate motor 102 to rotate output shaft 104 (FIG. 1) to retract architectural covering 3400 at the second speed. Motor 102 continues to extend covering 3400 until extended and closed position 3414 is reached or a subsequent stop gesture is provided. For example, at block 3336, action determiner 2712 determines if architectural covering 3400 reaches extended and closed position 3414. If extended and closed position 3414 is reached, action determiner 2712 commands motor controller 2702, at block 3314, to deactivate motor 102. At this point, a user can provide a gesture to move covering 3400 up into the extending/retracting phase or back down into the tilt phase.

Otherwise, if extended and closed position 3414 is not reached, action determiner 2712 continues to monitor for a signal from switch interface 2704 indicating activation of either switch 422, 424, at block 3338. If a subsequent activation is detected, action determiner 2712 commands motor controller 2702, at block 3328, to deactivate motor 102. If no subsequent activation is detected, motor 102 continues to move architectural covering 3400 up until action determiner 2712 detects extended and open position 3416 is reached (block 3336) or a manual stop gesture is provided (block 3338).

In some examples, for movement in the extending/retracting phase, motor 102 drives covering 3400 at the first speed while ramping up and/or down the speed for stops. For movement in the movement tilt phase, however, motor 102 may drive covering 3400 at the second speed without ramping up and/or down, because the second speed is relatively slow. However, in other examples, motor 102 may also ramp up and/or down the speed in the tilt phase.

In some examples, an architectural covering may have more than two phases or regions (e.g., three phases, four phases, etc.), where each phase is separated by a transition limit position. For example, covering 3400 may have a third phase, after the tilt phase, which defines another position between the third phase and the tilt phase. In some such examples, motor controller 2702 ceases activation of motor 102 at each position, and a subsequent gesture may be used to re-activate motor 102 to move the covering into the next phase. Motor 102 may be operated at the same or different speeds each of the phases.

For example, FIGS. 35A-35D illustrate a covering assembly 3500 having three phases (separated by two positions (e.g., two transition limit positions)). In the illustrated examples of FIGS. 35A-35D, covering assembly 3500 includes two coverings: a first covering 3502 and a second covering 3504. First covering 3502 is coupled to a first roller tube 3506 (e.g., an outer roller tube) and second covering 3504 is coupled to a second roller tube 3508 (e.g., an inner roller tube) disposed inside (or partially within) first roller tube 3506. Roller tubes 3506, 3508 and coverings 3502, 3504 may be used with motor assembly 100. For example, output shaft 104 may be coupled to roller tubes 3506, 3508, and motor 102 may be used to rotate one or both of roller tubes 3506, 3508 in one direction or the other depending to extend or retract coverings 3502, 3504.

In the illustrated example, first covering 3502 is substantially the same as covering 3400 of FIG. 34. In particular, first covering 3502 includes a first support element 3510, a second support element 3512, and vanes 3514. Similar to covering 3400 (FIG. 34), first covering 3502 moves between a retracted position 3520 of FIG. 35A (an upper limit position), an extended and closed position 3522 of FIG. 35B (e.g., a first transition limit position), and an extended and open position 3524 of FIG. 35C (e.g., a second limit position). In the extending/retracting phase, between retracted position 3520 and extended and closed position 3522, motor 102 rotates first roller tube 3506 at a first speed, and in the tilt phase, between extended and closed position 3522 and extended and open position 3524, motor 102 rotates first roller tube 3506 at a second speed, which may be slower than the first speed.

Second roller tube 3508 is rotated with first roller tube 3506 during the extending/retracting and tilt phases. As illustrated in the example of FIG. 35A-35D, an end or bottom rail 3516 of second covering 3504 may be disposed in a notch 3518 in first roller tube 3506. When first covering 3502 is wrapped around first roller tube 3506 (during the extending/retracting and tilt phases), second covering 3504 is prevented from unwinding. However, once first covering 3502 is moved to extended and open position 3524 (e.g., a second transition position), notch 3518 is exposed. After first covering 3502 is moved to the extended and open position 3524 (e.g., where vanes 3514 are opened), motor 102 rotates second roller tube 3508, without rotating first roller tube 3506, to dispense (extend) second covering 3504 out of notch 3518. Second covering 3504 may be, for example, a darker fabric, sometimes referred to as a room-darkening shade or liner, that blocks a significant amount of light. Second covering 3504 may be extended or retracted between the retracted position shown in extended and open position 3524 and an extended position 3526 of FIG. 35D (a lower limit position). During this phase (e.g., a third phase, a room-darkening shade or liner phase), motor 102 may rotate second roller tube 3508 at a different speed than the first and second speed of the extending/retracting phase and tilt phase. In other examples, motor 102 may rotate second roller tube 3508 at the same speed as the first speed or the second speed. In some example, the commands for activating motor 102 and deactivating motor 102 in each of the phases is substantially the same as disclosed in connection with FIG. 28. In other words, motor 102 may continue to drive first and/or second roller tubes 3506, 3508 until a subsequent gesture is provided by a user or until a position is reached.

In some examples, similar to the process disclosed in connection with FIG. 33, motor controller 2702 may deactivate motor 102 at each of the positions. Then, a subsequent gesture provided by a user may be used to re-activate the motor 102 to move first and/or second coverings 3502, 3504 into the next phase. In other examples, motor assembly 100 does not stop movement of the covering (e.g., first and/or second coverings 3502, 3504) at each position. Instead, motor 102 may continue to rotate the roller tube and the covering into the next phase without ceasing movement of the covering at the position(s). In some such examples, motor 102 may ramp up or down to the desired speed in the next phase.

Figure 36C:
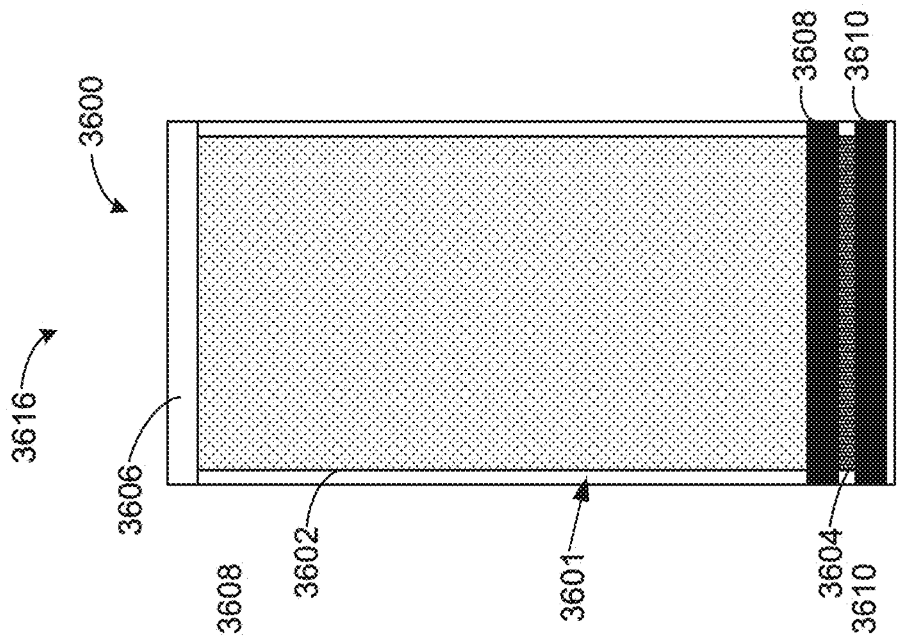
FIGS. 36A-36C illustrate front views of an example of an architectural covering at three positions.
Figure 36B:
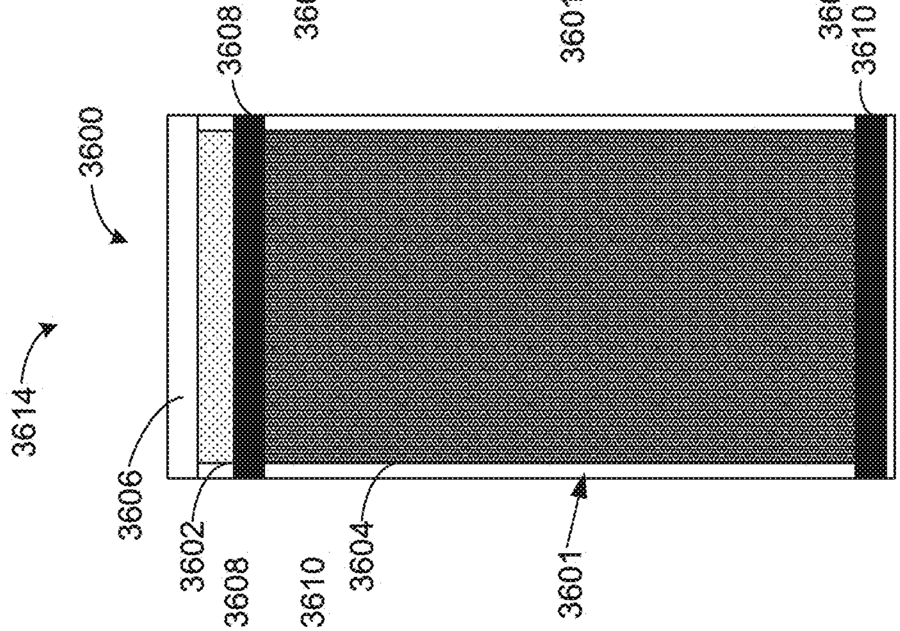
Figure 36A:
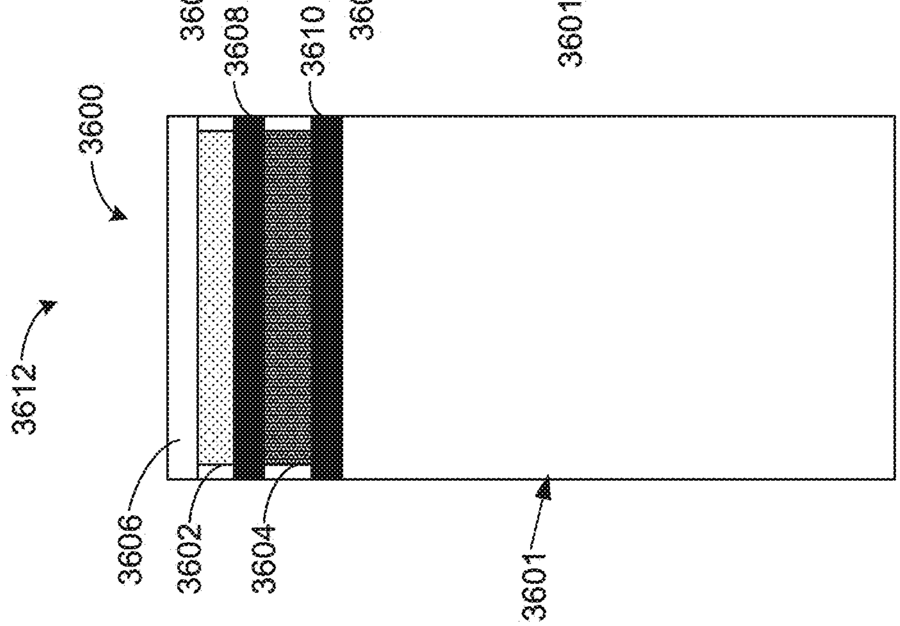

FIGS. 36A-36C illustrates another example covering assembly 3600 having multiple phases or mode that are each separated by a transition limit position. In FIGS. 36A-36C, covering assembly 3600 is shown as disposed in an architectural opening 3601 (e.g., a window opening). In this example, covering assembly 3600 includes a headrail 3606, a first rail 3608 (which may be referred to as a middle rail), a second rail 3610 (which may be referred to as a bottom rail), a first covering 3602, and a second covering 3604. First rail 3608 is disposed between headrail 3606 and second rail 3610. First covering 3602 is coupled between headrail 3806 and first rail 3608, and second covering 3604 is coupled between first rail 3608 and second rail 3610. First rail 3608 and second rail 3610 are operatively coupled to and independently movable relative to headrail 3606. For example, in some instances, first rail 3608 and second rail 3610 are coupled to headrail 3606 via cords. First rail 3608 and second rail 3610 can be independently positioned. In some examples, motor assembly 100 (FIG. 1) is incorporated into headrail 3606 and used to move first rail 3608 and second rail 3610 to extend or retract first and second coverings 3602, 3604. For example, motor 102 may be used to move first rail 3608 and/or second rail 3610 in one direction or the other depending on the gestures or commands input by a user, as disclosed herein. In some examples, headrail 3606 contains a gear system, a clutch, and/or another device to control which of first rail 3608 and second rail 3610 is moved by motor 102. Additionally or alternatively, covering assembly 3600 may include separate motors for moving first rail 3608 and second rail 3610.

FIGS. 36A-36C show covering assembly 3600 in three configurations or positions: an upper limit position 3612 of FIG. 36A (a first position) in which first rail 3608 and second rail 3610 are in a fully raised (retracted) position; a transition limit position 3614 of FIG. 36B (a second position) in which first rail 3608 is in a raised position and second rail 3610 is in a lowered position; and a lower limit position 3616 of FIG. 36C (a second position) in which first rail 3608 and second rail 3610 are in a fully lowered (extended) position. First covering 3602 and second covering 3604 may be constructed of different materials to allow different amounts of light through. Using different materials for first covering 3602 and second covering 3604 enables a user to select a desired amount of light through architectural opening 3601. The positions of first and second rails 3608, 3610 in upper limit position 3612, transition limit position 3614, and lower limit position 3616 may be saved and stored in memory 2714. In some examples, other positions of covering assembly 3600 can be stored in memory 2714. For example, a favorite position of covering assembly 3600 may be stored in memory 2714. In such examples, the commands for controlling operation of covering assembly 3600 are substantially the same as the commands disclosed in connection with FIGS. 29-30. In some examples, additional transition limit positions (not shown) between upper limit position 3612 and lower limit position 3616 may be stored in memory 2714.

When covering assembly 3600 is in upper limit position 3612, first rail 3608 and second rail 3610 are at or near headrail 3606, first covering 3602 is retracted between headrail 3606 and first rail 3608, and second covering 3604 is retracted between first rail 3608 and second rail 3610. A user may activate motor assembly 100 (e.g., via a first gesture) to move second rail 3610 away from headrail 3606 (e.g., downward), which extends second covering 3604. Motor controller 2702 may continue to activate motor 102 to move second rail 3610 away from headrail 3606 until transition limit position 3614. Motor controller 2702 deactivates motor 102 when transition limit position 3614 is reached. In transition limit position 3614, second covering 3604 substantially covers architectural opening 3601. Then, a subsequent gesture (e.g., a second gesture, which may be a same type of gesture as first gesture or a different type of gesture) provided by a user may cause motor 102 to be re-activated to move first rail 3608 to lower limit position 3616. Conversely, when moving covering assembly 3600 from lower limit position 3616 to upper limit position 3612, covering assembly 3614 stops at transition limit position 3614 and requires another gesture to re-active motor 102. In some examples, the gestures for activating and deactivating motor 102 in these phases (e.g., a first phase between upper limit position 3612 and transition limit position 3614, a second phase between transition limit position 3614 and lower limit position 3616) are substantially the same as disclosed in connection with FIGS. 28 and 33. While in the illustrated example first covering 3602 is provided between headrail 3606 and first rail 3608, in other examples, no covering is provided between headrail 3606 and first rail 3608.

As such, with a covering having one or more transitional limit positions, if a user desires to move the covering to an upper limit or position or a limit position, the user generally has to wait near the covering assembly and re-activate the motor (e.g., by inputting a gesture) after each transition limit position is reached. If there are multiple transition limit positions, the covering is relatively long, and/or the motor is relatively slow, this process may require significant time. Therefore, disclosed herein are example gestures, referred to herein as express gestures, that can be used to move the covering to the upper limit position (the fully retracted position) or the lower limit position (the fully extended position) without stopping at the transitional limit position(s) and/or otherwise requiring further input from a user. In other words, the express gesture causes the covering to bypass the transition limit position(s). The covering may move continuously through the transition limit position(s) to the upper or lower limit position without stopping at the transition limit position(s), or may stop for a period of time (e.g., one second) but automatically continue to move to the upper or lower limit position. This bypass movement does not require further or additional input from the user. This enables a user to enter one gesture (the express gesture) and walk away from the architectural covering. Therefore, in the disclosed examples, the user does not have to wait and re-activate the motor assembly at each transition limit position. The example express gesture may be implemented in connection with any of the example coverings disclosed herein, such as the coverings shown in FIGS. 34-36.

Figure 37:
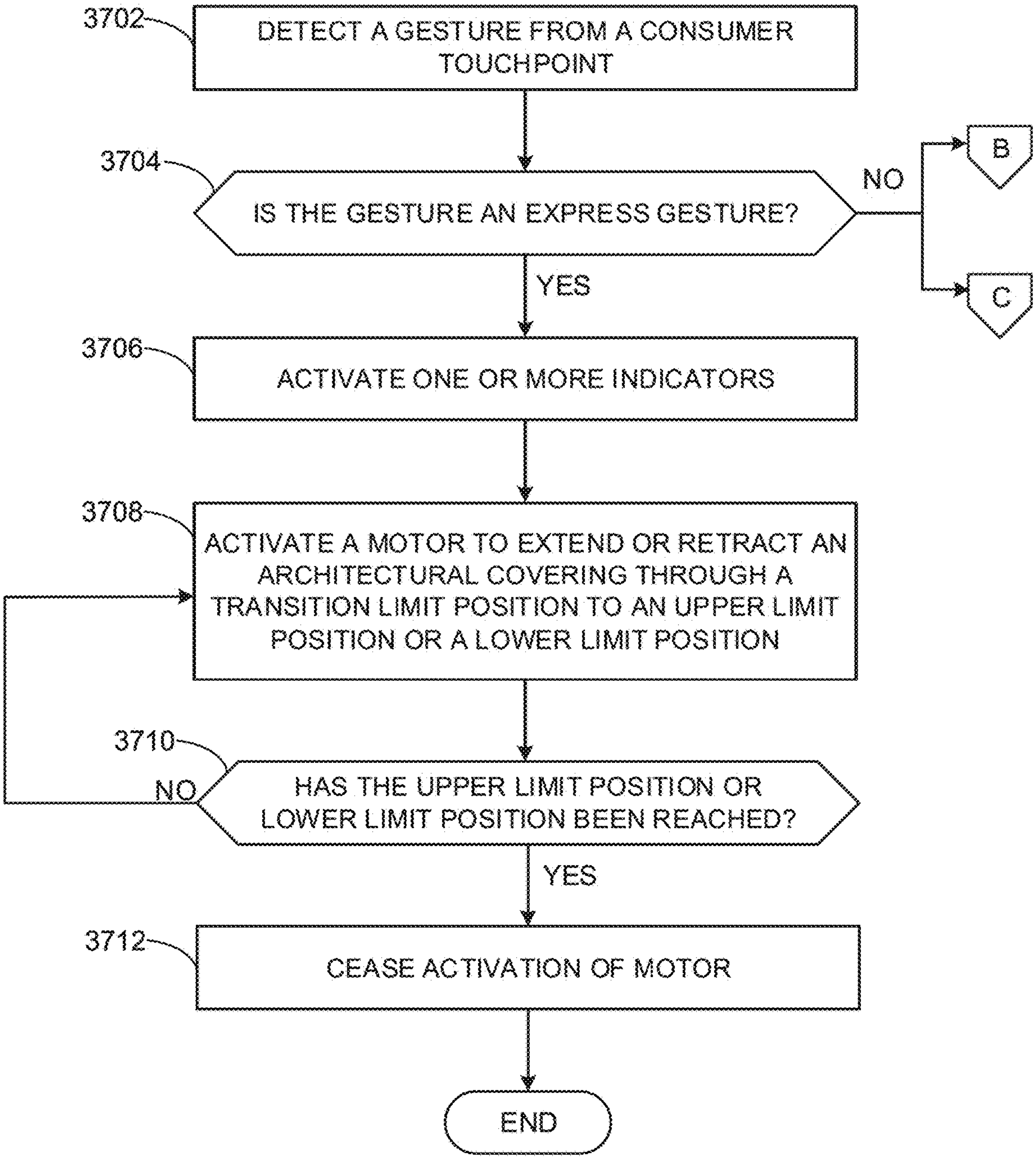
FIG. 37 is a flowchart representative of example machine readable instructions that may be executed to implement the architectural covering controller illustrated in FIG. 27 to move a motorized architectural covering to an upper limit position or a lower limit position.

FIG. 37 is a flowchart representative of example machine readable instructions, implemented by architectural covering controller 2700 of motor assembly 100, to move an architectural covering through one or more transition limit position(s) to an upper limit position or a lower limit position based on an express gesture. FIG. 37 is described in connection covering 3400 of FIGS. 34A-34C. However, it is understood that the example process of FIG. 37 can be similarly implemented with other types of coverings or covering assemblies, such as covering assembly 3500 in FIGS. 35A-35D, covering assembly 3600 in FIGS. 36A-36C, and/or any other covering or covering assembly having one or more transition limit positions. As disclosed herein, a user may activate motor assembly 100 to move covering 3400 by performing a gesture (e.g., an upward movement, a downward movement, an up/down movement, etc.) with a consumer touchpoint, such as lever actuator 114.

At block 3702, switch interface 2704 detects a gesture from the consumer touchpoint. For example, the switch interface 2704 can detect when one of first switch 422 or second switch 424 is activated (e.g., depressed, etc.) and can detect the length of activation (e.g., 10 milliseconds, 1 second, 5 seconds, etc.). The gesture can be defined by any sequence of activation(s) and/or hold time of activation(s) of switches 422, 424 occurring within a period of time (e.g., within a 2 second window of time). In some examples, once a gesture is entered and covering 3400 is moving, the gesture is considered done, and a second or subsequent gesture may be entered.

At block 3704, action determiner 2412 determines if the gesture is an express gesture. The express gesture is a different gesture then the up or down gesture disclosed in connection with FIG. 28 and the favorite gesture disclosed in connection with FIG. 29. Thus, action determiner 2412 can distinguish between various gestures. In some examples, the express gesture may be an upward or downward hold of the consumer touchpoint that meets a threshold time period (e.g., above a lower threshold, above an upper threshold, equal to a threshold). In such examples, the express gesture is a relatively long hold of the consumer touchpoint upward or downward. In one example, a downward hold indicates the desire to move covering 3400 to extended and open position 3416 (the lower limit position with vanes 3408 open), whereas an upward hold indicates the desire to move covering 3400 to retracted position 3412 (the upper limit position). In such an example, if either first switch 422 or second switch 424 is depressed longer than a threshold time period, action determiner 2412 identifies the gesture as an express gesture. The threshold time period(s) is/are stored in memory 2714. In some examples, the threshold time period is 2 seconds. Thus, if first switch 422 is activated for longer than 2 seconds, action determiner 2412 determines an upward express gesture (a first express gesture) has been input to move covering 3400 to the upper limit position. Similarly, if second switch 424 is activated for longer than 2 seconds, action determiner 2412 determines a downward express gesture (a second express gesture) has been input to move covering 3400 to the lower limit position. In other examples, the express gesture(s) may be defined by other sequences and or durations of activation of either or both switches 422, 424. If action determiner 2712 determines the gesture is an express gesture, the example instructions continue to block 3706. If the gesture is not an express gesture, action determiner 2712 may determine one or more other actions to perform based on the gesture. For example, if action determiner 2712 determines the gesture is a favorite gesture (e.g., a relatively quick up/down or down/up movement of the consumer touchpoint), the example process of FIG. 37 may continue (though block B) to block 2906 of FIG. 29. As another example, if action determiner 2712 determines the gesture is a normal up command or down command, the example process of FIG. 37 may continue (through block C) to block 3302 of FIG. 33. In such an instance, covering 3400 may move to the next position, such as extended and closed position 3414 (the transition limit position with vanes 3408 closed), and stop. Additionally or alternatively, one or more other gestures may be programmed into the memory 2714 that, when detected, trigger one or more other operations or functions.

In some examples, if action determiner 2712 determines an express gesture has been input, one or more indicators (e.g., a light, a sound, etc.) are activated to signal to the user that motor assembly 100 is moving covering 3400 to the upper limit position or lower limit position and bypassing the transition limit position(s). For example, at block 3706, indicator trigger 2716 may activate one or both of indicators 2718*a*, 2178*b*. For instance, indicator trigger 2716 may activate a light, such as a blinking green light. In other examples, other indicators (e.g., a sound generated by second indicator 2718*b*, a jog of covering 3400, etc.) may be activated in addition to or as an alternative to the light.

At block 3708, motor controller 2702 activates a motor (e.g., motor 102) to extend or retract covering 3400 to move covering 3400 through the transition limit position(s) to the corresponding limit position (upper limit position or lower limit position). Architectural covering controller 2700 does not require further or additional input from the consumer touchpoint at each of the transition limit positions. Motor controller 2702 may activate motor 102 to move covering 3400 continuously to the upper limit position or lower limit position (depending on express gesture) without stopping at the transition limit position(s). In other examples, motor 102 may stop covering 3400 at the transition limit position(s) for a period of time (e.g., a brief pause) before continuing to move covering 3400 to the upper limit position or lower limit position. For example, if architectural covering 3400 is at retracted position 3412 (the upper limit position) or between retracted position 3412 and extended and closed position 3414 (the transition limit position) and a downward express command is detected, motor controller 2702 activates motor 102 to move covering 3400 through extended and closed position 3414 to extended and open position 3416 (the lower limit position). If covering 3400 is at extended and closed position 3412 (the transition limit position) or between retracted position 3412 (the upper limit position) and extended and closed position 3414 and an upward express command is detected, motor controller 2702 activates motor 102 to move covering 3400 to retracted position 3412 (the upper limit position). Similarly, if covering 3400 is at extended and open position 3416 (the lower limit position) or between extended and closed position 3414 (the transition limit position) and extended and open position 3416 and an upward express command is detected, motor controller 2702 activates motor 102 to move covering 3400 through extended and closed position 3414 to retracted position 3412 (the upper limit position). If covering 3400 is at extended and closed position 3414 (the transition limit position) or between extended and closed position 3414 and extended and open position 3416 (the lower limit position) and a downward express command is detected, motor controller 2702 activates motor 102 to move covering 3400 to extended and open position 3416 (the lower limit position).

In some examples, motor controller 2702 may control motor 102 to change speeds when a transition limit position is reached. For example, motor controller 2702 may activate motor 102 to move covering 3400 at a first speed in a first phase (e.g., when between retracted position 3412 and extended and closed position 3414) and a second speed (e.g., a slower speed, etc.) in a second phase (e.g., when between extended and closed position 3414 and extended and open position 3416). In some examples, the one or more indicators continue to activate while covering 3400 is moving (e.g., a blinking green light remains on while covering 3400, etc.). In other examples, indicator trigger 2716 may only activate the indicator(s) for a portion of the movement (e.g., 1 second, 2 seconds, etc.) of covering 3400 after the gesture is detected. In other examples, no indicators may be triggered.

At block 3710, action determiner 2712 determines whether covering 3400 has reached the corresponding limit position (the upper limit position or the lower limit position). In some examples, action determiner 2712 compares the position of covering 3400, as determined by the position determiner 2710, to the upper and lower limit positions. If the covering 3400 has reached the upper or lower limit position, motor controller 2702, at block 3712, deactivates motor 102 and the example process of FIG. 37 ends. Thus, covering 3400 is stopped in the upper or lower limit position. Otherwise, if covering 3400 has not reached the upper or lower limit position, motor 102 continues to move covering 3400 toward the corresponding limit position (block 3708) and ignores any transition limit positions reached by the covering 3400. In some examples, while motor 102 is moving covering 3400 to a limit position, a user may push or pull down on lever actuator 114 to stop motor 102 and end the operation. While the example flowchart of FIG. 37 is described in connection with moving a covering to an upper limit position or a lower limit position while skipping one or more transition limit position(s), in other examples, the architectural covering can be configured to express to any other position (a position between an upper limit position and a lower limit position) without requiring further input from a user. Various gestures may be programmed to trigger the covering to be moved to certain positions without stopping at and/or otherwise requiring further input from a user at each of the transition limit position(s).

As disclosed above, FIG. 37 is a flowchart representative of example machine readable instructions implemented by architectural covering controller 2700 of motor assembly 100 to operate an architectural covering (e.g., covering 3400, covering assembly 3500, covering assembly 3600, etc.). The instructions of FIG. 37 may be implemented with any type of architectural covering having one or more transitional limit positions. For example, the instructions of FIG. 37 may cause covering 3400 of FIGS. 34A-34C to move through extended and closed position 3414 (the transition limit position) to retracted position 3412 (the upper limit position) or extended and open position 3416 (the lower limit position) without stopping at extended and closed position 3414 (the transition limit position) and/or otherwise requiring further input from a user at extended and closed position 3414 (the transition limit position). If a second covering is included, such as in covering assembly 3500 of FIGS. 35A-35D, extended position 3526 of second covering 3504 may correspond to the lower limit position. In such an instance, an express gesture may cause second covering 3504 to extend to extended position 3526 without stopping at extended and open position 3524 and/or otherwise requiring further input from a user at extended and open position 3524. As another example, the instructions of FIG. 37 may cause covering assembly 3600 of FIGS. 36A-36C to move through transition limit position 3614 to upper limit position 3612 or lower limit position 3616 without stopping at transition limit position 3614 and/or otherwise requiring further input from a user at transition limit position 3614.

Figure 38:
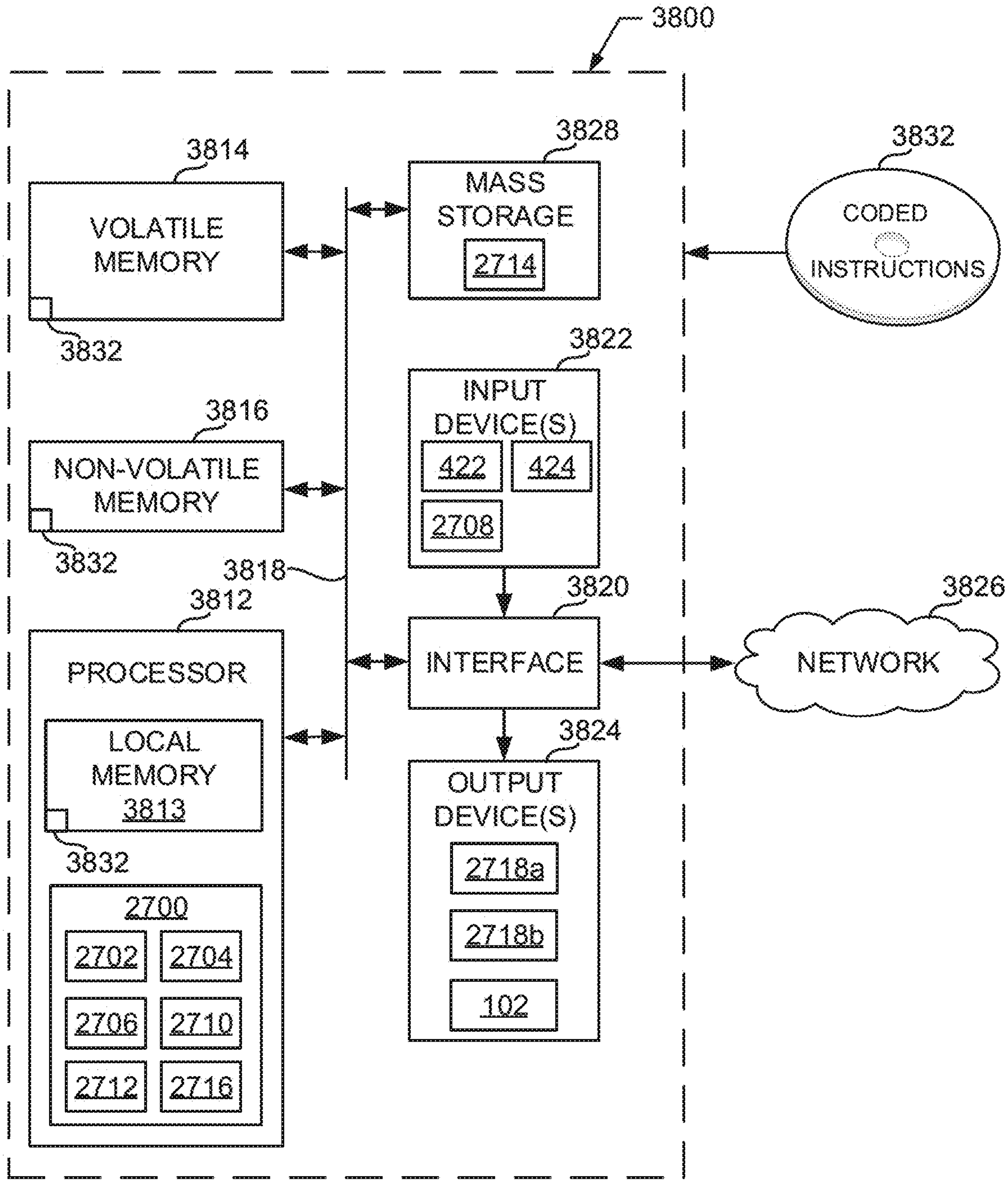
FIG. 38 is a block diagram of an example of a processor platform that may execute the instructions of FIGS. 28-33 and 37 to implement the architectural covering controller illustrated in FIG. 27.

FIG. 38 is a block diagram of an example processor platform 3800 capable of executing the instructions of FIGS. 28-33 and 37 to implement architectural covering controller 2700 of FIG. 2700. Processor platform 3800 can be, for example, an embedded processing device, a server, a personal computer, a mobile device (e.g., a cell phone, a smart phone, a tablet such as an iPad'), or any other type of computing device.

Processor platform 3800 of the illustrated example includes a processor 3812. Processor 3812 of the illustrated example is hardware. For example, processor 3812 can be implemented by one or more integrated circuits, logic circuits, microprocessors, or controllers from any desired family or manufacturer. In this example, processor 3812 may implement motor controller 2702, switch interface 2704, position sensor interface 2706, position determiner 2710, action determiner 2712, indicator trigger 2716, and/or, more generally, architectural covering controller 2700.

Processor 3812 of the illustrated example includes a local memory 3813 (e.g., a cache). Processor 3812 of the illustrated example is in communication with a main memory including a volatile memory 3814 and a non-volatile memory 3816 via a bus 3818. Volatile memory 3814 may be implemented by Synchronous Dynamic Random Access Memory (SDRAM), Dynamic Random Access Memory (DRAM), RAMBUS Dynamic Random Access Memory (RDRAM), and/or any other type of random access memory device. Non-volatile memory 3816 may be implemented by flash memory and/or any other desired type of memory device. Access to main memory 3814, 3816 is controlled by a memory controller.

Processor platform 3800 of the illustrated example also includes an interface circuit 3820. Interface circuit 3820 may be implemented by any type of interface standard, such as an Ethernet interface, a universal serial bus (USB), and/or a PCI express interface.

In the illustrated example, one or more input devices 3822 are connected to interface circuit 3820. Input device(s) 3822 permit(s) a user to enter data and commands into the processor 3812. Input device(s) can be implemented by, for example, an audio sensor, a microphone, a camera (still or video), a keyboard, a button, a mouse, a touchscreen, a track-pad, a trackball, isopoint, and/or a voice recognition system. In this example, input device(s) 3822 may include first switch 422, second switch 424, and/or position sensor 2708.

One or more output devices 3824 are also connected to interface circuit 3820 of the illustrated example. Output device(s) 3824 can be implemented, for example, by display devices (e.g., a light emitting diode (LED), an organic light emitting diode (OLED), a liquid crystal display, a cathode ray tube display (CRT), a touchscreen, a tactile output device, a printer, and/or speakers). In this example, output device(s) 3824 may include first indicator 2718*a*, second indicator 2718*b*, and/or motor 102.

Interface circuit 3820 of the illustrated example also includes a communication device such as a transmitter, a receiver, a transceiver, a modem, and/or network interface card to facilitate exchange of data with external machines (e.g., computing devices of any kind) via a network 3826 (e.g., an Ethernet connection, a digital subscriber line (DSL), a telephone line, coaxial cable, a cellular telephone system, etc.).

Processor platform 3800 of the illustrated example also includes one or more mass storage devices 3828 for storing software and/or data. Examples of such mass storage devices 3828 include floppy disk drives, hard drive disks, compact disk drives, Blu-ray disk drives, RAID systems, and digital versatile disk (DVD) drives. In this example, mass storage device 3828 may include memory 2714.

Coded instructions 3832 of FIGS. 28-33 and 37 may be stored in mass storage device 3828, in non-volatile memory 3816, and/or on a removable tangible computer readable storage medium such as a CD or DVD.

From the foregoing, it will be appreciated that the above disclosed motor assemblies include rotatable actuators that activate switches to drive the architectural coverings open or closed. Also disclosed herein are example lever actuators for commanding the motor assemblies to raise or lower the architectural covering (e.g., by rotating the actuator to activate the switches). In some examples, the lever actuators are coupled to control levers that rotate the actuators. The example lever actuators require relatively little effort from a user to operate (as compared to manual pull cords) while still providing that intuitive and traditional feel for commanding the covering open and closed (as compared to a remote control). Some disclosed example motor assemblies include channels for the control levers that prevent over-rotation (e.g., beyond a predetermined distance) of the control levers and/or actuator, which would otherwise cause damage to the example motor assemblies. In some examples disclosed herein, the example control lever and/or actuator is biased to the neutral position without the use of a spring, thereby reducing extra components from the actuator and decreasing the risk of component failure. Further, example lever actuators are disclosed herein that that detach from the motor assembly, thereby decreasing the risk of injury to a user and/or reducing damage to the motor assembly. Also disclosed herein are example gestures that may be performed by a user with a consumer touchpoint to cause the architectural covering to perform one or more operations.

Example motor assemblies for an architectural coverings are disclosed herein. An example motor assembly includes a motor, a first switch to trigger the motor to retract the architectural covering, a second switch to trigger the motor to extend the architectural covering, and an actuator, the actuator positioned to activate the first switch when the actuator is rotated in a first direction and to activate the second switch when the actuator is rotated in a second direction.

In some examples, the first and second switches are snap dome switches. In some examples, the actuator includes a first nub and a second nub. The first nub is to activate the first switch when the actuator is rotated in the first direction and the second nub is to activate the second switch when the actuator is rotated in the second direction. In some such examples, the first nub is to activate the first switch by engaging the first switch, and the second nub is to activate the second switch by engaging the second switch.

In some examples, the motor assembly includes a spring to bias the actuator to a neutral position where neither the first switch nor the second switch is activated. In some such examples, the motor assembly further includes a housing, and the actuator is rotatable within the housing. The spring is disposed within a cavity formed in a side of the actuator. The spring extends outward through an opening in the housing and is engaged with a side wall defining a portion of the opening.

In some examples, the motor assembly includes a control lever coupled to an end of the actuator. The control lever is to rotate the actuator when the control lever is moved. In some examples, the control lever extends from the end of the actuator in a direction transverse to a rotational axis of the actuator. In some such examples, the control lever pivots about the rotation axis to rotate the actuator. In some examples, the motor assembly includes a consumer touchpoint coupled to the control lever, where linear movement of the consumer touchpoint causes rotational movement of the actuator. In some examples, a first end of the control lever is coupled to the actuator and a second end of the control lever, opposite the first end, is coupled to the consumer touchpoint, and the control lever has a J-shaped profile between the first end and the second end. In some examples, the rotational axis of the actuator is a longitudinal axis of the actuator. In some examples, the control lever is shaped to extend outwardly from a front cover or headrail of the architectural covering. In some examples, the motor assembly includes an end plate, and the actuator is rotatably coupled to the end plate. In some such example, the motor assembly further includes a housing coupled to and extending from the end plate, and the actuator is rotatable within the housing. In some examples, the first switch and the second switch are disposed within the housing. In some examples, the motor assembly also includes a circuit board. In such an example, the first switch and the second switch disposed on the circuit board, and the circuit board disposed within the housing adjacent the actuator. In some examples, the end plate includes an upper wall and a lower wall, and the control lever is to engage the upper wall when the control lever is rotated in the first direction, and the control lever is to engage the lower wall when the control lever is rotated in the second direction. In some such examples, the end plate has a first side and a second side opposite the first side, and the upper and lower walls are formed in the second side of the end plate. In some examples, the end plate includes an opening formed through the end plate between the first side and the second side. In such an example, the actuator extends from the first side of the end plate, and the control lever is coupled to the actuator through the opening in the end plate and pivotable about a rotational axis of the actuator.

In some examples, the motor assembly includes a lever actuator coupled to the actuator, wherein linear movement of the lever actuator causes rotational movement of the actuator. In some examples, lifting of the lever actuator rotates the actuator in the first direction and lowering of the lever actuator rotates the actuator in the second direction. In some examples, the lever actuator is coupled to the actuator via a control lever. In some examples, the lever actuator is removably coupled to the control lever. In some examples, the lever actuator provides an extension to a user to effect movement of the control lever. In some examples, the first and second switches radially spaced from a rotational axis of the actuator.

An example motor assembly includes a motor and an actuator. The actuator is positioned to activate the motor to retract the architectural covering when the actuator is rotated in a first direction and to activate the motor to extend the architectural covering when the actuator is rotated in a second direction. The example motor assembly also includes a control lever coupled to the actuator. The control lever extends from the actuator to translate linear movement into rotational movement of the actuator.

In some examples, the control lever extends from the actuator in a direction transverse to a rotational axis of the actuator. In some examples, the actuator is disposed adjacent an end of the motor. In some examples, the actuator is rotatable about a longitudinal axis of the actuator, where the longitudinal axis of the actuator is aligned with a longitudinal axis of the motor. In some examples, the motor assembly includes a lever actuator. In some such examples, the lever actuator is coupled to an end of the control lever, where linear movement of the lever actuator causes rotational movement of the actuator.

An example operating system for an architectural opening is disclosed herein. The example operating system includes a control lever to cause the architectural covering to extend or retract, an end joiner coupled to the control lever, the end joiner having a first magnet, and a lever actuator having a second magnet, the lever actuator magnetically coupled to the end joiner via the first and second magnets.

In some examples, the end joiner includes a socket formed in the end joiner, where the socket is to receive a connector on an end of the control lever. In some examples, the operating system include a retainer disposed in the socket to fixedly couple the end joiner and the connector. In some examples, the socket is formed in a side of the end joiner and extends into the end joiner in a direction transverse to a longitudinal axis of the lever actuator. In some examples, the socket of the end joiner and the connector of the control lever form a ball joint. In some examples, the end joiner is rotatably coupled to the connector. In some examples, the lever actuator is detachable from the end joiner by overcoming the magnetic force between the first and second magnets.

Disclosed herein is an architectural covering having a motor assembly including a motor, a first switch to trigger the motor to retract the architectural covering, a second switch to trigger the motor to extend the architectural covering, and an actuator, the actuator positioned to activate the first switch when the actuator is rotated in a first direction and to activate the second switch when the actuator is rotated in a second direction.

Disclosed herein is an apparatus comprising a covering for an architectural structure or opening, an operating system to extend or retract the covering, a control lever to actuate the operating system, an end joiner coupled to the control lever, and a lever actuator removably coupled to the end joiner.

An example motor assembly for an architectural covering disclosed herein includes a motor, a consumer touchpoint, and an architectural covering controller. The architectural covering controller is constructed and arranged to detect a first movement of the consumer touchpoint in a first direction, constructed and arranged to activate the motor to retract or extend the architectural covering based on the first movement, constructed and arranged to detect a second movement of the consumer touchpoint in the first direction or a second direction opposite the first direction, and constructed and arranged to deactivate the motor based on the second movement.

Another example motor assembly for an architectural covering disclosed herein includes a first switch, a second switch, a motor, and an architectural covering controller. The architectural covering controller is constructed and arranged to detect an activation of the first switch, constructed and arranged to activate the motor to retract or extend the architectural covering based on the activation of the first switch, constructed and arranged to detect an activation of the second switch, and constructed and arranged to deactivate the motor based the activation of the second switch. In some examples, after the first switch is deactivated, the architectural covering controller continues to activate the motor until the activation of the second switch. In some examples, the motor assembly further includes a consumer touchpoint, where the consumer touchpoint movable in a first direction to activate the first switch and movable in a second direction opposite the first direction to activate the second switch.

An example non-transitory machine readable storage medium includes instructions that, when executed, cause a machine at least, in response to detecting a first movement of a consumer touchpoint in a first direction, to activate a motor to move an architectural covering in the first direction, and, in response to detecting a second movement of the consumer touchpoint in the first direction or a second direction opposite the first direction, to cease activation of the motor to stop movement of the architectural covering. In some examples, the instructions, when executed, further cause the machine, in response to detecting an upper limit position or a lower limit position has been reached by the architectural covering, to cease activation of the motor to stop movement of the architectural covering. In some examples, the instructions, when executed, cause the machine to activate the motor to move the architectural covering at a first speed when the architectural covering is operating in a first phase and activate the motor to move the architectural covering at a second speed when the architectural covering is operating in a second phase, where the second speed slower than the first speed. In some examples, the first phase and the second phase are separated by a transition limit position, and the instructions, when executed, further cause the machine, in response to detecting the transition limit position has been reached by the architectural covering, to cease activation of the motor to stop movement of the architectural covering. In some example, in the first phase, a first amount of material of the architectural covering is extended or retracted and, in the second phase, a second amount of material of the architectural covering is extended or retracted, the second amount different from the first amount. In some examples, the consumer touchpoint is a lever actuator.

An example motor assembly for an architectural covering disclosed herein includes a motor, a consumer touchpoint, and an architectural covering controller constructed and arranged to detect a gesture performed by a user with the consumer touchpoint and constructed and arranged to activate the motor to move the architectural covering to a predetermined position based on the gesture. In some examples, the gesture includes an up-and-down movement or a down-and-up movement of the consumer touchpoint. In some examples, the architectural covering controller is, in response to detecting the gesture, to activate one or more indicators. In some examples, the one or more indicators include a light.

An example non-transitory machine readable storage medium includes instructions that, when executed, cause a machine to activate, at least in response to detecting a gesture with a consumer touchpoint, a motor to move an architectural covering to a predetermined position. In some examples, the gesture is an up-and-down movement or a down-and-up movement of the consumer touchpoint. In some examples, the instructions, when executed, further cause the machine to detect the gesture by detecting activation of a first switch and activation of a second switch within a threshold time period. In some examples, the instructions, when executed, further cause the machine, in response to detecting the gesture, to activate one or more indicators. In some examples, the one or more indicators include a light.

An example architectural covering assembly disclosed herein includes an architectural covering movable between an upper limit position, a lower limit position, and a transition limit position between the upper limit position and the lower limit position, a motor, a consumer touchpoint, and an architectural covering controller. In response to detecting a first gesture at the consumer touchpoint, the architectural covering controller is to activate the motor to move the architectural covering to the transition limit position and stop and, in response to detecting a second gesture at the consumer touchpoint, different from the first gesture, the architectural covering controller is to activate the motor to move the architectural covering through the transition limit position and to the upper limit position or the lower limit position.

In some examples, the second gesture is an upward or downward hold of the consumer touchpoint that meets a threshold time period. In some examples, the architectural covering controller is to activate the motor to move the architectural covering at a first speed when moving the architectural covering between the upper limit position and the transition limit position and to activate the motor to move the architectural covering at a second speed when moving the architectural covering between the transition limit position and the lower limit position. In some examples, the second speed is different from the first speed.

In some examples, when the first gesture is detected, the architectural covering controller is to activate the motor to move the architectural covering from an initial position to the transition limit position and stop, and when the second gesture is detected, the architectural covering controller is to activate the motor to move the architectural covering from the initial position to the upper limit position or the lower limit position.

In some examples, the architectural covering includes a first panel, a second panel, and a plurality of vanes between the first and second panels. In the upper limit position, the first and second panels are retracted, in the transition limit position, the first and second panels are extended and the plurality of vanes are closed, and in the lower limit position, the first and second panels are extended and the plurality of vanes are open. In some such examples, the architectural covering assembly includes a roller tube. The first and second panels are coupled to the roller tube, and the motor to rotate the roller tube to extend or retract the first and second panels.

In some examples, the architectural covering includes a first architectural covering and a second architectural covering. In the upper limit position, the first and second architectural coverings are retracted, in the transition limit position, the first architectural covering is extended and the second architectural covering is retracted, and in the lower limit position, the first architectural covering is extended and the second architectural covering is extended. In some such examples, the architectural covering assembly includes a first roller tube and a second roller tube disposed within the first roller tube. The first architectural covering coupled to the first roller tube and the second architectural covering coupled to the second roller tube. In some examples, the second architectural covering is constructed of a material that blocks more light than the first architectural covering.

In some examples, the architectural covering assembly includes a headrail, a first rail, and a second rail. The architectural covering is coupled between the first rail and the second rail. In the upper limit position, the first rail and the second rail are disposed at or near the headrail, in the transition limit position, the first rail is disposed at or near the headrail and the second rail is extended from the headrail, and in the lower limit position, the first rail and the second rail are extended from the headrail.

In some examples, the architectural covering assembly includes a first snap dome switch, a second snap dome switch, an actuator positioned to activate the first snap dome switch when the actuator is rotated in a first direction and to activate the second snap dome switch when the actuator is rotated in a second direction, and a housing. The actuator is rotatable within the housing. The architectural covering assembly further includes a spring to bias the actuator to a neutral position whether neither the first snap dome switch nor the second snap dome switch is activated. The spring is disposed within a cavity formed in a side of the actuator. The spring is extending outward through an opening in the housing and engaged with a side wall defining a portion of the opening. The architectural covering assembly also includes a control level coupled to an end of the actuator. The control lever is extending in a direction that is transverse to a rotational axis of the actuator, the consumer touchpoint coupled to the control lever. The control lever is to convert linear movement of the consumer touchpoint into rotation movement of the actuator. The architectural covering assembly also includes an end plate. The actuator is rotatably coupled to the end plate. The end plate includes an upper wall and a lower wall. The control lever is to engage the upper wall when the control lever is rotated in the first direction, and the control lever to engage the lower wall when the control lever is rotated in the second direction. In some such examples, the architectural covering assembly further includes an end joiner coupled to the control lever. The end jointer includes a socket to receive a connector on an end of the control lever. The socket and the connector form a ball joint. The end joiner has a first magnet, and wherein, the consumer touchpoint is a lever actuator having a second magnet. The lever actuator is magnetically coupled to the end joiner via the first and second magnets. The lever actuator is detachable from the end joiner by overcoming the magnetic force between the first and second magnets.

Disclosed herein is an example non-transitory machine readable medium including instructions that, when executed, cause at least one processor to at least detect a gesture at a consumer touchpoint of an architectural covering assembly. The architectural covering assembly includes an architectural covering movable between an upper limit position, a lower limit position, and a transition limit position between the upper limit position and the lower limit position. The instructions, when executed, also cause the at least one processor to at least determine whether the gesture is a first gesture or a second gesture different from the first gesture, in response to determining the gesture is the first gesture, activate a motor of the architectural coving assembly to move the architectural covering to the transition limit position and stop, and in response to determining the gesture is the second gesture, activate the motor to move the architectural covering through the transition limit position and to the upper limit position or the lower limit position.

In some examples, the second gesture is an upward or downward hold of the consumer touchpoint that meets a threshold time period. In some examples, the instructions, when executed, cause the at least one processor to activate the motor to move the architectural covering at a first speed when moving the architectural covering between the upper limit position and the transition limit position and to activate the motor to move the architectural covering at a second speed when moving the architectural covering between the transition limit position and the lower limit position. The second speed is different from the first speed.

In some examples, the architectural covering includes a first panel, a second panel, and a plurality of vanes between the first and second panels. In the upper limit position, the first and second panels are retracted. In the transition limit position, the first and second panels are extended and the plurality of vanes are closed. In the lower limit position, the first and second panels are extended and the plurality of vanes are open.

An example method disclosed herein includes detecting, by executing an instruction with at least one processor, a gesture at a consumer touchpoint of an architectural covering assembly. The architectural covering assembly includes an architectural covering movable between an upper limit position, a lower limit position, and a transition limit position between the upper limit position and the lower limit position. The method includes determining, by executing an instruction with the at least one processor, whether the gesture is a first gesture or a second gesture different from the first gesture, in response to determining the gesture is the first gesture, activating, by executing an instruction with the at least one processor, a motor of the architectural coving assembly to move the architectural covering to the transition limit position and stop, and in response to determining the gesture is the second gesture, activating, by executing an instruction with the at least one processor, the motor to move the architectural covering through the transition limit position and to the upper limit position or the lower limit position.

In some examples, the second gesture is an upward or downward hold of the consumer touchpoint that meets a threshold time period. In some examples, the motor is activated to move the architectural covering at a first speed when moving the architectural covering between the upper limit position and the transition limit position, and the motor is activated to move the architectural covering at a second speed when moving the architectural covering between the transition limit position and the lower limit position, the second speed different from the first speed.

In some examples, the architectural covering includes a first panel, a second panel, and a plurality of vanes between the first and second panels. In the upper limit position, the first and second panels are retracted. In the transition limit position, the first and second panels are extended and the plurality of vanes are closed. In the lower limit position, the first and second panels are extended and the plurality of vanes are open.

In the foregoing description, it will be appreciated that the phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Although certain methods, apparatuses, and articles of manufacture have been disclosed herein, the scope of coverage of this patent is not limited thereto. On the contrary, this patent covers all methods, apparatuses, and articles of manufacture fairly falling within the scope of the claims of this patent.

What is claimed is:

1. An architectural covering assembly comprising:

a headrail;

a first rail and a second rail movable between (i) a first pre-stored position at which the first rail and the second rail are adjacent to the headrail, (ii) a second pre-stored position at which the first rail is adjacent to the headrail and the second rail is away from the headrail, and (iii) a third pre-stored position at which the first rail and the second rail are adjacent to each other and away from the headrail; and a controller configured to:

determine an input requesting a movement operation; and cause, based on the input, movement of the first rail and the second rail between the first pre-stored position and the third pre-stored position through the second pre-stored position and, based on a type of the input, with or without stopping at the second pre-stored position.

2. The architectural covering assembly of claim 1 further comprising:

a first covering coupled with the first rail, wherein causing the movement comprises causing the first covering to retract to the first pre-stored position or extend to the third pre-stored position.

3. The architectural covering assembly of claim 2 further comprising:

a second covering coupled with the second rail, wherein causing the movement comprises causing the second covering to retract to the first pre-stored position or extend to the third pre-stored position.

4. The architectural covering assembly of claim 3, wherein the first covering is coupled with the headrail, wherein the second rail is coupled with the first rail, and wherein the first rail is positioned between the headrail and the second rail.

5. The architectural covering assembly of claim 1, wherein the type of the input indicates that the movement operation is to forgo stopping at the second pre-stored position, and wherein causing the movement comprises:

causing the second rail to move from being adjacent to the headrail to being at a distance away from the headrail and stopping upon the second rail being at the distance; and causing, automatically after the second rail is at the distance, the first rail to move from being adjacent to the headrail to being adjacent to the second rail.

6. The architectural covering assembly of claim 1, wherein the type of the input indicates that the movement operation is to stop at the second pre-stored position, wherein the input comprises a first input and a second input, and wherein the movement is caused by:

receiving the first input;

causing, based on the first input, the second rail to move from being adjacent to the headrail to being at a distance away from the headrail and stopping upon the second rail being at the distance;

receiving the second input after the stopping; and causing, based on the second input, the first rail to move from being adjacent to the headrail to being adjacent to the second rail.

7. The architectural covering assembly of claim 1, wherein causing the movement comprises:

causing the second rail to move from being adjacent to the headrail to being at a distance away from the headrail and stopping upon the second rail being at the distance; and causing, automatically after a pre-stored amount of time from the stopping has elapsed, the first rail to move from being adjacent to the headrail to being adjacent to the second rail.

8. The architectural covering assembly of claim 1 further comprising a memory that stores the first pre-stored position, the second pre-stored position, the third pre-stored position, and a fourth pre-stored position, and wherein the controller is further configured to cause, based on additional input, the first rail and the second rail to move between the first pre-stored position and the second pre-stored position through the fourth pre-stored position.

9. A method implemented by an architectural covering assembly, the method comprising:

receiving an input requesting a movement operation; and causing, based on the input, movement of a first rail and a second rail of the architectural covering assembly between a first pre-stored position and a third pre-stored position through a second pre-stored position and, based on a type of the input, with or without stopping at the second pre-stored position, wherein:

at the first pre-stored position, the first rail and the second rail are adjacent to a headrail of the architectural covering assembly, at the second pre-stored position, the first rail is adjacent to the headrail and the second rail is away from the headrail, and at the third pre-stored position, the first rail and the second rail are adjacent to each other and away from the headrail.

10. The method of claim 9 further comprising:

determining the type of the input, wherein the type indicates that the movement operation is to forgo stopping at the second pre-stored position, and wherein causing the movement comprises:

causing the first rail to move from being at a first distance away from the headrail to being adjacent to the headrail and stopping upon the first rail being adjacent to the headrail; and causing, automatically after the first rail is adjacent to the headrail, the second rail to move from being at a second distance away from the headrail to being adjacent to the first rail.

11. The method of claim 9 further comprising:

determining the type of the input based on a sequence of activation of controls, wherein the type indicates that the movement operation is to forgo stopping at the second pre-stored position, and wherein causing the movement.

12. The method of claim 9 further comprising:

determining the type of the input based on an activation time of a control, wherein the type indicates that the movement operation is to forgo stopping at the second pre-stored position, and wherein causing the movement.

13. The method of claim 12 further comprising:

determining that the activation time meets a threshold time period, wherein a memory of the architectural covering assembly stores the first pre-stored position, the second pre-stored position, the third pre-stored position, and the threshold time period.

14. The method of claim 9 further comprising:

activating, based on the type of the input, at least one of a visible indicator or an audible indicator to signal the type of the input.

15. The method of claim 9 further comprising:

determining the type of the input, wherein the type indicates that the movement operation is to forgo stopping at the second pre-stored position; and activating an indicator to signal that forgoing of the stopping at the second pre-stored position.

16. The method of claim 15, wherein the indicator is activated for a pre-stored amount of time, wherein a memory of the architectural covering assembly stores the first pre-stored position, the second pre-stored position, the third pre-stored position, and the pre-stored amount of time.

17. The method of claim 15, wherein the indicator is activated while the second rail moves from being from being adjacent to the headrail to being at a distance away from the headrail and is deactivated upon the second rail being at the distance.

18. One or more non-transitory computer-readable media storing instructions that, upon execution by one or more processors of an architectural covering assembly, cause the architectural covering assembly to perform operations comprising:

receiving an input requesting a movement operation; and causing, based on the input, movement of a first rail and a second rail of the architectural covering assembly between a first pre-stored position and a third pre-stored position through a second pre-stored position and, based on a type of the input, with or without stopping at the second pre-stored position, wherein:

at the first pre-stored position, the first rail and the second rail are adjacent to a headrail of the architectural covering assembly, at the second pre-stored position, the first rail is adjacent to the headrail and the second rail is away from the headrail, and at the third pre-stored position, the first rail and the second rail are adjacent to each other and away from the headrail.

19. The one or more non-transitory computer-readable media of claim 18, wherein the operations further comprise:

determining the type of the input, wherein the type indicates that the movement operation is to forgo stopping at the second pre-stored position, and wherein causing the movement comprises:

causing the first rail to move at a first speed from being at a first distance away from the headrail to being adjacent to the headrail and stopping upon the first rail being adjacent to the headrail; and causing, automatically after the first rail is adjacent to the headrail, the second rail to move at a second speed from being at a second distance away from the headrail to being adjacent to the first rail.

20. The one or more non-transitory computer-readable media of claim 18, wherein the operations further comprise:

determining the type of the input, wherein the type indicates that the movement operation is to forgo stopping at the second pre-stored position, and wherein causing the movement comprises:

causing the second rail to move at a first speed from being adjacent to the headrail to being at a distance away from the headrail and stopping upon the second rail being at the distance; and causing, automatically after the second rail is at the distance, the first rail to move at a second speed from being adjacent to the headrail to being adjacent to the second rail.

* * * * *